United States Patent
Ishito et al.

(10) Patent No.: US 6,356,639 B1
(45) Date of Patent: Mar. 12, 2002

(54) AUDIO DECODING APPARATUS, SIGNAL PROCESSING DEVICE, SOUND IMAGE LOCALIZATION DEVICE, SOUND IMAGE CONTROL METHOD, AUDIO SIGNAL PROCESSING DEVICE, AND AUDIO SIGNAL HIGH-RATE REPRODUCTION METHOD USED FOR AUDIO VISUAL EQUIPMENT

(75) Inventors: Tsukuru Ishito, Kyoto; Masaharu Matsumoto, Katano; Shuji Miyasaka, Neyagawa; Takeshi Fujita, Takatsuki; Takashi Katayama, Katano; Masahiro Sueyoshi, Neyagawa; Kazutaka Abe, Kadoma; Tsuyoshi Nakamura, Iizuka; Eiji Otomura, Ibaraki; Akihisa Kawamura, Hirakata, all of (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 0 days.

(21) Appl. No.: 09/058,713

(22) Filed: Apr. 10, 1998

(30) Foreign Application Priority Data

| Apr. 11, 1997 | (JP) | 9-093520 |
| Apr. 11, 1997 | (JP) | 9-093521 |
| Sep. 4, 1997 | (JP) | 9-239968 |
| Feb. 4, 1998 | (JP) | 10-023023 |

(51) Int. Cl.$^7$ ............................... H04R 5/00
(52) U.S. Cl. ................................ 381/17; 381/1
(58) Field of Search ............... 381/17, 18, 1, 381/19

(56) References Cited

U.S. PATENT DOCUMENTS

| 5,029,200 A | 7/1991 | Haas et al. |
| 5,208,860 A | * 5/1993 | Lowe et al. ............... 381/17 |
| 5,384,890 A | 1/1995 | Anderson et al. |
| 5,579,396 A | * 11/1996 | Iida et al. ............... 381/18 |
| 5,774,864 A | 6/1998 | Han et al. |

FOREIGN PATENT DOCUMENTS

| JP | 1291526 | 11/1989 |
| JP | 4344699 | 12/1992 |
| JP | 5-11800 | 1/1993 |
| JP | 5199122 | 8/1993 |

\* cited by examiner

Primary Examiner—Minsun Oh Harvey
(74) Attorney, Agent, or Firm—Renner, Otto, Boisselle & Sklar

(57) ABSTRACT

A sound image localization device which includes a signal source for outputting an audio signal, a signal divider for dividing the audio signal output from the signal source into two digital audio signals respectively for two channels, and a first signal processor for receiving one of the two digital signals and processing the digital signal so as to localize a virtual sound image using a filter having a first frequency characteristic. In addition, the sound image localization device includes a first D/A converter for converting the digital signal output from the first signal processor into an analog signal, a second D/A converter for receiving the other digital signal obtained from the signal divider and converting the signal into an analog signal, a first control speaker for outputting the audio signal obtained by the first D/A converter to a prescribed space area; and a second control speaker for outputting the audio signal obtained by the second D/A converter to a prescribed space area.

10 Claims, 45 Drawing Sheets

FIG. 4
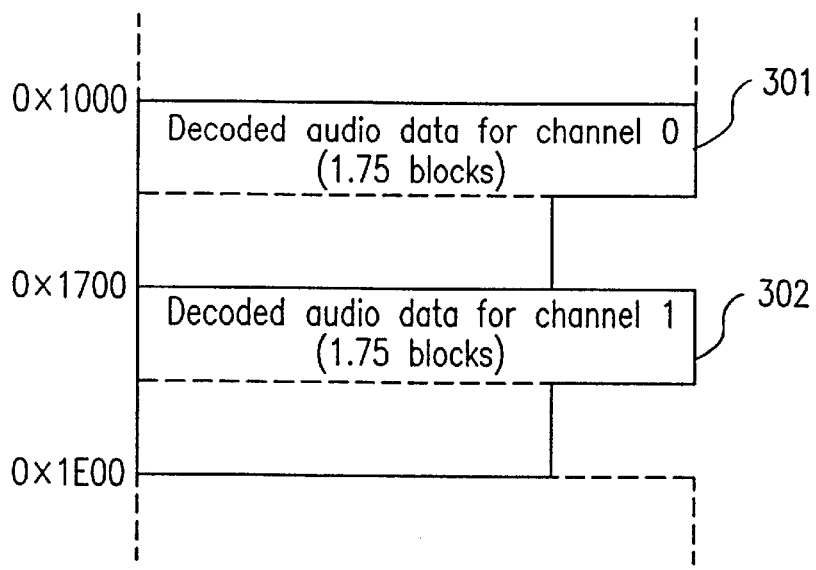
Transition of the value of the read pointer for channel 0
(Amount of one reading operation=1/4 block data=256 bytes)
Initial state: Value of read pointer=0x1000
Final address data in the storage area=0x1700
Data pointer return data=0x700
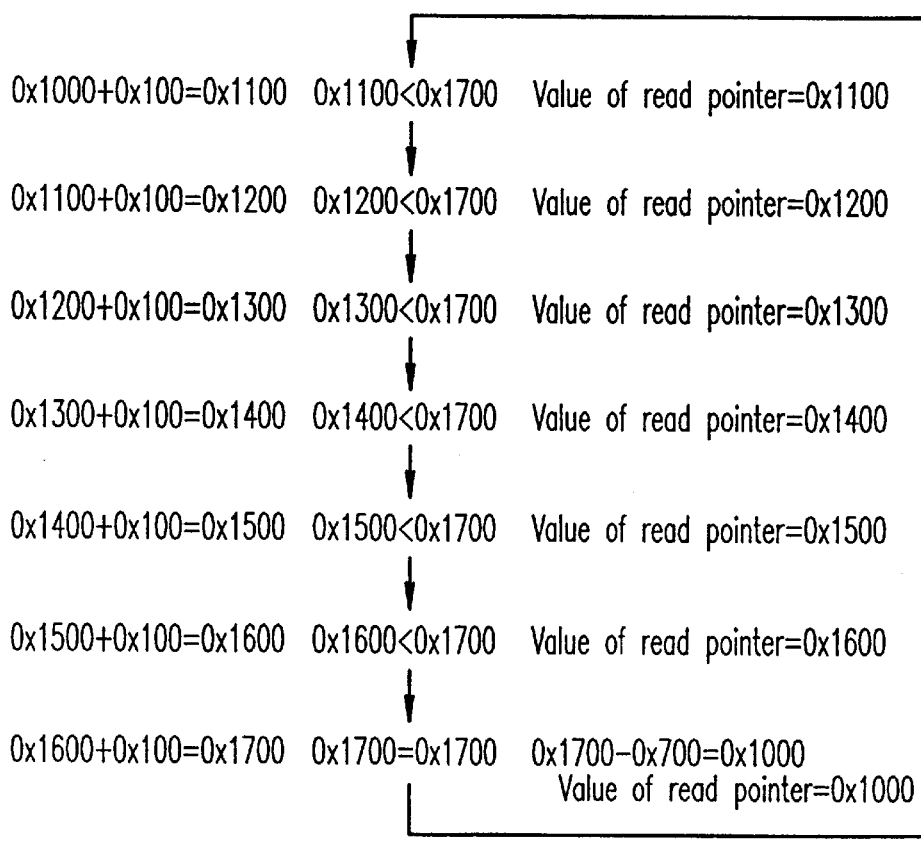

AUDIO DECODING APPARATUS, SIGNAL PROCESSING DEVICE, SOUND IMAGE LOCALIZATION DEVICE, SOUND IMAGE CONTROL METHOD, AUDIO SIGNAL PROCESSING DEVICE, AND AUDIO SIGNAL HIGH-RATE REPRODUCTION METHOD USED FOR AUDIO VISUAL EQUIPMENT

BACKGROUND OF THE INVENTION

1. Field of the Invention

The present invention relates to an audio decoding apparatus used in AV (audio visual) equipment for decoding an encoded bit stream into PCM data. The present invention also relates to a signal processing device, a sound image localization device, a sound image control method, an audio signal processing device, and an audio signal high-rate reproduction method also used in AV equipment.

2. Description of the Related Art

A conventional audio decoding apparatus 550 will be described with reference to FIGS. 6, 7 and 8. FIG. 6 is a block diagram illustrating a structure of the conventional audio decoding apparatus 550. The audio decoding apparatus 550 includes an integrated semiconductor device 508. The integrated semiconductor device 508 includes an input bit stream syntax analyzer 501, an exponential section decoder 502, a mantissa data bit allocator 503, a mantissa section decoder 504, an IMDCT 505, a down-mix operator 506, and an internal memory device 507. The integrated semiconductor device 508 exchanges data with an external memory device 500.

A bit stream is first stored in the external memory device 500 and then input to the input bit stream syntax analyzer 501. The input bit stream syntax analyzer 501 analyzes the syntax of the bit stream and extracts data required for decoding. Such data is sent to the exponential section decoder 502. The exponential section decoder 502 forms exponential data for a frequency domain from the data required for decoding, and output the exponential data to the mantissa data bit allocator 503 and the IMDCT 505. The mantissa data bit allocator 503 calculates a mantissa data bit allocation amount from the exponential data for the frequency domain and the data stored in the external memory device 500, and outputs the mantissa data bit allocation amount to the mantissa section decoder 504. The mantissa section decoder 504 forms mantissa data for the frequency domain from the mantissa data bit allocation amount and outputs the mantissa data to the IMDCT (inverted modified discrete cosine transformer) 505. The IMDCT 505 forms decoded audio data in a time domain from the exponential data and the mantissa data for the frequency domain, and stores the decoded audio data in the external memory device 500. The down-mix operator 506 forms PCM data from the decoded audio data stored in the external memory device 500, performs interleaving and then stores in the resultant data in the external memory device 500. The PCM data is then output from the external memory device 500.

FIG. 7 is a memory map of the audio decoding apparatus 550 shown in FIG. 6. The memory map shown in FIG. 7 includes an area 600 for storing one-block PCM data, an area 601 for storing one-block decoded audio data for channel 0, an area 602 for storing one-block decoded audio data for channel 1, an area 603 for storing one-block decoded audio data for channel 2, an area 604 for storing one-block decoded audio data for channel 3, an area 605 for storing one-block decoded audio data for channel 4, and an area 606 for storing one-block decoded audio data for channel 5.

FIG. 8 is a flowchart illustrating a method for decoding one-block encoded audio data for each channel.

In step S11, a register (not shown), the internal memory device 507 (FIG. 6), and an external memory device 500 are initialized. In Step S12, the bit stream stored in the external memory device 500 is input to the integrated semiconductor device 508 (receipt of encoded data).

Then, in step S13, the syntax of the bit stream is analyzed, and data required for decoding is extracted (bit stream analysis). In step S14, exponential data for a frequency domain is formed using the extracted data. In step S15, a mantissa data bit allocation amount is calculated using the exponential data for the frequency domain. In stop S16, mantissa data for the frequency domain is formed using the mantissa data bit allocation amount. In step S17, decoded audio data is formed using the mantissa data for the frequency domain and the exponential data for the frequency domain. In step S18, the resultant decoded audio data is stored in the external memory device 500.

The above-described steps are executed for the number of channel included in one block until it is confirmed in step S19 that the steps are repeated for the required times. As a result, the number of pieces of decoded audio data corresponding to the number of channels included in one block are formed and stored in the external memory device 500.

In step S20, one-block decoded audio data for each channel in the external memory device 500 is input to the integrated semiconductor device 508. In step S21, the one-block decoded audio data for each channel is converted into one-block PCM data (down-mix calculation). In step S22, the one-block PCM data is output to the external memory device 500.

In the conventional audio decoder 600, one-block PCM data is calculated in one down-mlx calculation. Accordingly, the amount of data transferred for inputting the decoded audio data to the external memory device 500 before the down-mix calculation and for writing the PCM data to the external memory device 500 after the down-mix calculation is sufficiently large to occupy a significant part of the memory bus. Such an occupation has an adverse effect on other processing performed by the external memory device 500.

A conventional signal processing device will be described. A part of the encoded data of a plurality of channels can be commonly shared by the channels. For example, high frequency band encoded data which is included in at least one of the plurality of channels and shared by the plurality of channels is decoded to form high frequency band decoded data. Low frequency band encoded data for each channel is decoded to form low-frequency band decoded data. The low-frequency band decoded data is coupled with the high-frequency band decoded data to form decoded data for each channel.

Such decoding will be described with reference to FIGS. 19, 20 and 21.

FIG. 20 is a block diagram of a conventional signal processor 1350 for performing the above-described signal decoding. As shown in FIG. 20, the bit stream is temporarily stored in an internal memory device 1301, and analyzed by a bit stream syntax analyzer 1300. Thus, required data in extracted. Exponential data for a frequency domain is formed by an exponential section decoder 1302 based on the extracted data. A mantissa data bit allocation amount is determined by a mantissa data bit allocator 1303 based on the exponential data for the frequency domain. Mantissa data is formed by a mantissa section decoder 1304 based on the mantissa data bit allocation amount. Frequency domain data is formed by a frequency domain data forming device 1305 based on the data formed by the exponential section decoder 1302 and the mantissa section decoder 1304.

The frequency domain data forming device 1305 decodes encoded data for an arbitrary channel in the following rule. High frequency encoded data which is included in at least one of a plurality of channels and shared by the plurality of channels is decoded to obtain high frequency band decoded data, and the high frequency band decoded data is multiplied by the ratio of the signal power of a prescribed channel obtained by an encoder with respect to the signal power of an arbitrary channel. The result is coupled with the low frequency decoded data for an arbitrary channel. Thus, decoded data for the arbitrary channel is obtained.

The obtained frequency domain decoded data is converted into time domain decoded data by a frequency domain-time domain converter 1306, and the result is converted into PCM data, which is output.

FIG. 21 schematically shows decoding of encoded data for an arbitrary channel.

In step 141, data in a prescribed channel 1400 is decoded to form a low frequency domain decoded data area 1402 and a high frequency band decoded data area 1403 which is shared by a plurality of channels. In step 142, the high frequency band decoded data area 1403 is multiplied by a ratio α of a signal power for the prescribed channel 1400 obtained by the encoder with respect to the high frequency band decoded data 1404 for an arbitrary channel 1401, thereby forming high frequency decoded data 1404 for the arbitrary channel 1401. In step 143, low frequency band decoded data 1405 for the arbitrary channel 1401 is coupled to the high frequency band decoded data 1404 to form decoded data for the channel 1401.

By using high frequency band encoded data which is shared by a plurality of channels, it is not necessary to transfer the high frequency band encoded data for each of the channels. Thus, transfer efficiency is improved.

For performing such decoding, a bit stream stored in the internal memory device 1301 (FIG. 20) is indicated by a plurality of pointers while extracting required data from the bit stream. Such a performance will be described with reference to FIG. 19.

The prescribed channel 1400 is decoded. Then, a mantissa section 1201 and an exponential section 1202 of low frequency band encoded data for the arbitrary channel 1401 included in a bit stream 1200 are indicated by respective pointers 1203 and 1204 and thus read to decode the low frequency encoded data. A mantissa section 1201 and an exponential section 1202 of high frequency band encoded data for the prescribed channel 1400 are indicated by respective pointers 1203 and 1204 and thus read to decode the high frequency encoded data.

Accordingly, the movement of the pointers 1203 and 1204 needs to be controlled to rewind as indicated by arrows 1205 and 1206. Furthermore, the bit stream needs to be stored in the memory device until data in all the channels sharing the high frequency band encoded data are decoded. Decoding of data in all the channels sharing the high frequency band encoded data requires a sufficiently large memory capacity to store the bit stream.

Moreover, decoding of the high frequency band encoded data, which imposes a larger load than decoding of usual low frequency band encoded data, is demanded to reduce the load.

In the fields of movies and broadcasting, multi-channel (e.g., 5.1 channels) recording and reproduction are performed using a digital audio compression technology. However, reproduction of a multi-channel audio signal at home is limited, since most of the general home-use TVs have two or less output channels. It has been demanded to realize multi-channel reproduction is realized even by AV equipment having a two or less audio reproduction function, using sound field control or sound image control technologies.

Recently, a frequency domain conversion technology such as, for example, MDCT has often been used as an audio compression technology. Herein, a conventional sound image control technology will be described as well as an audio compression technology which uses frequency domain-time domain conversion.

FIG. 23 is a block diagram showing a basic structure of a conventional sound image localization device (sound image reproducer) 2500. First, a method of localizing a sound image to the right and forward of a listener 2010 using speakers 2008-1 and 2008-2 will be described. The speakers 2008-1 and 2008-2 are located forward with respect to the listener 2010. As shown in FIG. 23, the sound image localization device 2500 includes a signal Source 2004, a signal divider 2006, signal processors 2001-1 and 2001-2, D/A converters 2007-1 and 2007-2, and control speakers 2008-1 and 2008-2.

The signal source 2004 receives a PCM audio signal S(t). The signal divider 2006 distributes the audio signal S(t) to left (L) and right (R) channels. The signal processor 2001-1 is a digital filter having a transmission characteristic hL(n), and the signal processor 2001-2 is a digital filter having a transmission characteristic hR(n). A digital output from the signal processor 2001-1 is converted into an analog signal by the D/A converter 2007-1 and sent to the control speaker 2008-1 provided on the left of the sheet of FIG. 23. A digital output from the signal processor 2001-2 is converted into an analog signal by the D/A converter 2007-2 and sent to the control speaker 2008-2 provided on the right of the sheet of FIG. 23.

FIG. 24 is a block diagram of the signal processor 2001-1. The signal processor 2001-2 has the same structure. The signal processor 2001-1 is a FIR filter including n pieces of delay circuits 2011-1 through 2011-n, n+1 pieces of multipliers 2012-1 through 2012-(n+1), and an adder 2013. The multipliers 2012-1 through 2012-(n+1) are connected to inputs and outputs of the delay circuits 2011-1 through 2011-n, and the outputs from the multipliers 2012-1 through 2012-(n+1) are added together by the adder 2013 and output.

With reference to FIGS. 23 and 24, the conventional sound image localization device 2500 operates in the following manner. In FIG. 23, the transfer function between the speaker 2008-1 and the ear of the listener 2010 is referred to as "impulse response", and the value of the impulse response between the speaker 2008-1 and the left ear of the listener 2010 is h1(t). Hereinafter, the operation in the time domain will be described using the impulse response. The impulse response h1(t) is, more accurately, a response at the position of the left eardrum of the listener 2010 caused when an audio signal is input to the speaker 2008-1. For simplicity, measurement is always performed at the inlet of the ceruminous gland. The same effect is obtained when considered with respect to the frequency domain.

The value of the impulse response between the speaker 2008-1 and the right ear of the listener 2010 is h2(t). The value of the impulse response between the speaker 2008-2 and the left ear of the listener 2010 is h3(t). The value of the impulse response between the speaker 2008-2 and the right ear of the listener 2010 is h4(t). A speaker 2009 is assumed as a virtual sound source positioned to the right and forward of the listener 2010. The value of the impulse response between the virtual speaker 2009 and the left ear of the listener 2010 is h5(t). The value of the impulse response between the virtual speaker 2009 and the right ear of the listener 2010 is h6(t).

In such a structure, when an audio signal S(t) from the signal source 2004 is output from the virtual speaker 2009, the sound reaching the left ear of the listener 2010 is expressed by expression (1), and the sound reaching the right ear of the listener 2010 is expressed by expression (2).

$$L(t)=S(t)*h5(t) \tag{1}$$

$$R(t)=S(t)*h6(t) \tag{2}$$

In expressions (1) and (2), the symbol "*" represents a convolution operation. In actuality, the transfer function of the speaker and the like are multiplied, but these elements are ignored here. Alternatively, the transfer function of the speaker and the like can be considered to be included in h5(t) and h6(t).

The impulse responses and signals S(t) are considered to be discrete digital signals and respectively expressed as:

$$L(t) \rightarrow L(n)$$
$$R(t) \rightarrow R(n)$$
$$h5(t) \rightarrow h5(n)$$
$$h6(t) \rightarrow h6(n)$$
$$S(t) \rightarrow S(n)$$

In the above representations, the letter "n" indicates an integer. Where T is a sampling time, "n" in parentheses are more accurately written as nT. Here, "T" is omitted.

Expressions (1) and (2) are respectively expressed as expression (3) and (4), and the symbol "*" representing the convolution operation is replaced by "x", which represents multiplication.

$$L(n)=S(n) \times h5(n) \tag{3}$$

$$R(n)=S(n) \times h6(n) \tag{4}$$

The signal S(t) which is output from the speakers 2008-1 and 2008-2 and reaches the left ear of the listener 2010 is expressed by expression (5).

$$L'(t)=S(t)*hL(t)*h1(t)+S(t)*hR(t)*h3(t) \tag{5}$$

The signal S(t) which is output from the speakers 2008-1 and 2008-2 and reaches the right ear of the listener 2010 is expressed by expression (6).

$$R'(t)=S(t)*hL(t)*h2(t)+S(t)*hR(t)*h4(t) \tag{6}$$

Expressions (5) and (6) are expressed as expressions (8) and (9) using the impulse response.

$$L'(n) = S(n) \times hL(n) \times h1(n) + S(n) \times hR(n) \times h3(n) \tag{8}$$

$$R'(n) = S(n) \times hL(n) \times h2(n) + S(n) \times hR(n) \times h4(n) \tag{9}$$

Here, hL(n) represents the transmission characteristic of the signal processor 2001-1, and hR(n) represents the transmission characteristic of the signal processor 2001-2.

The following description is performed with the premise that when the transfer function between the ear and the speaker is the same, the sound is output in the same direction. This premise is generally correct. When expression (10) is assumed, expression (11) is generated.

$$L(n)=L'(n) \tag{10}$$

$$h5(n)=hL(n) \times h1(n)+hR(n) \times h3(n) \tag{11}$$

Similarly, when expression (12) is assumed, expression (13) is generated.

$$R(n)=R'(n) \tag{12}$$

$$h6(n)=hL(n) \times h2(n)+hR(n) \times h4(n) \tag{13}$$

In order that the listener 2010 can hear prescribed sound from the right and forward of the listener 2010 where the speaker which the virtual speaker 2009 is assumed to exist, the values of hL(n) and hR(n) are determined so as to fulfill the expressions (11) and (13). For example, when the expressions (11) and (13) are written by the representation of frequency domain, the convolution operation is replaced by multiplication, and the other elements are replaced by transfer functions obtained by performing FFT of the values of impulse responses. Since the transfer function other than those of the FIR filter, the transfer function of the FIR filter is obtained by these two expressions.

In the case where a signal S(n) and convoluted hL(n) are output from the speaker 2008-1 and a signal S(n) and convoluted hR(n) are output from the speaker 2008-2 using hL(n) and hR(n) determined in this manner, the listener 2010 feels the sound being output from the right and forward where the virtual speaker 2009 is assumed to exist. FIG. 24 shows a structure of an FIR filter. The FIR filter shown in FIG. 24 localizes a sound image at an arbitrary position by the above-described signal procesing.

However, the above-described structure requires an FIR filter to be provided for each of the channels and a convolution operation to be performed many times, in order to provide an actual head-related transfer function. When the number of filters and/or the number of channels increase, the load imposed on the operation rate and the hardware becomes excessively large for practical use. The number of taps of the FIR filters can be reduced for practical use, but a certain number of taps are necessary to maintain the precision of the head-related transfer function. When the number of taps is excessively small, the sound image is blurred or the sound quality deteriorates.

A system for reproducing a medium including video data and audio data in a compressed format, such as a DVD (digital video disk). In such a system, the video and audio input data are divided into a plurality of packets and then multiplexed. Video and audio are reproduced by separating the video data (also referred to as the "video signal") and the audio data (also referred to as the "audio signal") from such input data and decoding such separated data. A conventional system will be described using a DVD as an example.

Video data is compressed by MPEG2 and includes three types of picture data, i.e., I picture, P picture and B picture. In the NTSC standard, each picture is recorded at the unit of ⅙₀ sec. in the case of a field structure and at the unit of ⅓₀ sec. in the came of a frame structure.

Exemplary audio standards used in the DVD include AC-3 and MPEG-2BC. In such standards, one frame includes 1536 audio samples, with the sampling frequency of 48 kHz. The data is recorded in a DVD in the state of being compressed at the unit of 32 ms.

In order to reproduce audio and video data which are recorded by different time units, synchronization of the data is required. In the case of a DVD, video and audio data are synchronized for output under the control of a program time stamp (PTS) attached to each packet, In other words, the time for reproducing the video data and the time for reproducing the video data are independently adjusted.

High-rate reproduction performed in such a system will be described. In general, the following methods are used for reproducing video data at a high rate.

(1-1) Reproduce only I picture (reproduction rate: about 6 to 7 times normal)

(1-2) Reproduce only I and P pictures (reproduction rate: about 1.5 to 3 times normal)

(1-3) Reproduce I and P pictures and a part of B picture (reproduction rate; about 1 to 1.5 times normal)

Since the number of each type of pictures varies in accordance with the method of encoding, bit rate and the like, the reproduction rate for high-rate reproduction is not constant and possibly becomes as diverse as about 1.5 to about 7 times by either method (1-1), (1-2) or (1-3).

The following methods are used for reproducing audio data at a high rate.

(2-1) Thin out output data and smooth non-continuous points.

(2-2) Delete silent parts.

According to the method (2-1), the reproduction rate is fixed. Therefore, when the reproduction rate of the video data is higher than the reproduction rate of the audio data, the sound continues, but the video cannot be reproduced at a higher rate than that of the audio data. When the reproduction rate of the video data is lower than the reproduction rate of the audio data, the sound does not continue.

The method (2-2) is difficult to practically use due to the problems that it is difficult to raise the reproduction rate of the audio data up to the highest reproduction rate of the video data (maximum rate), and that the processing for detecting a silent part requires a heavy load.

Generally, high-rate reproduction of a recording medium is mostly used by the consumer in order to search for a scene. In most of the DVDs which are conventionally available, only the video data is reproduced for high-rate reproduction without outputting audio data.

SUMMARY OF THE INVENTION

According to an aspect of the invention, an audio decoding apparatus is provided for receiving a bit stream on a block-by-block basis, decoding one block of the bit stream to form decoded audio data for a plurality of channels, and storing the decoded audio data for each of the plurality of channels in a memory device, thereby down-mixing the decoded audio data for each of the plurality of channels. The audio decoding apparatus includes an operation section for down-mixing the decoded audio data for each of the plurality of channels corresponding to a first block of the bit stream in the memory section while a second block of the bit stream is decoded.

In one embodiment of the invention, the second block of the bit stream is converted into the decoded audio data for each channel by a plurality of separate decoding operations, and the operation section divides the decoded audio data for each channel corresponding to the first block of the bit stream in the memory section and down-mixes the divided decoded audio data sequentially each time the decoding operation is performed.

In one embodiment of the invention, the second block of the bit stream is converted into the decoded audio data for each channel by repeating a decoding operation by the number of the plurality of channels, and the operation section divides the decoded audio data for each channel corresponding to the first block of the bit stream in the memory section and down-mixes the divided decoded audio data sequentially each time the decoding operation is performed.

In one embodiment of the invention, the decoded audio data obtained as a result of down-mixing is stored in the memory section and then output.

According to another aspect of the invention, an audio decoding apparatus is provided for decoding a bit stream which is obtained as a result of converting each of audio signals in a plurality of channels into frequency domain data and encoding the frequency domain data so as to be represented by mantissa sections and exponential sections. The audio decoding apparatus includes a bit stream syntax analyzer for analyzing a syntax of the bit stream and extracting data necessary for decoding from the bit stream; an internal memory section for storing the data necessary for decoding; an exponential section decoder for forming exponential data for a frequency domain corresponding to the audio signal based on the data stored in the internal memory section; a mantissa data bit allocator for calculating a mantissa data bit allocation amount from the exponential data output from the exponential section decoder, a mantissa section decoder for forming mantissa data for the frequency domain corresponding to the audio signal based on the data bit allocation amount output from the mantissa data bit allocator; an IMDCT section for performing frequency domain-time domain conversion of the exponential data formed by the exponential section decoder and the mantissa data formed by the mantissa section decoder so as to form decoded audio data for each of the plurality of channels; and a down-mix operator for forming PCM data from the decoded audio data for each of the plurality of channels and processing the PCM data by interleaving. The bit stream, decoded audio data and the PCM data are stored in an external memory section. The bit stream is received by a block-by-block basis, and while a second block of the bit stream is decoded, the PCM data is formed from the decoded audio data for each of the plurality of channels corresponding to a first block of the bit stream stored in the external memory section.

In one embodiment of the invention, the external memory section includes a PCM data storage area and a decoded audio data storage area corresponding to each of the plurality of channels. The PCM data storage area has a sufficient capacity to store the PCM data corresponding to one block of the bit stream including an amount of data of a plurality of channels×a plurality of pieces of data. The decoded audio data storage area includes a plurality of areas respectively corresponding to the plurality of channels, and each of the plurality of areas has a sufficient capacity to store the decoded audio data corresponding to more than one block of the bit stream.

In one embodiment of the invention, the audio decoding apparatus further includes a decoded audio data write pointer corresponding to each of the plurality of channels for writing the decoded audio data into the external memory section: a decoded audio data read pointer corresponding to each of the plurality of channels for reading the decoded audio data from the external memory section; a PCM write pointer for writing the PCM data into the external memory section; and final address data in the decoded audio data storage area and decoded audio data pointer return data, both corresponding to each of the plurality of channels, for updating the decoded audio write pointer and the decoded audio read pointer. The decoded audio data writer pointer and the decoded audio data read pointer are independently updated and circulated in an area allocated for the respectively channel.

In one embodiment of the invention, the down-mix operator processes the decoded audio data for each of the plurality of channels by N number of separate operations.

According to still another aspect of the invention, a signal processing device is provided for receiving a bit stream including encoded data for a plurality of channels, decoding encoded data which is included in at least one of the plurality of channels and is shared by the channels to form common decoded data, decoding channel encoded data inherent to each of the plurality of channels on a channel-by-channel basis to form channel decoded data, and coupling the channel decoded data and the common decoded data so as to form decoded data for each of the plurality of channels. The signal processing device includes a memory section for storing the common decoded data formed as a result of decoding the common encoded data; and a control section for reading the common decoded data from the memory section each time the channel encoded data is decoded to form the channel decoded data, and causing coupling of the common decoded data and the channel decoded data.

According to still another aspect of the invention, a signal processing device is provided for receiving a bit stream including encoded data for a plurality of channels, decoding encoded data which is included in at least one of the plurality of channels and is shared by the channels to form common decoded data, decoding channel encoded data inherent to each of the plurality of channels on a channel-by-channel basis to form channel decoded data, and coupling the channel decoded data and the common decoded data so as to form decoded data for each of the plurality of channels. The signal processing device includes a memory section for storing intermediate data obtained while decoding the common encoded data; and a control section for reading the intermediate data from the memory section each time the channel encoded data is decoded to form the channel decoded data, forming the common decoded data from the intermediate data, and causing coupling of the common decoded data and the channel decoded data.

According to still another aspect of the invention, a signal processing device is provided for decoding a bit stream which is obtained as a result of converting each of audio signals in a plurality of channels into frequency domain data and encoding the frequency domain data so as to be represented by mantissa sections and exponential sections, decoding high frequency band encoded data which is included in at least one of the plurality of channels and is shared by the channels to form high frequency band decoded data, decoding low frequency band encoded data for each of the plurality of channels to form low band decoded data, coupling the high frequency band decoded data and the high frequency band so as to form decoded data for each of the plurality of channels. The signal processing device includes a bit stream syntax analyzer for analyzing a syntax of the bit stream and extracting data necessary for decoding from the bit stream; an internal memory section for storing the data necessary for decoding; an exponential section decoder for forming exponential data for a frequency domain corresponding to the audio signal based on the data stored in the internal memory section; a mantissa data bit allocator for calculating a mantissa data bit allocation amount from the exponential data output from the exponential section decoder; a mantissa section decoder for forming mantissa data for the frequency domain corresponding to the audio signal based on the data bit allocation amount output from the mantissa data bit allocator; and a data forming section for synthesizing the high frequency band decoded data and the low frequency band decoded data for each of the plurality of channels based on the exponential data formed by the exponential section decoder and the mantissa data formed by the mantissa section decoder, coupling the low frequency band decoded data for each of the plurality of channels and the high frequency band decoded data, and performing frequency domain-time domain conversion of the resultant data so as to form decoded data for each of the plurality of channels. The high frequency band decoded data is stored in the internal memory section, and for forming the low frequency band decoded data for each of the plurality of channels, the high frequency band decoded data is read from the internal memory section and the low frequency band decoded data is coupled with the high frequency band decoded data.

In one embodiment of the invention, the high frequency band decoded data is compressed and stored in the internal memory section.

According to still another aspect of the invention, a signal processing device is provided for decoding a bit stream which is obtained as a result of converting each of audio signals in a plurality of channels into frequency domain data and encoding the frequency domain data so as to be represented by mantissa sections and exponential sections, decoding high frequency band encoded data which is included in at least one of the plurality of channels and is shared by the channels to form high frequency band decoded data, decoding low frequency band encoded data for each of the plurality of channels to form low band decoded data, coupling the high frequency band decoded data and the high frequency band so as to form decoded data for each of the plurality of channels. The signal processing includes a bit stream syntax analyzer for analyzing a syntax of the bit stream and extracting data necessary for decoding from the bit stream; an internal memory section for storing the data necessary for decoding; an exponential section decoder for forming exponential data for a frequency domain corresponding to the audio signal based on the data stored in the internal memory section; a mantissa data bit allocator for calculating a mantissa data bit allocation amount from the exponential data output from the exponential section decoder; a mantissa section decoder for forming mantissa data for the frequency domain corresponding to the audio signal based on the data bit allocation amount output from the mantissa data bit allocator; and a data forming section for synthesizing the high frequency band decoded data and the low frequency band decoded data for each of the plurality of channels based on the exponential data formed by the exponential section decoder and the mantissa data formed by the mantissa section decoder, coupling the low frequency band decoded data for each of the plurality of channels and the high frequency band decoded data, and performing frequency domain-time domain conversion of the resultant data so as to form decoded data for each of the plurality of channels. Intermediate data obtained while decoding the high frequency band encoded data is stored in the internal memory section, and for forming the low frequency band decoded data for each of the plurality of channels, the intermediate data is read from the internal memory section, the high frequency band decoded data is formed from the intermediate data, and the low frequency band decoded data is coupled with the high frequency band decoded data.

In one embodiment of the invention, the high frequency band decoded data is compressed and stored in the internal memory section.

In one embodiment of the invention, the intermediate data is exponential data output from the exponential section decoder.

In one embodiment of the invention, the intermediate data is a mantissa data bit allocation amount output from the mantissa data bit allocator.

In one embodiment of the invention, the intermediate data is mantissa data output from the mantissa section decoder.

According to still another aspect of the invention, a sound image localization device includes a signal source for outputting an audio signal; a signal divider for dividing the audio signal output from the signal source into two digital audio signals respectively for two channels; a first signal processor for receiving one of the two digital signals and processing the digital signal so as to localize a virtual sound image using a filter having a first frequency characteristic; a first D/A converter for converting the digital signal output from the first signal processor into an analog signal; a second D/A converter for receiving the other digital signal obtained from the signal divider and converting the signal into an analog signal; a first control speaker for outputting the audio signal obtained by the first D/A converter to a prescribed space area; and a second control speaker for outputting the audio signal obtained by the second D/A converter to a prescribed space area.

In one embodiment of the invention, the first frequency characteristic of the first signal processor is determined so that sounds reaching from the first and second control speakers to left and right ears of a listener have a difference which is identical with a difference between sounds reaching from the virtual sound image to the left and right ears of the listener.

According to still another aspect of the invention, a sound image localization device includes a signal source for outputting an audio signal; a second signal processor for processing the audio signal output from the signal source using a filter having a second frequency characteristic; a signal divider for dividing the audio signal output from the second signal processor into two digital audio signals respectively for two channels; a first signal processor for receiving one of the two digital signals and processing the digital signal so as to localize a virtual sound image using a filter having a first frequency characteristic; a first D/A converter for converting the digital signal output from the first signal processor into an analog signal; a second D/A converter for receiving the other digital signal obtained from the signal divider and converting the signal into an analog signal; a first control speaker for outputting the audio signal obtained by the first D/A converter to a prescribed space area; and a second control speaker for outputting the audio signal obtained by the second D/A converter to a prescribed space area.

In one embodiment of the invention, the first frequency characteristic of the first signal processor is determined so that sounds reaching from the first and second control speakers to left and right ears of a listener have a difference which is identical with a difference between sounds reaching from the virtual sound image to the left and right ears of the listener. The second frequency characteristic of the second signal processor corrects at least one of a sound quality, a sound volume change and a phase characteristic of the first frequency characteristic of the first signal processor.

According to still another aspect of the invention, a sound image localization device includes a signal source for outputting an audio signal for a frequency domain; a third signal processor for processing the audio signal for the frequency domain output from the signal source using a filter having a third frequency characteristic; a frequency domain-time domain converter for converting the audio signal for the frequency domain output from the third signal processor into an audio signal in a time domain; a signal divider for dividing the audio signal output from the frequency domain-time domain converter into two digital audio signals respectively for two channels; a first signal processor for receiving one of the two digital signals and processing the digital signal so as to localize a virtual sound image using a filter having a first frequency characteristic; a first D/A converter for converting the digital signal output from the first signal processor into an analog signal; a second D/A converter for receiving the other digital signal obtained from the signal divider and converting the signal into an analog signal; a first control speaker for outputting the audio signal obtained by the first D/A converter to a prescribed space area; and a second control speaker for outputting the audio signal obtained by the second D/A converter to a prescribed space area.

In one embodiment of the invention, the first frequency characteristic of the first signal processor is determined so that sounds reaching from the first and second control speakers to left and right ears of a listener have a difference which is identical with a difference between sounds reaching from the virtual sound image to the left and right ears of the listener. The third frequency characteristic of the second signal processor corrects at least one of a sound quality, a sound volume change and a phase characteristic of the first frequency characteristic of the first signal processor on the frequency domain.

According to still another aspect of the invention, a sound image localization device includes a signal source for outputting an audio signal for a frequency domain; a third signal processor for processing the audio signal for the frequency domain output from the signal source using a filter having a third frequency characteristic; a frequency domain-time domain converter for converting the audio signal for the frequency domain output from the third signal processor into an audio signal in a time domain; a second signal processor for processing the audio signal output from the frequency domain-time domain converter using a filter having a second frequency characteristic; a signal divider for dividing the audio signal output from the second signal processor into two digital audio signals respectively for two channels; a first signal processor for receiving one of the two digital signals and processing the digital signal so as to localize a virtual sound image using a filter having a first frequency characteristic; a first D/A converter for converting the digital signal output from the first signal processor into an analog signal; a second D/A converter for receiving the other digital signal obtained from the signal divider and converting the signal into an analog signal; a first control speaker for outputting the audio signal obtained by the first D/A converter to a prescribed space area; and a second control speaker for outputting the audio signal obtained by the second D/A converter to a prescribed space area.

In one embodiment of the invention, the first frequency characteristic of the first signal processor is determined so that sounds reaching from the first and second control speakers to left and right ears of a listener have a difference which is identical with a difference between sounds reaching from the virtual sound image to the left and right ears of the listener. A coupled frequency characteristic of the third frequency characteristic of the third signal processor and the second frequency characteristic of the second signal processor corrects at least one of a sound quality, a sound volume change and a phase characteristic of the first frequency characteristic of the first signal processor on the frequency domain.

According to still another aspect of the invention, a sound image control method is provided for localizing a sound image at a position of a virtual sound image corresponding to an audio signal from a signal source, using a first control speaker and a second control speaker respectively provided in a space left to the listener and a space to the right of the listener. The method includes the steps of providing a signal processor for processing a signal to be input to the first control speaker; and obtaining a frequency characteristic G(n) for providing a state in which sounds reaching from the first and second control speakers to the left and right ears of the listener have a difference which is identical with a difference between sounds reaching from the virtual sound image to the left and right ears of the listener, and causing the signal processor to have the frequency characteristic G(n) so as to localize the audio signal at the position of the virtual sound image.

In one embodiment of the invention, the frequency characteristic G(n) is obtained by the following steps:

where the impulse response between the first control speaker and the left ear of the listener is h1(t), the impulse response between the first control speaker and the right ear of the listener is h2(t), the impulse response between the second control speaker and the left ear of the listener is h3(t), the impulse response between the second control speaker and the right ear of the listener is h4(t), a virtual sound image localized in an arbitrary direction is an virtual speaker, the impulse response between the virtual speaker and the left ear of the listener is h5(t), and the impulse response between the virtual speaker and the right ear of the listener is h6(t), (1) obtaining a sound reaching the left ear of the listener by L(t)=S(t)*h5(t) and obtaining a sound reaching the right ear of the listener by R(t)=S(t)*h6(t), where an audio signal S(t) is output from the virtual speaker from a signal source;

(2) converting signals L(t), R(t), h5(t), h6(t), and S(t) on a time axis into discrete signals L(n), R(n), h5(n), h6(n), and S(n);

(3) obtaining L(n)=S(n)×h5(n) and R(n)=S(n)×h6(n);

(4) calculating the sound output from the first control speaker and reaching the left ear of the listener by L'(t)=S(t)*hL(t)*h1(t)+S(t)*hR(t)*h3(t);

(5) calculating the sound output from the first control speaker and reaching the right ear of the listener by R'(t)=S(t)*hL(t)*h2(t)+S(t)*hR(t)*h4(t);

(6) converting L'(t) into L'(n)=S(n)×hL(n)×h1(n)+S(n)×hR(n)×h3(n);

(7) converting R'(t) into R'(n)=S(n)×hL(n)×h2(n)+S(n)×hR(n)×h4(n);

(8) L(n)=L'(n) is assumed as h5(n)=hL(n)×h1(n)+hR(n)×h3(n);

(9) R(n)=R'(n) is assumed as h6(n)=hL(n)×h2(n)+hR(n)×h4(n); and

(10) hL(n) and hR(n) are calculated from steps (8) and (9) and obtaining G(n) based on G(n)=hL(n)/hR(n).

According to still another aspect of the invention an audio signal processor includes a control section for indicating a reproduction rate; an input signal processor for processing an input signal obtained as a result of multiplexing an audio signal and a video signal and outputting an audio signal and a video signal; an audio stream buffer for temporarily storing the audio signal output by the input signal processor; a video stream buffer for temporarily storing the video signal output by the input signal processor; an audio processor for extracting the audio signal from the audio stream buffer and processing the audio signal so as to form an output audio signal; a video processor for extracting the video signal from the video stream buffer and processing the video signal, and performing high-rate reproduction of the video signal in response to an instruction from the control section to form an output video signal; and a buffer controller for supervising a state of the audio stream buffer and controlling data input and output so that the audio processor performs the high-rate reproduction of the audio signal when a free capacity of the audio stream buffer becomes smaller than a prescribed level.

According to still another aspect of the invention, an audio signal processor includes a control section for indicating a reproduction rate; an input signal processor for processing an input signal obtained as a result of multiplexing an audio signal and a video signal and outputting an audio signal and a video signal; an audio stream buffer for temporarily storing the audio signal output by the input signal processor; a video stream buffer for temporarily storing the video signal output by the input signal processor; an audio processor for extracting the audio signal from the audio stream buffer and processing the audio signal so as to form an output audio signal; a video processor for extracting the video signal from the video stream buffer and processing the video signal, and performing high-rate reproduction of the video signal in response to an instruction from the control section to form an output video signal; and a buffer controller for supervising a state of the video stream buffer and controlling data input and output so that the audio processor performs the high-rate reproduction of the audio signal when a remaining data amount in the video stream buffer becomes smaller than a prescribed level.

According to still another aspect of the invention, an audio signal processor includes a control section for indicating a reproduction rate; an input signal processor for processing an input signal obtained as a result of multiplexing an audio signal and a video signal and outputting an audio signal and a video signal; an audio stream buffer for temporarily storing the audio signal output by the input signal processor; a video stream buffer for temporarily storing the video signal output by the input signal processor; an audio processor for extracting the audio signal from the audio stream buffer and processing the audio signal so as to form an output audio signal; a video processor for extracting the video signal from the video stream buffer and processing the video signal, and performing high-rate reproduction of the video signal in response to an instruction from the control section to form an output video signal; and a buffer controller for supervising a state of the audio stream buffer and the video stream buffer and controlling data input and output so that the audio processor performs the high-rate reproduction of the audio signal when a free capacity of the audio stream buffer or a remaining data amount in the video stream buffer becomes smaller than a prescribed level.

In one embodiment of the invention, the method for performing high-rate reproduction of an audio signal in the audio signal processor includes the step of thinning out the audio signal by intermittently flushing a content in the audio stream buffer to reduce an amount of audio data to be reproduced while performing high-rate reproduction of the video signal.

In one embodiment of the invention, the method for performing high-rate reproduction of an audio signal in the audio signal processor includes the step of stopping, for a prescribed time period, transfer of the audio signal from the input signal processor to the audio stream buffer to reduce an amount of audio data to be reproduced while performing high-rate reproduction of the video signal.

In one embodiment of the invention, the method for performing high-rate reproduction of an audio signal in the audio signal processor includes the step of skipping a prescribed amount of data input from the audio stream buffer to the audio processor to reduce an amount of audio data to be reproduced while performing high-rate reproduction of the video signal.

In one embodiment of the invention, the method for performing high-rate reproduction of an audio signal in the audio signal processor includes the step of stopping, for a prescribed time period, an output of the audio signal from the audio processor to reduce an amount of audio data to be reproduced while performing high-rate reproduction of the video signal.

Thus, the invention described herein makes possible the advantages of (1) providing an audio decoding apparatus for realizing efficient use of a memory bus; (2) providing a signal processing device for alleviating decoding processing of encoded data which is shared by all channels without requiring a memory device to store encoded data for all channels until the decoding processing is completed; (3) providing a sound image localization device for providing, by a smaller amount of operation, a similar level of feeling of localization to that obtained when a larger number of taps of digital filters are used, and a method for controlling the sound image using such a sound image localization device; and (4) an audio signal processing device for simplifying signal processing and reproducing audio data in accordance with the reproduction rate of the video data with less sound disconnection, and a method for performing high-rate reproduction of audio data using such an audio signal processing device.

These and other advantages of the present invention will become apparent to those skilled in the art upon reading and understanding the following detailed description with reference to the accompanying figures.

BRIEF DESCRIPTION OF THE DRAWINGS

FIG. 4 shows a rule for accessing the external memory device by the audio decoding apparatus shown in FIG. 1;

DESCRIPTION OF THE PREFERRED EMBODIMENTS

Hereinafter, the present invention will be described by way of illustrative examples with reference to the accompanying drawings.

(Example 1)

An audio decoding apparatus 1100 in a first example according to the present invention will be described with reference to FIGS. 1, 2, 3, 4 and 5. The audio decoding apparatus 1100 according to the present invention primarily decodes an input bit stream and performs IMDCT (inverted modified discrete cosine transform) on the decoded data.

Figure 2:
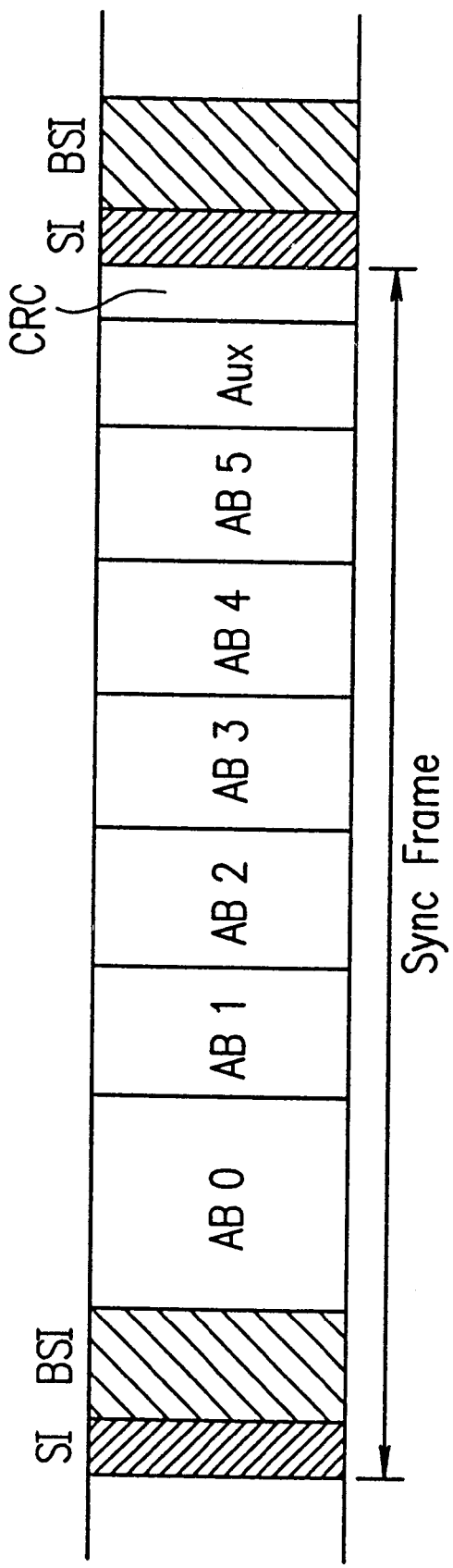
FIG. 2 shows a structure of a bit stream usable in the audio decoding apparatus shown in FIG. 1.

FIG. 2 shows a structure of a bit stream which is input to and decoded by the audio decoding apparatus 1100. The bit stream includes a synchronization signal SYNC, an error check signal CRC, a system information signal SI, a stream information signal BS1, and audio blocks AB0, AB1, AB2, AB3, AB4 and AB5 that are arranged after the signals.

Each of the audio blocks AB0, AB1, AB2, AB3, AB4 and AB5 includes encoded audio data for a maximum of 6 channels.

The channels include a normal channel, which includes exponential sections Exp and mantissa sections Mant for a maximum of 50 sub-bands (max. 253 exponential sections and 253 mantissa sections) as encoded audio data.

The normal channel performs as follows. The exponential sections Exp and the mantissa sections Mant for the maximum of 50 sub-bands included in the encoded audio data for one channel are decoded to form exponential data and mantissa data for a frequency domain. Decoded data for the frequency domain is formed based on the exponential data and mantissa data. The decoded data for the frequency domain is processed by IMDCT to convert the frequency domain data into time domain data, thereby forming decoded audio data for a time domain.

The channels include a basic channel, which includes a high frequency band, a low frequency band and a coupling data cpl. The exponential sections Exp and the mantissa sections Mant for the maximum of 50 sub-bands are divided into sections corresponding to the high frequency band and sections corresponding to the low frequency band by the coupling data cpl. The exponential sections Exp and the mantissa sections Mant corresponding to the high frequency band are extracted from the encoded audio data for the basic channel and also supplied to the encoded audio data in a plurality of other channels.

The channels include a coupling channel, which includes a low frequency band previously separated from the high frequency band. The coupling channel includes the exponential sections Exp and the mantissa sections Mant corresponding to the low frequency band. The coupling channel performs as follows. The exponential sections Exp and mantissa sections Mant corresponding to the low frequency band are decoded to form exponential data and mantissa data for a low frequency band. The frequency domain data is converted into time domain data to form decoded audio data in the time domain. Decoded audio data for a high frequency band is formed based on the exponential sections Exp and the mantissa sections Mant corresponding to the high frequency band of the basic channel. The decoded audio data for the low frequency band and the decoded audio data for the high frequency band are coupled together to form decoded audio data for one channel.

The channels include a low band channel, which does not originally have a high frequency band and includes a low frequency band. The low band channel performs as follows. The exponential sections Exp and the mantissa sections Mant corresponding to the low frequency band are decoded to form exponential data and mantissa data for the low frequency band. The frequency domain data is converted into time domain data. Thus, decoded audio data for one channel is formed.

In this specification, data for a high frequency band is also referred to as a "high frequency band data", and data for a low frequency band is also referred to as a "low frequency band data".

Figure 1:
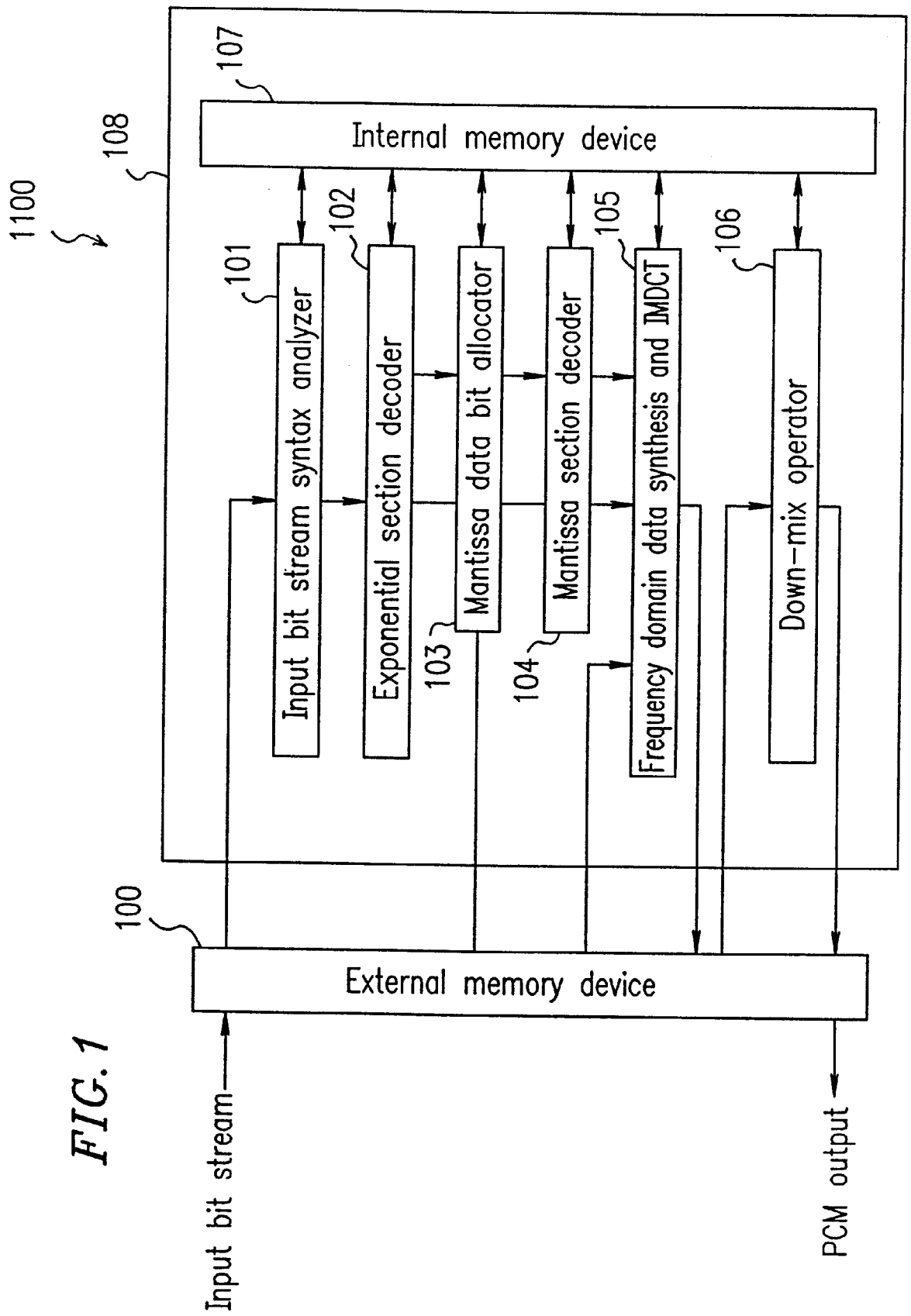
FIG. 1 is a block diagram illustrating a structure of an audio decoding apparatus in a first example according to the present invention.

FIG. 1 is a block diagram of the audio decoding apparatus 1100 in the first example. The audio decoding apparatus 1100 includes an integrated semiconductor device 108. The integrated semiconductor device 108 includes an input bit stream syntax analyzer 101, an exponential section decoder 102, a mantissa data bit allocator 103, a mantissa section decoder 104, a frequency domain data synthesis and IMDCT device 105, a down-mix operator 106, and an internal memory device 107. An integrated semiconductor device 108 includes the above-mentioned elements except for the external memory device 100. The integrated semiconductor device 108 exchanges data with an external memory device 100.

An input bit stream is input to the external memory device 100 and then sent to the input bit stream syntax analyzer 101. The input bit stream syntax analyzer 101 analyzes the syntax of the bit stream and extracts exponential sections Exp for a prescribed channel from one block and outputs the exponential sections Exp to the exponential section decoder 102.

The exponential section decoder 102 forms exponential data for a frequency domain based on the exponential sections Exp and outputs the exponential data for the frequency domain to the mantissa data bit allocator 103 and the frequency domain data synthesis and IMDCT device 105.

The mantissa data bit allocator 103 calculates a mantissa data bit allocation amount (the amount of mantissa data bit allocated for each sub-band) based on the exponential data for the frequency domain and the mantissa sections Mant for a prescribed channel of one block read from the bit stream in the external memory device 100. Then, mantissa data bit allocator 103 outputs the mantissa data bit allocation amount to the mantissa section decoder 104.

The mantissa section decoder 104 forms mantissa data for the frequency domain from the mantissa data bit allocation amount, and outputs the mantissa data to the frequency domain data synthesis and IMDCT device 105.

The frequency domain data synthesis and IMDCT device 105 forms decoded data for the frequency domain based on the exponential data and the mantissa data for the frequency domain, and converts the frequency domain data into time domain data. Thus, decoded audio data for the time domain is formed and stored in the external memory device 100.

The decoded audio data for the time domain is obtained on a channel-by-channel basis. The decoded audio data in the time domain for each of the channels is stored in the external memory device 100 in the following manner.

For the normal channel, as described above, the exponential sections Exp and the mantiesa sections Mant for the maximum of 50 sub-bands are decoded to form the frequency domain data. The frequency domain data is converted into time domain data. Thus, decoded audio data is formed.

For the basic channel, the exponential sections Exp and the mantissa sections Mant are decoded to form frequency domain data. The frequency domain data is converted into time domain data. Thus, decoded audio data is formed.

For the coupling channel previously separated from the high frequency band, the exponential sections Exp and the mantissa sections Mant corresponding to the low frequency band included in the coupling channel are decoded, and also the exponential sections Exp and the mantissa sections Mant corresponding to the high frequency band included in the basic channel are decoded. Based on the decoded data, the data for all the frequency bands is formed. The frequency domain data is converted into time domain data. Thus, decoded audio data is formed.

For the low band channel which does not originally have a high frequency band, the exponential sections Exp and the mantissa sections Mant corresponding to the low frequency band included in the low band channels are decoded to form data for the low frequency band. The frequency domain data is converted into time domain data. Thus, decoded audio data is formed.

The down-mix operator 106 forms PCM data from the decoded audio data for each channel in the external memory device 100. The PCM data corresponding to each channel is processed by interleaving to reduce the amount of data in each channel (down-mix). The resultant PCM data is stored and then output from the external memory device 100.

In this example, as described in detail below, the data in the first block is decoded and the decoded audio data for all the channels is stored in the external memory device 100. In the middle of the decoding of the data in a second block, the decoded audio data for each channel in the first block is down-mixed by a plurality of separate operations.

Figure 3:
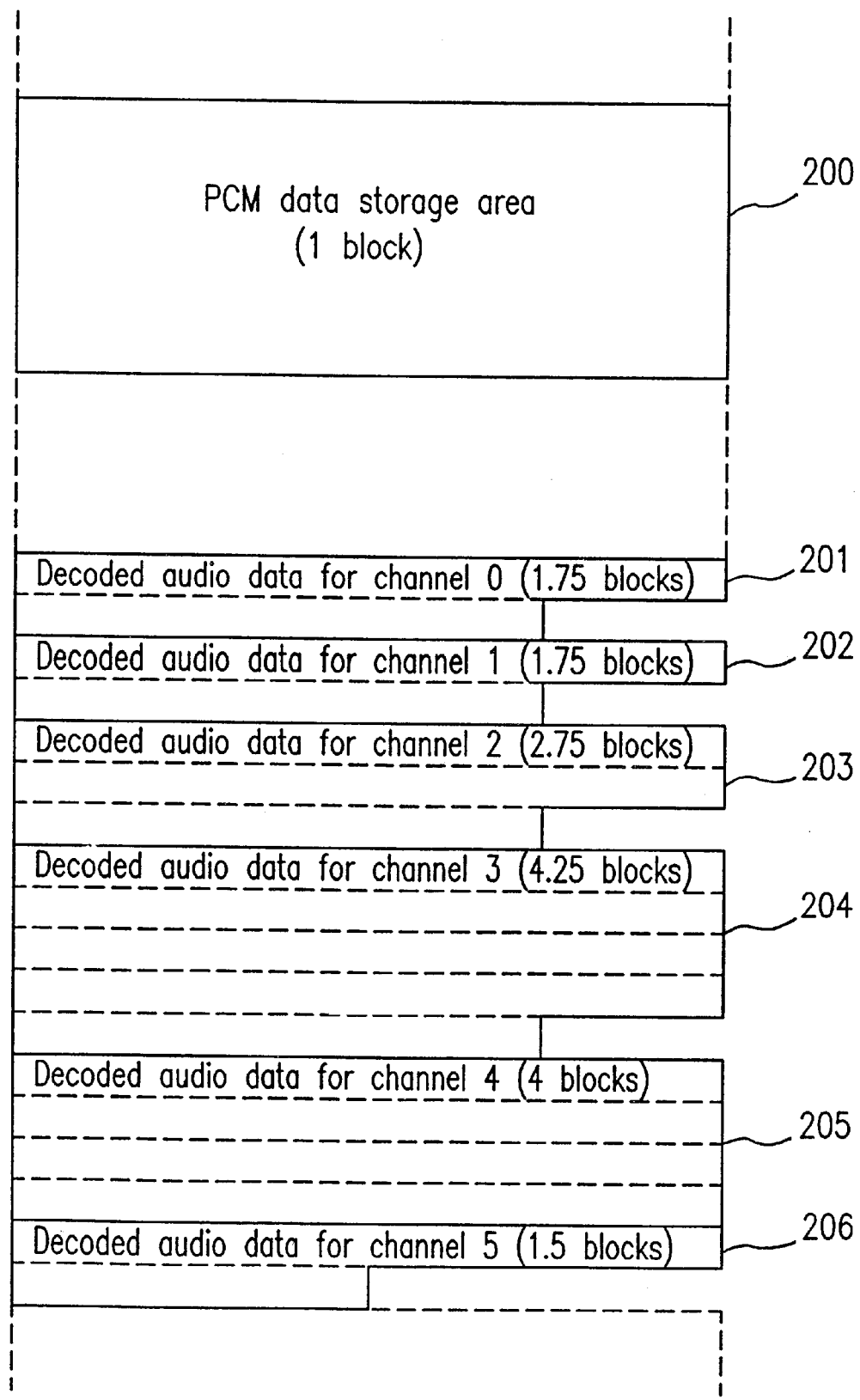
FIG. 3 shows a memory map in an external memory device usable with the audio decoding apparatus shown in FIG. 1.

FIG. 3 is a memory map of the external memory device 100. The external memory device 100 includes an area 200 for storing PCM data for one block, an area 201 for storing decoded audio data for 1.75 blocks for channel 0, an area 202 for storing decoded audio data for 1.75 blocks for channel 1, an area 203 for storing decoded audio data for 2.75 blocks for channel 2, an area 204 for storing decoded audio data for 4.25 blocks for channel 3, an area 205 for storing decoded audio data for 4 blocks for channel 4, and an area 206 for storing decoded audio data for 1.5 blocks for channel 5. The above mentioned areas are not necessarily arranged in this order.

The storage area corresponding to each channel has a minimum capacity required for the decoded audio data for each channel in the first block to be down-mixed by a plurality of separate operations in the middle of the decoding of the data in the second block. The areas corresponding to channels 3 through 5 are set to have a larger capacity since delayed decoded audio data is used in these channels.

The memory map shown in FIG. 3 is one example. The sizes of the areas (i.e., memory capacity) for storing the decoded audio data can be set appropriately for each channel in accordance with the delay amount and other conditions. For example, in the case where the delayed decoded audio data is not used in any of the channels, the capacity of each channel can be minimum possible for carrying out the present invention. Accordingly, channels 0, 1 and 2 are set to have an area of the 1.75 blocks, channel 3 is set to have an area of the 1.25 blocks, channel 4 is set to have an area of the 1.00 blocks, and channel 5 is set to have an area of the 1.5 blocks.

FIG. 4 shows a method for accessing the external memory device 100. Herein, with the premise that the decoded audio data for each channel in one block is down-mixed by four separate operations as an example, the transition of the value of a decoded audio data read pointer for channel 0 is shown. The decoded audio data read pointer is used for reading the decoded audio data.

At the initial setting, the decoded audio data read pointer is set to 0×1000 h, final address data in the decoded audio data storage area is set to 0×1700 h, and a decoded audio data pointer return data is set to 0×700 h. For inputting decoded audio data from the external memory device 100 to the down-mix operator 106 as a pre-processing step before the down-mix operation, an address in the external memory device 100 is determined by referring to the decoded audio data read pointer to perform a reading operation. After the reading, the decoded audio data read pointer is updated for the next reading operation.

The decoded audio data read pointer is updated in the following rule. First, the amount of read data (0×100 h) is added to the decoded audio data read pointer. Next, in order to determine whether or not the decoded audio data read pointer obtained by the addition is in an allocated storage area of the external memory device 100, the decoded audio data read pointer is compared with the final address data (0×1700 h) in the decoded audio data storage area. When the pointer is in the allocated storage area, the decoded audio data read pointer is used as it is. When the pointer is outside the area (i.e., when the decoded audio data read pointer is equal to or larger than the final address data in the allocated storage area), the decoded audio data pointer return data (0×700 h) is subtracted from the decoded audio data read pointer and the resultant value is used. Thus, the decoded audio data read pointer is circulated in the allocated storage area of the external memory device 100.

A decoded audio data write pointer used for writing decoded audio data is updated in a similar rule. First, the amount of write data is added to a decoded audio data write pointer for a corresponding channel. Then, the resultant decoded audio data write pointer is compared with the final address data in the decoded audio data storage area for the corresponding channel. When the decoded audio data write pointer is equal to or larger than the final address data, the decoded audio data pointer return data for the corresponding channel is subtracted from the decoded audio data write pointer. Thus, the decoded audio data write pointer is circulated in the allocated storage area of the external memory device 100.

The initial values of the decoded audio data read pointer and the decoded audio data write pointer are set arbitrarily. An area into which the decoded audio data formed by IMDCT is written can be made different from an area from which the decoded audio data required for the down-mix operation is read.

Regarding the other channels 1 through 5, the decoded audio data read pointer, the decoded audio data write pointer, the final address data in the storage area of the decoded audio data, and the decoded audio data pointer return data are defined. Thus, decoded audio data for channels 1 through 5 is written or read.

Figure 5:
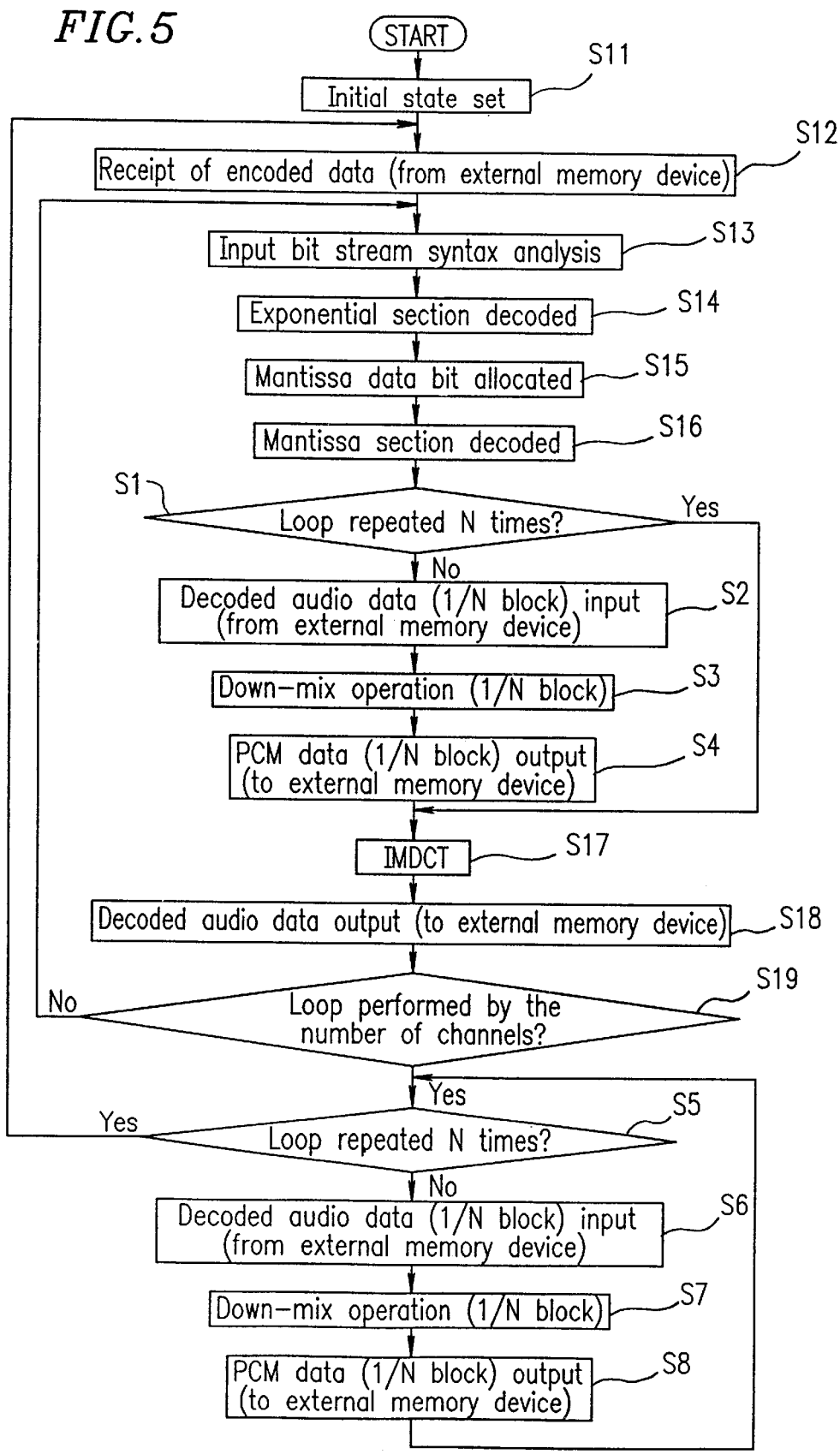
FIG. 5 is a flowchart illustrating an operation of the audio decoding apparatus shown in FIG. 1.
Figure 6:
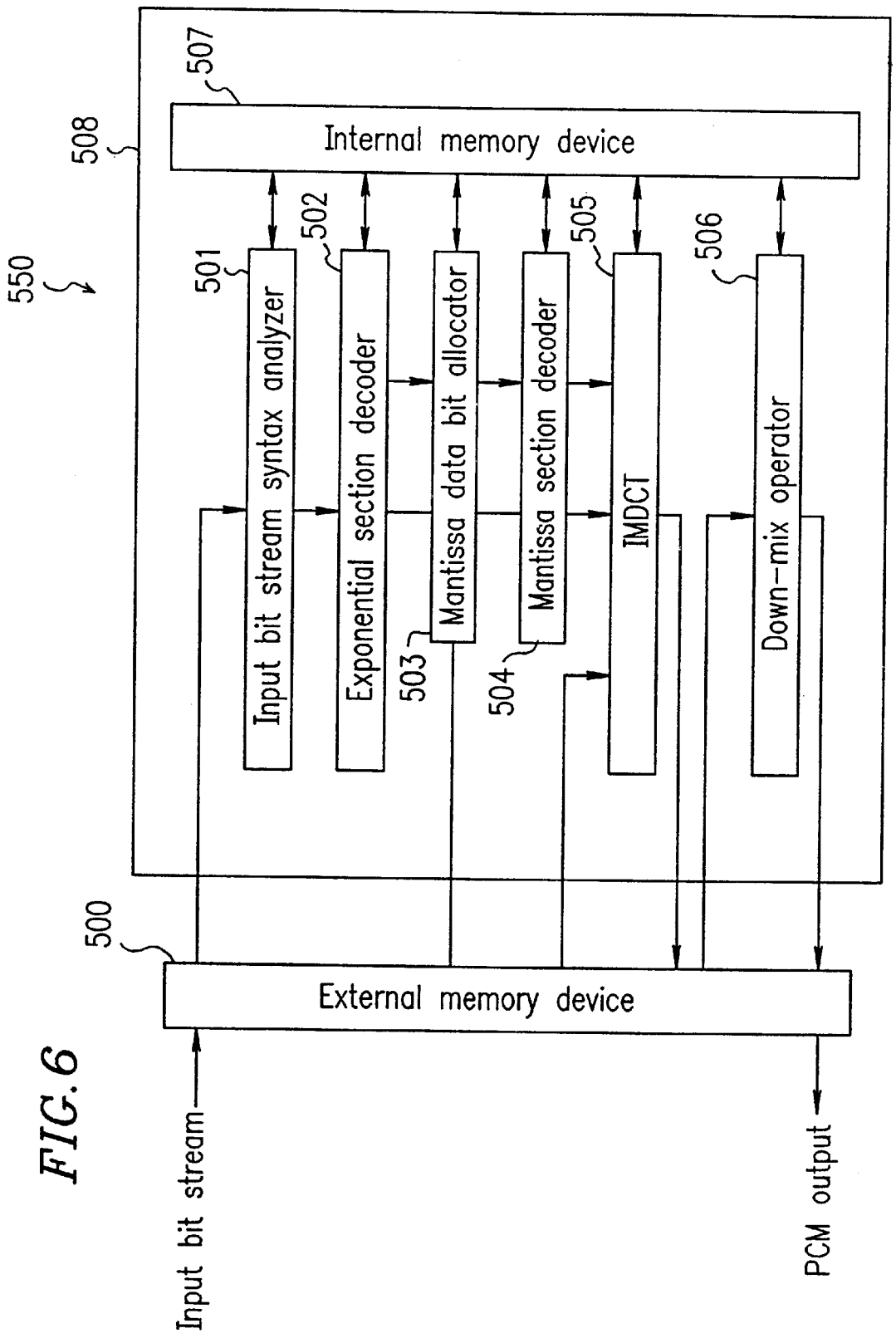
FIG. 6 is a block diagram illustrating a structure of a conventional audio decoding apparatus.
Figure 7:
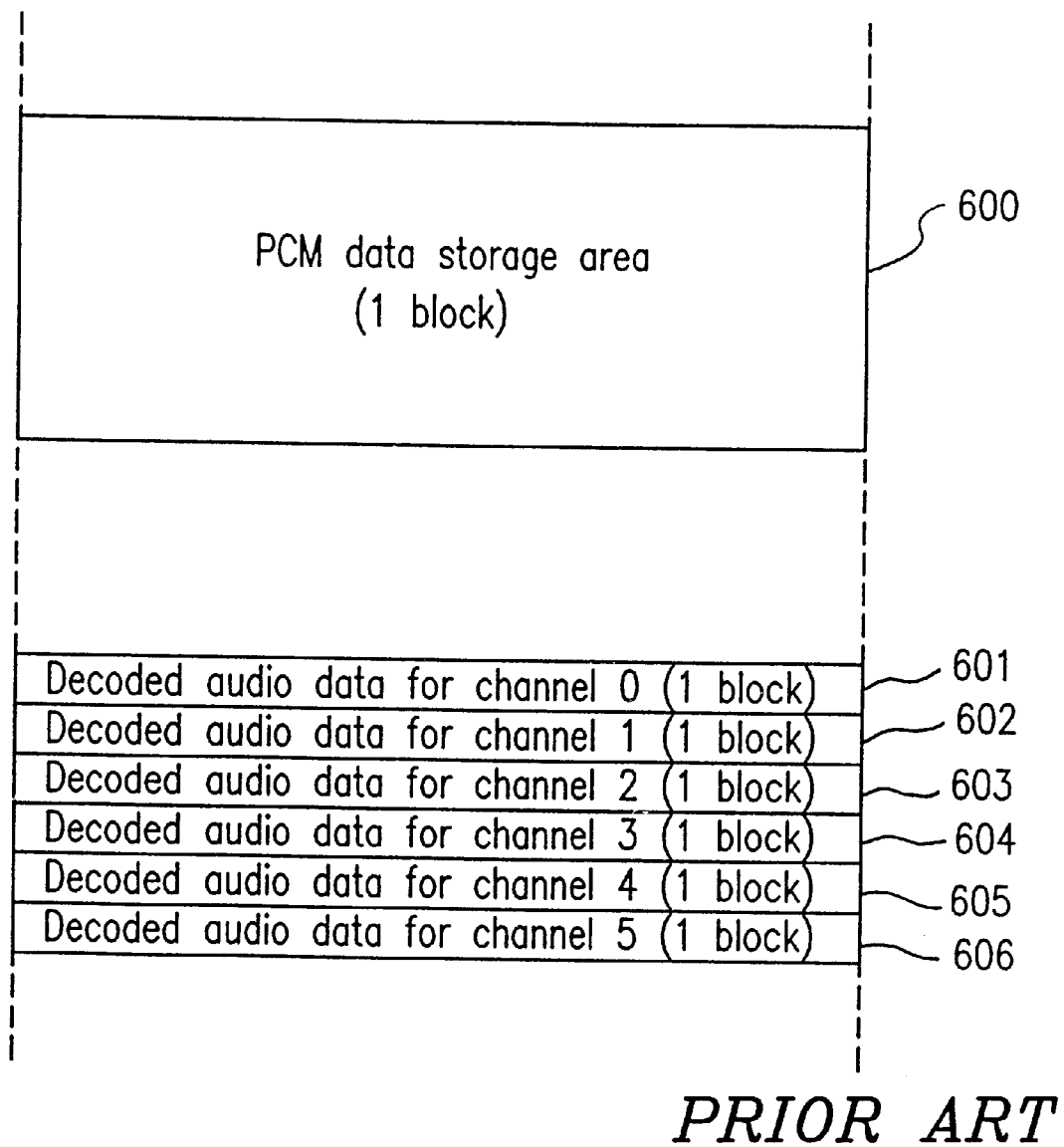
FIG. 7 shows a memory map in an external memory device usable with the conventional audio decoding apparatus shown in FIG. 6.
Figure 8:
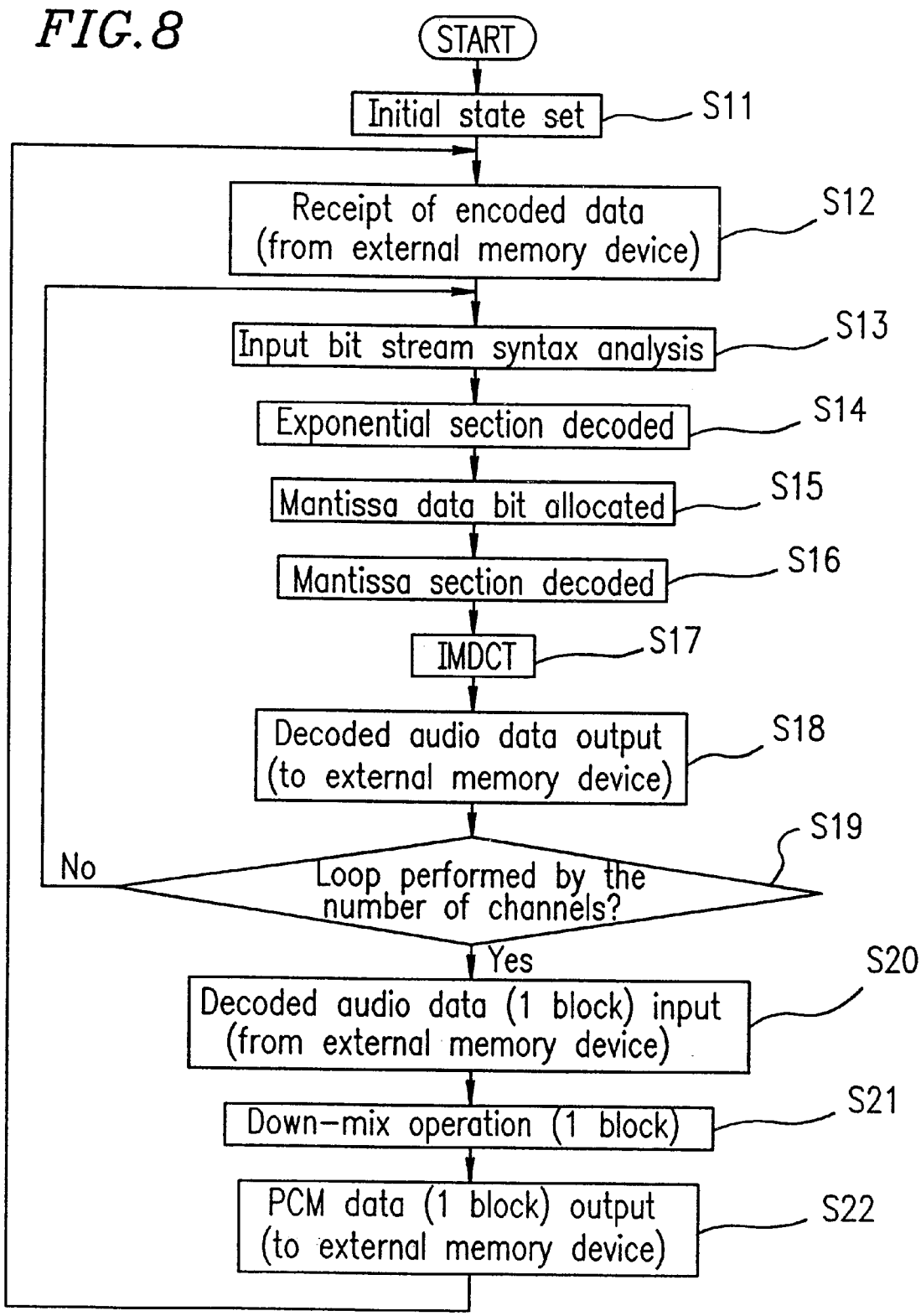
FIG. 8 is a flowchart illustrating an operation of the conventional audio decoding apparatus shown in FIG. 6.

FIG. 5 is a flowchart illustrating a method for controlling decoding of audio data in each block. According to this method, in the middle of the decoding of the first block, decoded audio data is down-mixed by a plurality of separate operations.

First, in step S11, a register (not shown), the internal memory device 107 and the external memory device 100 are initialized. In step S12, the bit stream is input to the input bit stream syntax analyzer 101 (receipt of encoded data).

In step S13, the syntax of the bit stream is analyzed to extract exponential sections Exp for a prescribed channel in the second block. In step S14, exponential data for a frequency domain is formed using the extracted data (decoding of the exponential data). In step S15, a mantissa data bit allocation amount is calculated based on the exponential data for the frequency domain formed in step S14 and mantissa sections Mant of a prescribed channel read from the bit stream. In step S16, mantissa data for the frequency domain is formed using the mantissa data bit allocation amount.

Then, in stop S1, it is determined whether or not decoded audio data for each channel in the first block, which has been converted into time domain data and is stored in the external memory device 100, has been processed by performing the down-mix operation N times. As described above, the down-mix operation is performed by N number of separate operations. In other words, it is determined whether or not the down-mix operation has been completed. When the down-mix operation has not been performed N times in step S1, decoded audio data for each channel in the 1/N block is read from the external memory device 100 in the following manner in step S2. While the decoded audio data is read from the external memory device 100 for each channel referring to the decoded audio data read pointer, the amount of read data is added to the decoded audio data read pointer, and the resultant decoded audio data read pointer is compared with the final address data in the decoded audio data storage area. When the decoded audio data read pointer is equal to or larger than the final address data in the decoded audio data storage area, the decoded audio data pointer return data is subtracted from the decoded audio data read pointer (updating).

Then, in step S3, PCM data in the 1/N block is calculated from the decoded audio data for each channel in the 1/N block (down-mix operation). In step S4, a write operation is performed referring to the PCM data write pointer which indicates a leading address of the PCM data storage area 200, and the amount of write data is added to the PCM data write pointer.

In step S1, when the down-mix operation has been performed N times, steps S2, S3 and S4 are not executed and the processing advances to stop S17.

In step S17, decoded data for the frequency domain is formed from the mantissa data and the exponential data for the frequency domain in the second block, and the frequency domain data is converted into time domain data to form decoded audio data for the time domain (frequency domain data synthesis and IMDCT). In step S18, the resultant decoded audio data is stored in a storage area for a proscribed channel in the external memory device 100 in the following manner. While a write operation is performed referring to the decoded audio data writer pointer which indicates a leading address of the storage area, the amount of the write data is added to the decoded audio data write pointer, and the decoded audio data write pointer is compared with the final address data in the decoded audio data storage area. When the decoded audio data write pointer is equal to or larger than the final address data in the decoded audio data storage area, the decoded audio data pointer return data is subtracted from the decoded audio data write pointer (updating).

The operations in steps S12 through S18 and, when necessary, S2 through S4 are repeated for each of the channels in the second block. Each time the operations are performed, encoded audio data for each channel in the second block is converted into decoded audio data, and the decoded audio data for each channel in the first block is down-mixed by 1/N to be converted into PCM data.

In step S19, it is determined whether or not the operations in steps S12 through S18 and S2 through S4 have been repeated for all the channels in the second block. When the operations have not been repeated for all the channels, the processing goes back to step S13. When the operations have been repeated for all the channels, the processing advances to step S5.

In step S5, it is determined whether or not the down-mix operation for each channel in the first block has been repeated N times in the following manner. The number of channels in the second block is compared with the value of N. When the number of channels in the second block is equal to or larger than the value of N, the down-mix operation has been performed N times. In such a case, the processing goes back to step S12. When the number of channels in the second block is less than the value of N, the down-mix operation has not been performed n times. In such a case, all the channels have not been processed. The unprocessed data is processed in steps S6, S7 and S8.

In step S6, the decoded audio data in each channel in the 1/N block is read from the external memory device 100. In step S7, PCM data for the 1/N block is calculated from the decoded audio data for each channel in the 1/N block (down-mix operation). In step S8, the PCM data in the 1/N block is stored in the 1/N block of the PCM data storage area 200 in the external memory device 100.

As described above, the audio decoding apparatus 1100 in the first example includes a decoded audio data write pointer corresponding to each of a plurality of channels, a decoded audio data read pointer corresponding to each of the plurality of channels, a PCM write pointer, final address data in a decoded audio data storage area corresponding to each of the plurality of channels, decoded audio data pointer return data, one block of PCM data storage area 200, and at least one block of decoded audio data storage area corresponding to each of the plurality of channels. Due to such a structure, decoded audio data for each channel in the first block is down-mixed by N separate operations while the encoded audio data for each channel in the second block is decoded.

Accordingly, the amount of data which is transferred at one time between the integrated semiconductor device 108 and the external memory device 100 is reduced, thus improving the efficiency of using the memory bus.

The present invention is not limited to the above-described example, and can be modified in various ways. For example, the format of the bit stream, encoded data and decoded data and the number of the channels can be arbitrarily changed.

For example, in the above example, a bit stream is in conformity with AC-3 standards; i.e., a bit stream includes a plurality of blocks, each including 6 channels (max) ×256 of data (max). The present invention is applicable to a bit stream in conformity with other standards, for example, a bit stream including 8 channels (max) ×1024 of data (max). In such a case, the data is processed in the state where the blocks in the above example are replaced with frames. The present invention is also applicable to the case where the number of channels, data and blocks dynamically change. The number of sub-bands can be set arbitrarily.

As described above, an audio decoding apparatus according to the present invention includes a decoded audio data write pointer corresponding to each of a plurality of channels, a decoded audio data read pointer corresponding to each of the plurality of channels, a PCM write pointer, final address data in a decoded audio data storage area corresponding to each of the plurality of channels, decoded audio data pointer return data, one block of PCM data storage area, and at least one block of decoded audio data storage area corresponding to each of the plurality of channels. Due to such a structure, a down-mix operation of the audio block data is performed by N separate operations, while the encoded audio data is decoded using the audio block data immediately before the audio block data currently being decoded. Accordingly, the amount of data transferred between an external memory device and the audio decoding apparatus is reduced, thereby improving the use efficiency of the memory bus.

(Example 2)

A signal processing device 1200 in a second example according to the present invention will be described with reference to FIGS. 9, 10, 11 and 18.

Figure 9:
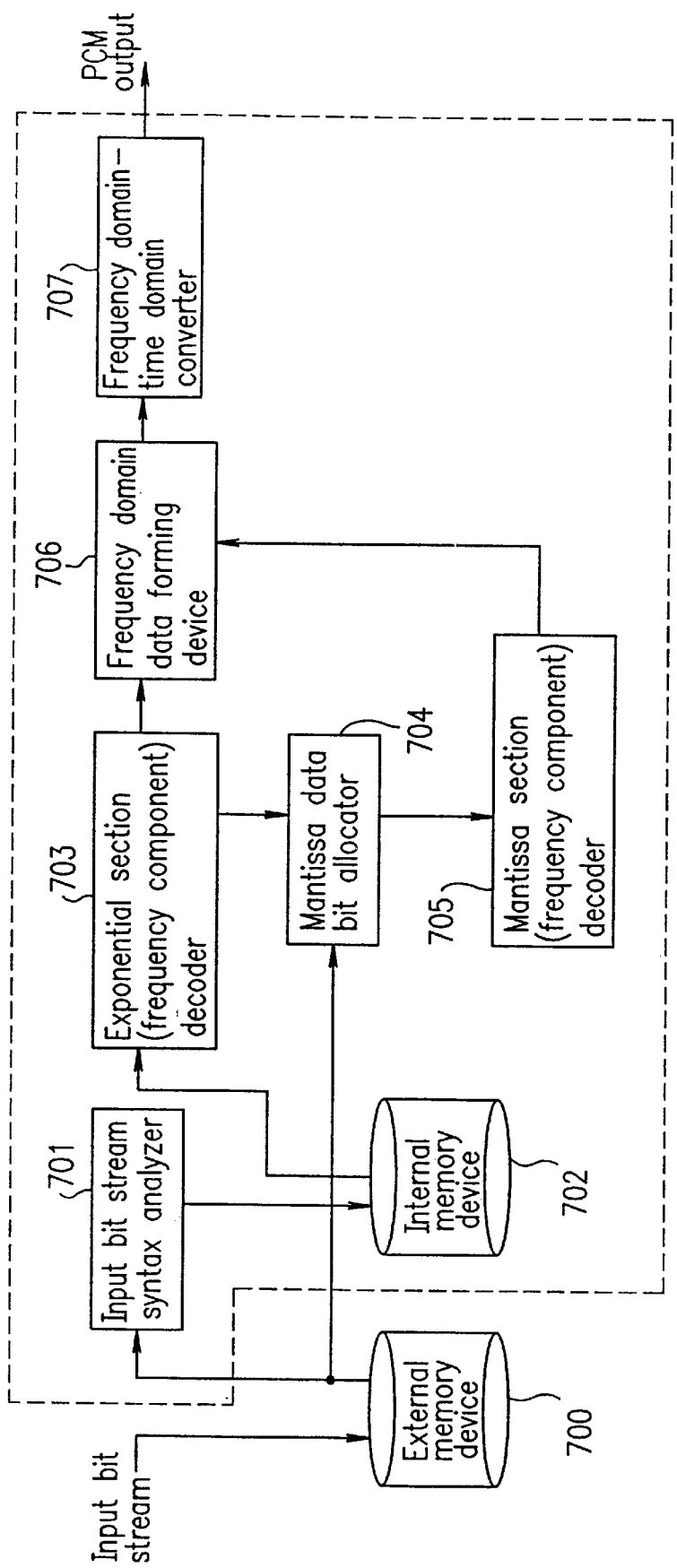
FIG. 9 is a block diagram illustrating a structure of a signal processing device in a second example according to the present invention.

With reference to FIG. 9, a structure and operation of the signal processing device 1200 will be described.

A bit stream which is input to the signal processing device 1200 is formed by first converting each of audio signals corresponding to multiple channels into frequency domain data and encoding the frequency domain data so as to be represented by mantissa sections and exponential sections. Such a bit stream includes audio data for a plurality of channels.

Figure 21:
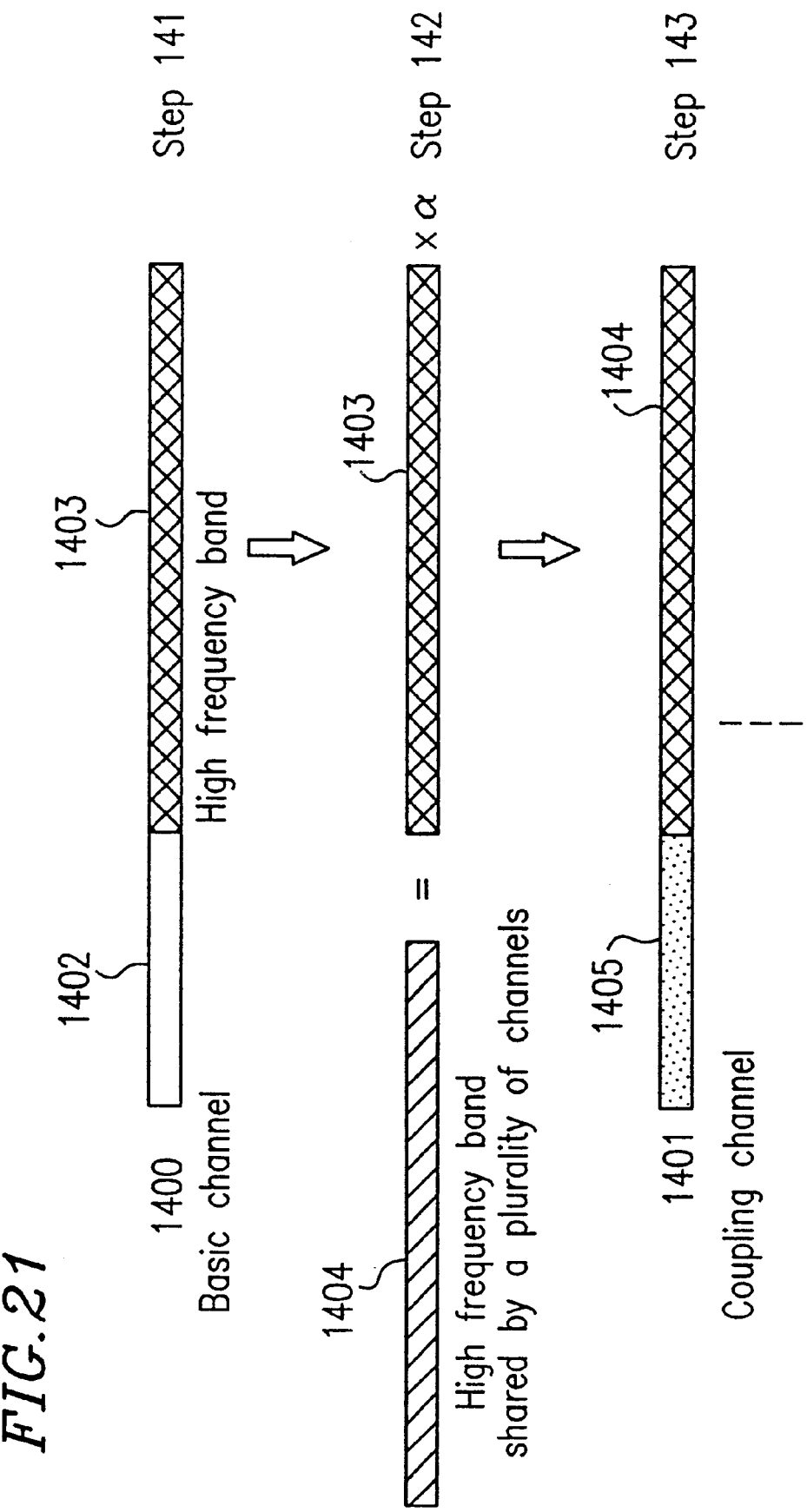
FIG. 21 shows coupled channels in a high frequency band in signal processing.

The channels include a normal channel, which includes a high frequency band and a low frequency band. The channels include a basic channel, which includes a high frequency band shared by a plurality of other channels and a low frequency band (channel 1400 shown in FIG. 21). The channels include a coupling channel, which includes a low frequency band previously separated from the high frequency band.

The bit stream is input to an external memory device 700 provided outside the signal processing device 1200. An input bit stream syntax analyzer 701 analyzes the syntax of the bit stream in the external memory device 700 and extracts data such as exponential sections for each of the channels required for decoding. The extracted data is stored in an internal memory device 702 provided in the signal processing device 1200. The bit stream which has been analyzed can be discarded from the external memory device 700.

Then, the data is decoded to form decoded audio data in the following rule for each of the channels in the bit stream.

An exponential section decoder 703 for decoding exponential data for a frequency domain extracts exponential sections for each channel included in the bit stream from the internal memory device 702 and decodes the exponential sections to form exponential data. The exponential data is stored in an operation area of the internal memory device 702.

A mantissa data bit allocator 704 forms a bit allocation amount based on the hearing characteristic from the exponential data for a target channel formed by the exponential section decoder 703 and the mantissa sections which indicate bit allocation of the target channel included in the bit stream stored in the external memory device 700. Based on the bit allocation amount, a mantissa section decoder 705 forms mantissa data for the frequency domain.

Figure 10:
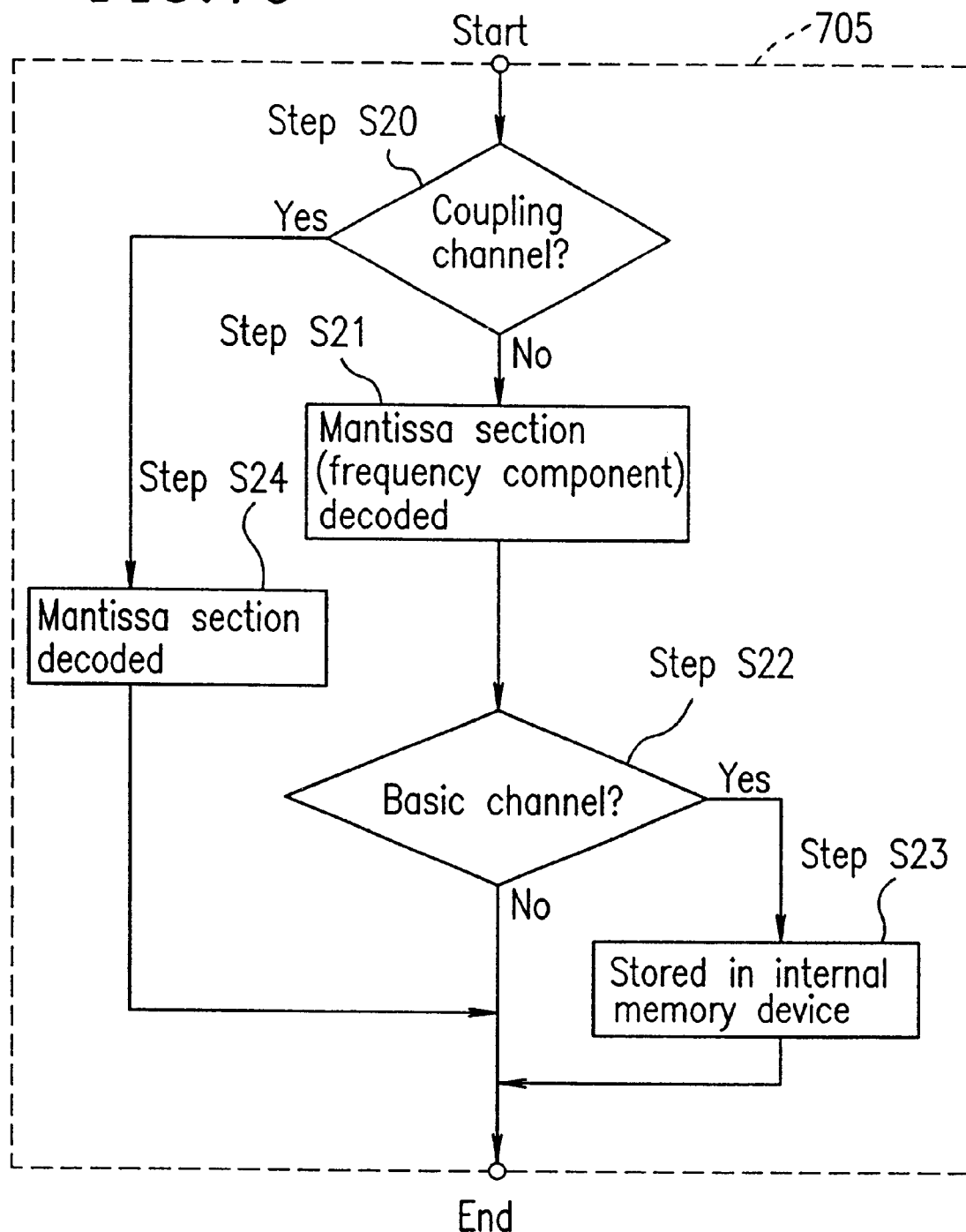
FIG. 10 is a flowchart illustrating an operation of a mantissa section decoder in the signal processing device shown in FIG. 9.

The formation of the mantissa data is performed as illustrated in the flowchart of FIG. 10.

In step S20, it is determined whether or not the target channel is a coupling channel previously separated from the high frequency band. When the target channel is a coupling channel ("yes" in step S20), the mantissa sections of the encoded data for the low frequency band for the channel are decoded to form mantissa data and the mantissa data is stored in an operation area of the internal memory device 702 in step S24. Then, the data is processed by the frequency domain data forming device 706 (FIG. 9). The mantissa data for the low frequency band which is stored in step S24 can be deleted immediately after the mantissa data and the exponential data are synthesized in step S31 described later.

When the target channel is not a coupling channel ("no") in step S20, the processing advances to step S21. In this case, the target channel is either a normal channel including a high frequency band and a low frequency band, or a basic channel including a high frequency band shared by a plurality of other channels and a low frequency band. In step S21, the mantissa sections for the low frequency band and the mantissa sections for the high frequency band are decoded to form mantissa data for the low frequency band and mantissa data for the high frequency band. The resultant data is stored in the operation area of the internal memory device 702.

Then, in step S22, it is determined whether or not the target channel is a basic channel including a high frequency band shared by a plurality of other channels and a low frequency band. When the target channel is not a basic channel ("no") in step S22, the data is processed by the frequency domain data forming device 706. When the target channel is a basic channel ("yes") in step S22, the processing advances to step S23. In step S23, the mantissa data for the high frequency band for the basic channel formed in step S21 is stored again in the internal memory device 702.

In steps S21 and S23, the mantissa data for the high frequency band for the basic channel (channel 1400 in FIG. 21) is written into two different areas in the internal memory device 702. Since these areas are different and distinguishable from each other, two pieces of exactly the same mantissa data are kept in the internal memory device 702.

The mantissa data for the high frequency band for the basic channel which is stored in step S21 can be deleted immediately after the mantissa data and the exponential data for the basic channel are synthesized in step S31 described later. In contrast, the mantissa data for the high frequency band for the basic channel which is stored in step S23 is kept in the internal memory device 702 until synthesis of the mantissa data and the exponential data is completed for all the channels which share the high frequency band for the basic channel.

The frequency domain data forming device 706 synthesizes the exponential data formed by the exponential section decoder 703 and the mantissa data formed by the mantissa section decoder 706 to form decoded data for the frequency domain.

Figure 11:
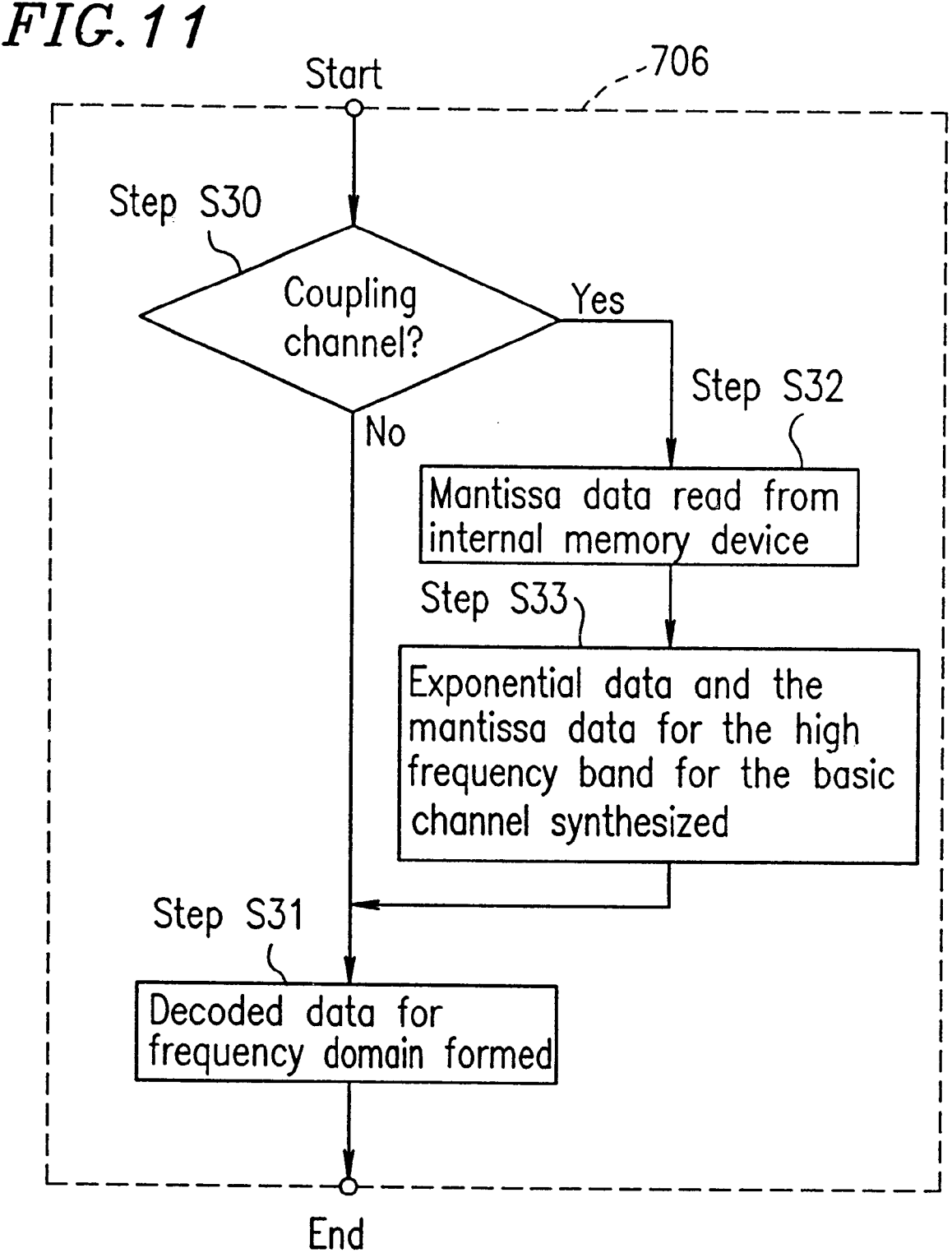
FIG. 11 is a flowchart illustrating an operation of a frequency domain data forming device in the signal processing device shown in FIG. 9.

The formation of the decoded data is performed as illustrated in the flowchart of FIG. 11.

In step S30, it is determined whether or not the target channel is a coupling channel previously separated from the high frequency band. When the target channel is not a coupling channel ("no"), i.e., when the target channel is a normal channel or a basic channel, the processing advances to step S31. In step S31, the exponential data and the mantissa data for the low frequency band stored in the internal memory device 702 are synthesized, and the exponential data and the mantissa data for the high frequency band stored in the internal memory device 702 synthesized. Thus, decoded data in which the data for the high frequency band and the data for the low frequency band are coupled, i.e., the decoded data for the frequency domain is formed.

When the target channel is a coupling channel ("yes") in step S30, the processing advances to step S32. In step S32, the exponential data and the mantissa data for the low frequency band for the coupling channel are synthesized. Furthermore, the exponential data for the high frequency band for the basic channel and the mantissa data for the high frequency band for the basic channel obtained in step S21 (channel 1400 obtained in step S21) are read from the internal memory device 702. In step S33, the exponential data and the mantissa data for the high frequency band for the basic channel are synthesized. Thus, in stop S31, decoded data in which the data for the high frequency band and the data for the low frequency band are coupled, i.e., the decoded data for the frequency domain is formed.

Then, the frequency domain-time domain converter 707 converts the decoded data formed by the frequency domain data forming device 706 into time domain data to form PCM data.

In this example, after the mantissa sections for the high frequency band which is shared by a plurality of channels are decoded in step S21 in FIG. 10, the obtained mantissa data is stored in the internal memory device 702 in step S23. For decoding the data for each of the channels, the mantissa data is repeatedly read from the internal memory device 702. Accordingly, the bit stream in the external memory device 700 needs to be accessed only once for obtaining encoded data for the high frequency band. It is not necessary to repeatedly access the bit stream in the external memory device 700 for obtaining encoded data for the high frequency band, as is necessary in the conventional device. Therefore, it is not required to retain the bit stream in the external memory device 706 until the formation of decoded data for the high frequency band is completed. The external memory device 706 need not have such a large capacity as conventionally required. Moreover, since formation of decoded data for the high frequency band is required once, the overall amount of operation is reduced.

Figure 18:
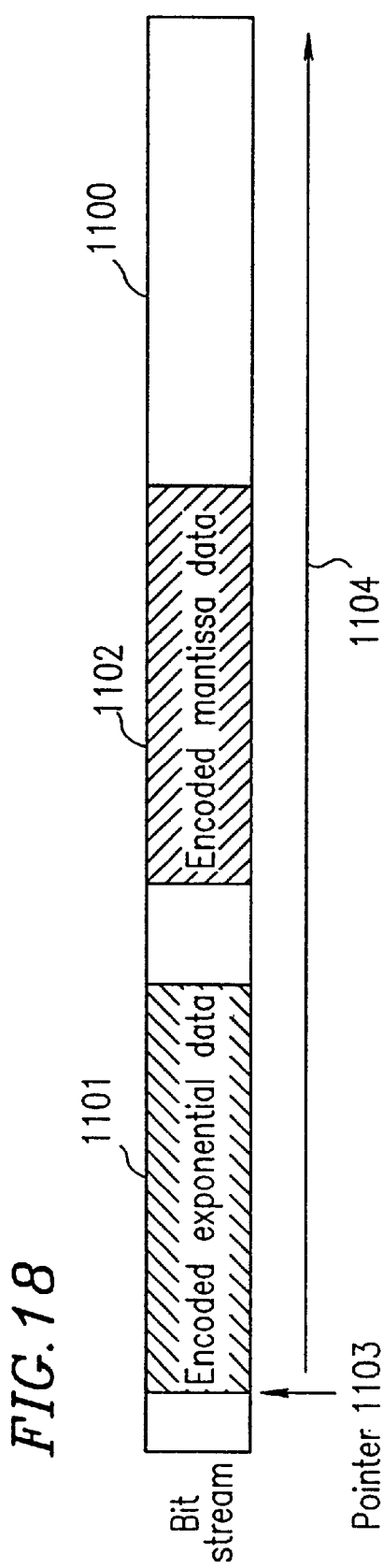
FIG. 18 shows movement of a pointer for accessing a bit stream in a signal processing devices according to the present invention.
Figure 19:
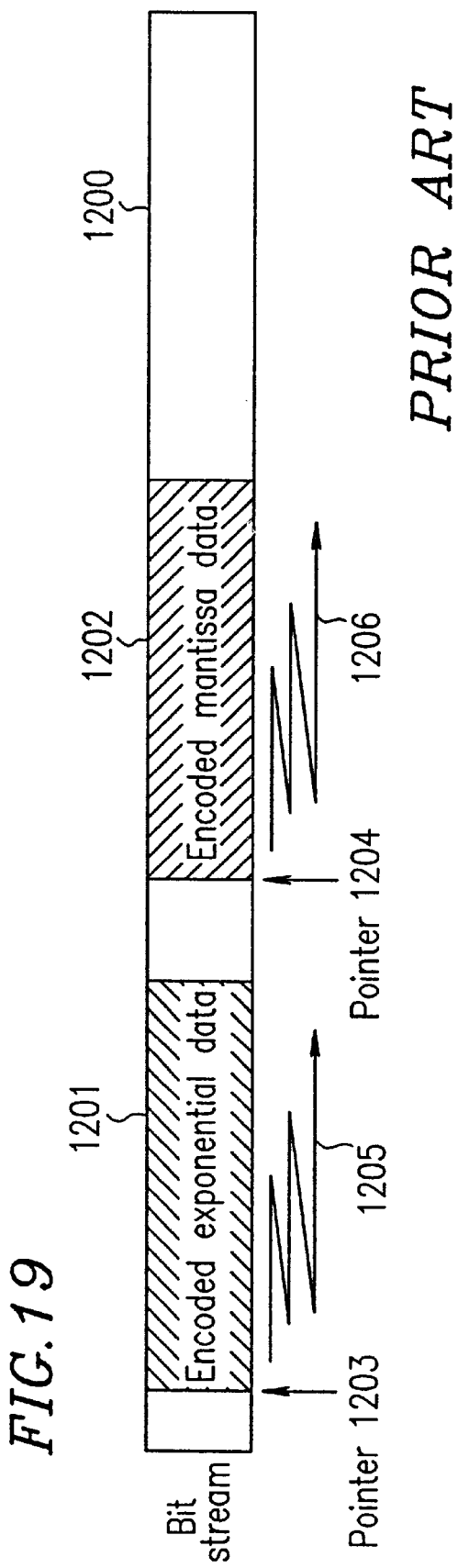
FIG. 19 shows movement of pointers for accessing a bit stream in a conventional signal processing devices.
Figure 20:
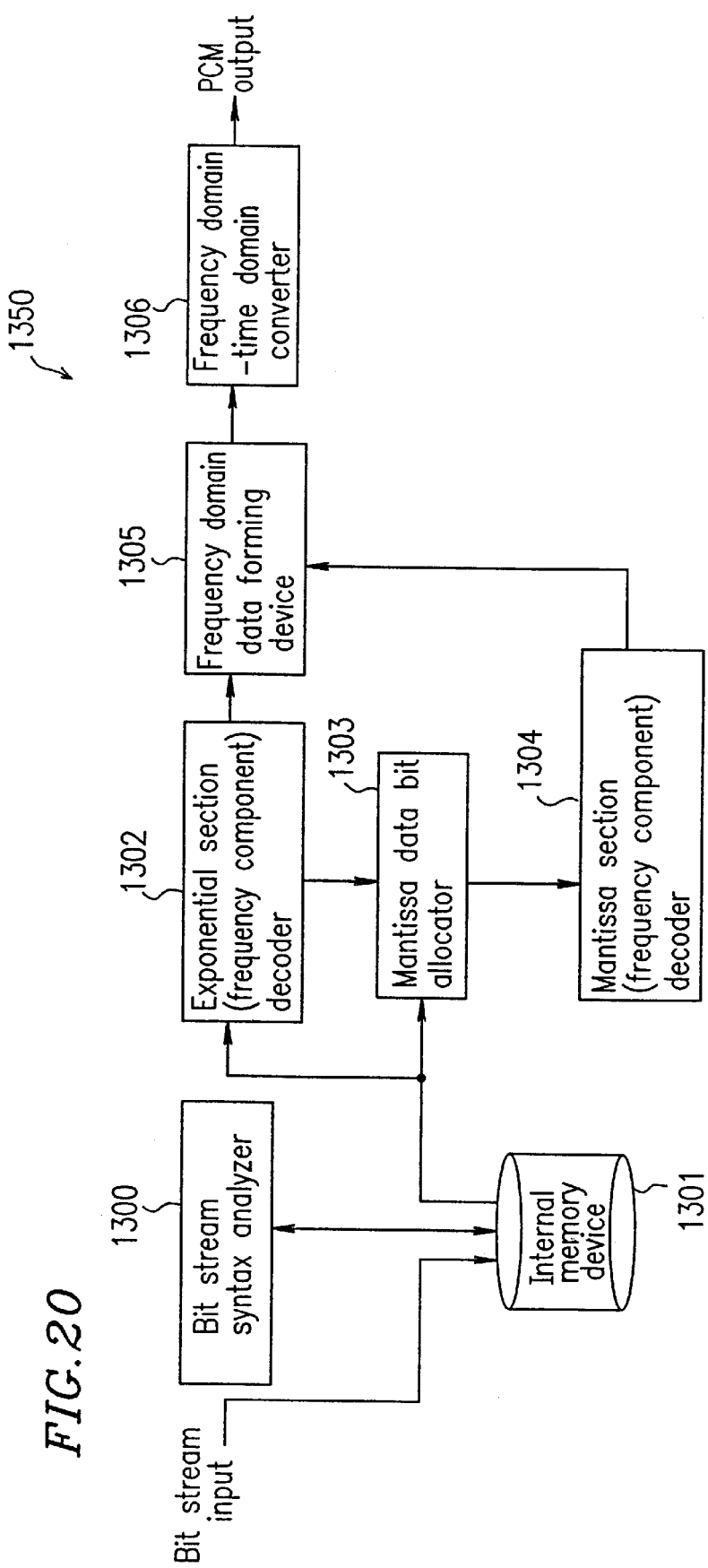
FIG. 20 is a block diagram illustrating a structure of the conventional signal processing device.

As described above, the bit stream in the external memory device 700 is accessed once for obtaining encoded data for the high frequency band. Accordingly, as shown in FIG. 18, the operation of a pointer 1103 for reading encoded exponential data 1101 and encoded mantissa data 1102 from a bit stream 1200 is relatively simple, as represented by arrow 1104. It is not necessary to repeatedly read the encoded data in the same part of the bit stream. Encoded data for each of the channels included in the bit stream is simply read sequentially in order of the channels. Thus, the operation of the pointer 1103 is relatively simple and easily controlled.

(Example 3)

Figure 12:
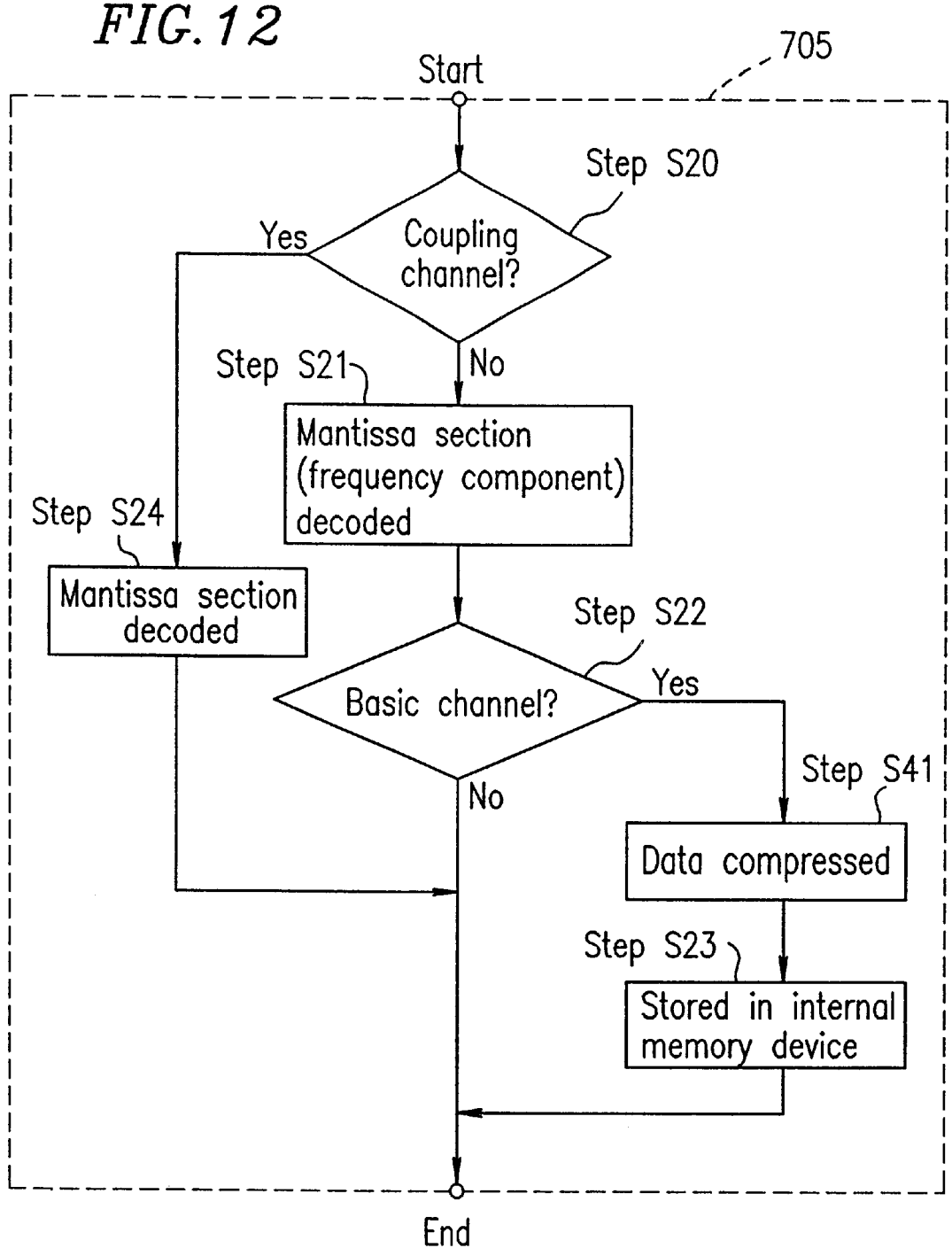
FIG. 12 is a flowchart illustrating an operation of a mantissa section decoder in a signal processing device in a third example according to the present invention.

A signal processing device in a third example according to the present invention will be described with reference to FIGS. 9 and 12. The signal processing device in the third example has the same structure as in the second example shown in FIG. 9. The processing shown in FIG. 12 is performed in lieu of the processing shown in FIG. 10, and then the processing shown in FIG. 11 is performed. The elements of the signal processing device in the third example bear the same reference numerals as those in the second example.

The processing shown in FIG. 12 is different from the processing in FIG. 10 in that step S41 is executed between steps S22 and S23.

In step S20, it is determined whether or not the target channel is a coupling channel previously separated from the high frequency band. When the target channel is a coupling channel ("yes"), the mantissa sections of the encoded data for the low frequency band for the channel are decoded to form mantissa data and the mantissa data is stored in an operation area of the internal memory device 702 in step S24. Then, the data is processed by the frequency domain data forming device 706 (FIG. 9).

When the target channel is not a coupling channel ("no") in step S20, the processing advances to step S21. In this case, the target channel is either a normal channel including a high frequency band and a low frequency band, or a basic channel including a high frequency band shared by a plurality of other channels and a low frequency band. In step S21, the mantissa sections for the low frequency band and the mantissa sections for the high frequency band are decoded to form mantissa data for the low frequency band and mantissa data for the high frequency band. The resultant data is stored in the operation area of the internal memory device 702.

Then, in step S22, it is determined whether or not the target channel is a basic channel including a high frequency band shared by a plurality of other channels and a low frequency band. When the target channel is not a basic channel ("no") in step S22, the data is processed by the frequency domain data forming device 706. When the target channel is a basic channel ("yes") in step S22, the processing advances to step S41. In step S41, the mantissa data for the high frequency band for the basic channel formed in step S21 is compressed. In step S23, the compressed mantissa data for the high frequency band is again stored in an operation area of the internal memory device 702.

The area in which the mantissa data is written in step S21 and the area in which the mantissa data is written in step S23 are different and distinguishable from each other.

The mantissa data written in step S21 can be deleted immediately after the mantissa data and the exponential data for the basic channel are synthesized in step S31 described later. In contact, the compressed mantissa data written in step S23 is kept in the internal memory device 702 until synthesis of the mantissa data and the exponential data is completed for all the channels which share the high frequency band for the basic channel.

The frequency domain data forming device 706 synthesizes the exponential data formed by the exponential section decoder 703 and the mantissa data formed by the mantissa section decoder 705 to form decoded data for the frequency domain as shown in the flowchart of FIG. 11. Before the synthesis, the mantissa data for the high frequency band for the basic channel which has been compressed in step S41 and written in the internal memory device 702 in step S23 is read from the internal memory device 702 and extended to the original mantissa data. The extended data is used.

In this example, the mantisesa data for the high frequency band is stored in the internal memory device 702 after being compressed. Accordingly, the required capacity of the internal memory device 702 is reduced.

(Example 4)

Figure 13:
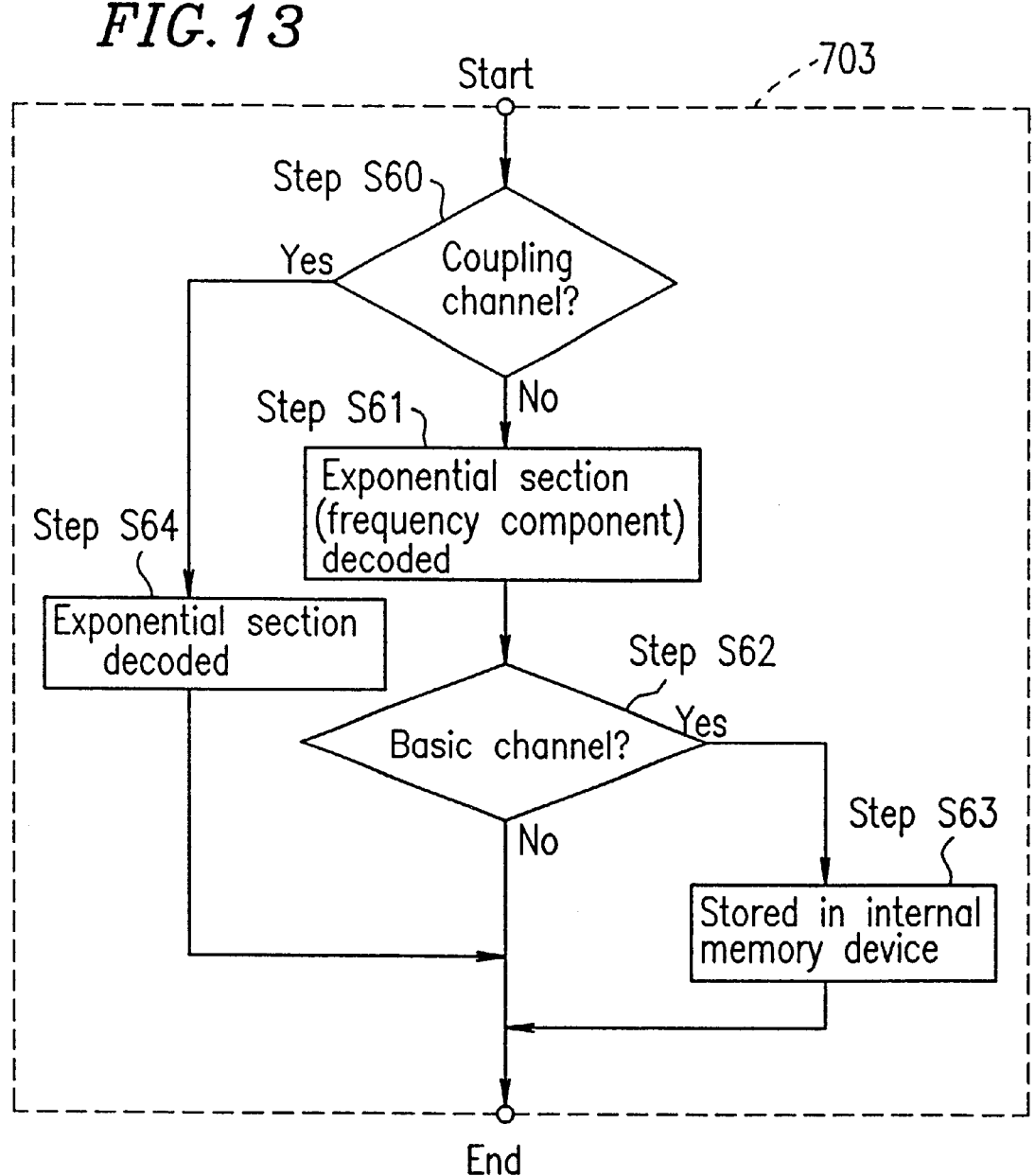
FIG. 13 is a flowchart illustrating an operation of an exponential section decoder in a signal processing device in a fourth example according to the present invention.
Figure 14:
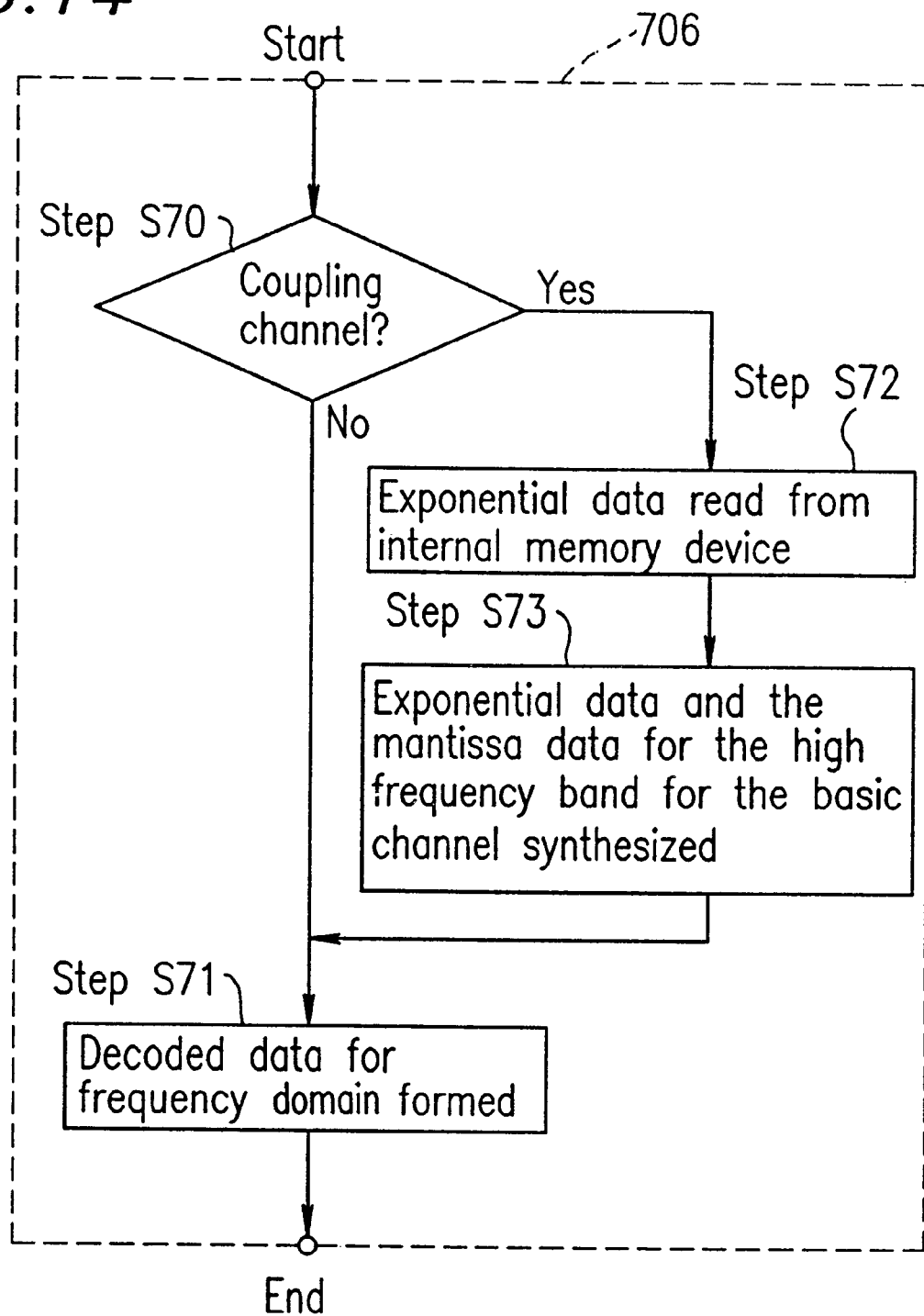
FIG. 14 is a flowchart illustrating an operation of a frequency domain data forming device in the signal processing device in the fourth example.

A signal processing device in a fourth example according to the present invention will be described with reference to FIGS. 13 and 14. The signal processing device in the fourth example has the same structure as in the second example shown in FIG. 9, and performs processing as shown in FIGS. 10, 13 and 14. The elements of the signal processing device in the fourth example bear the same reference numerals as those in the second example.

The mantissa sections for each of the channels are processed as shown in FIG. 10 and the description thereof will be omitted.

In the second example, before the processing shown in FIGS. 10 and 11, the exponential sections for each of the target channels are read and decoded, and the resultant exponential data is stored in the operation area of the internal memory device 702, in the fourth example, such decoding of the exponential sections is not performed before the processing shown in FIGS. 13 and 14, The exponential sections are decoded by the exponential section decoder 703 as illustrated in FIG. 13.

In step S60, it is determined whether or not the target channel is a coupling channel previously separated from the high frequency band. When the target channel is a coupling channel ("yes"), the exponential sections of the encoded data for the low frequency band for the channel are decoded to form exponential data and the exponential data is stored in an operation area of the internal memory device 702 in step S64. Then, the data is processed by the frequency domain data forming device 706 (FIG. 9).

When the target channel is not a coupling channel ("no") in step S60, the processing advances to step S61. In this case, the target channel is either a normal channel including a high frequency band and a low frequency band, or a basic channel including a high frequency band shared by a plurality of other channels and a low frequency band. In step S61, the exponential sections for the low frequency band and the exponential sections for the high frequency band are decoded to form exponential data for the low frequency band and exponential data for the high frequency band. The resultant data is stored in the operation area of the internal memory device 702.

Then, in step S62, it is determined whether or not the target channel is a basic channel. When the target channel is not a basic channel ("no") in step S62, the data is processed by the frequency domain data forming device 706. When the target channel is a basic channel ("yes") in step S62, the processing advances to step S63. In step S63, the exponential data for the high frequency band formed in step S61 is again stored in an operation area of the internal memory device 702.

In steps S61 and S63, the exponential data for the high frequency band for the basic channel is written into two different areas in the internal memory device 702. Since these areas are different and distinguishable from each other, two pieces of exactly the same exponential data are kept in the internal memory device 702.

The exponential data for the high frequency band written in step S61 can be deleted immediately after the mantissa data and the exponential data for the basic channel are synthesized in step S71 described later. In contrast, the exponential data written in step S63 is kept in the internal memory device 702 until synthesis of the mantissa data and the exponential data is completed for all the channels which share the high frequency band for the basic channel.

Hereinafter, the formation of the decoded data for the frequency domain is performed as illustrated in the flowchart of FIG. 14.

In step S70, it is determined whether or not the target channel is a coupling channel previously separated from the high frequency band. When the target channel is not a coupling channel ("no"), i.e., when the target channel is a normal channel or a basic channel, the processing advances to step S71. In step S71, the exponential data and the mantissa data obtained in step S21 (FIG. 10) are synthesized, thereby forming decoded data for the frequency domain. In more detail, the exponential data and the mantissa data for the low frequency band are synthesized, and the exponential data and the mantissa data for the high frequency band are synthesized, thereby forming decoded data, in which the high frequency and the low frequency band are coupled.

When the target channel is a coupling channel ("yes") in step S70, the processing advances to step S72. In step S72, the exponential data and the mantissa data for the low frequency band for the coupling channel are synthesized. Furthermore, the mantissa data for the high frequency band for the basic channel and the exponential data for the high frequency band for the basic channel obtained in step S21 are read from the internal memory device 702. In step S73, the exponential data and the mantissa data for the high frequency band for the basic channel are synthesized. Thus, in step S71, decoded data in which the data for the high frequency band and the data for the low frequency band are coupled, i.e., the decoded data for the frequency domain is formed.

Then, the frequency domain-time domain converter 707 converts the decoded data formed by the frequency domain data forming device 705 into time domain data to form PCM data.

In this example, after the mantissa sections for the high frequency band which is shared by a plurality of channels are decoded in step S21 in FIG. 10, the obtained mantissa data is stored in the internal memory device 702 in step S23. Furthermore, after the exponentail sections for the high frequency band which is shared by a plurality of channels are decoded in step S61, the obtained exponential data is stored in the internal memory device 702 in step S63. For decoding the data for each of the channels, the mantissa data and the exponential data are repeatedly read from the internal memory device 702. Accordingly, the overall amount of operation is reduced.

(Example 5)

Figure 15:
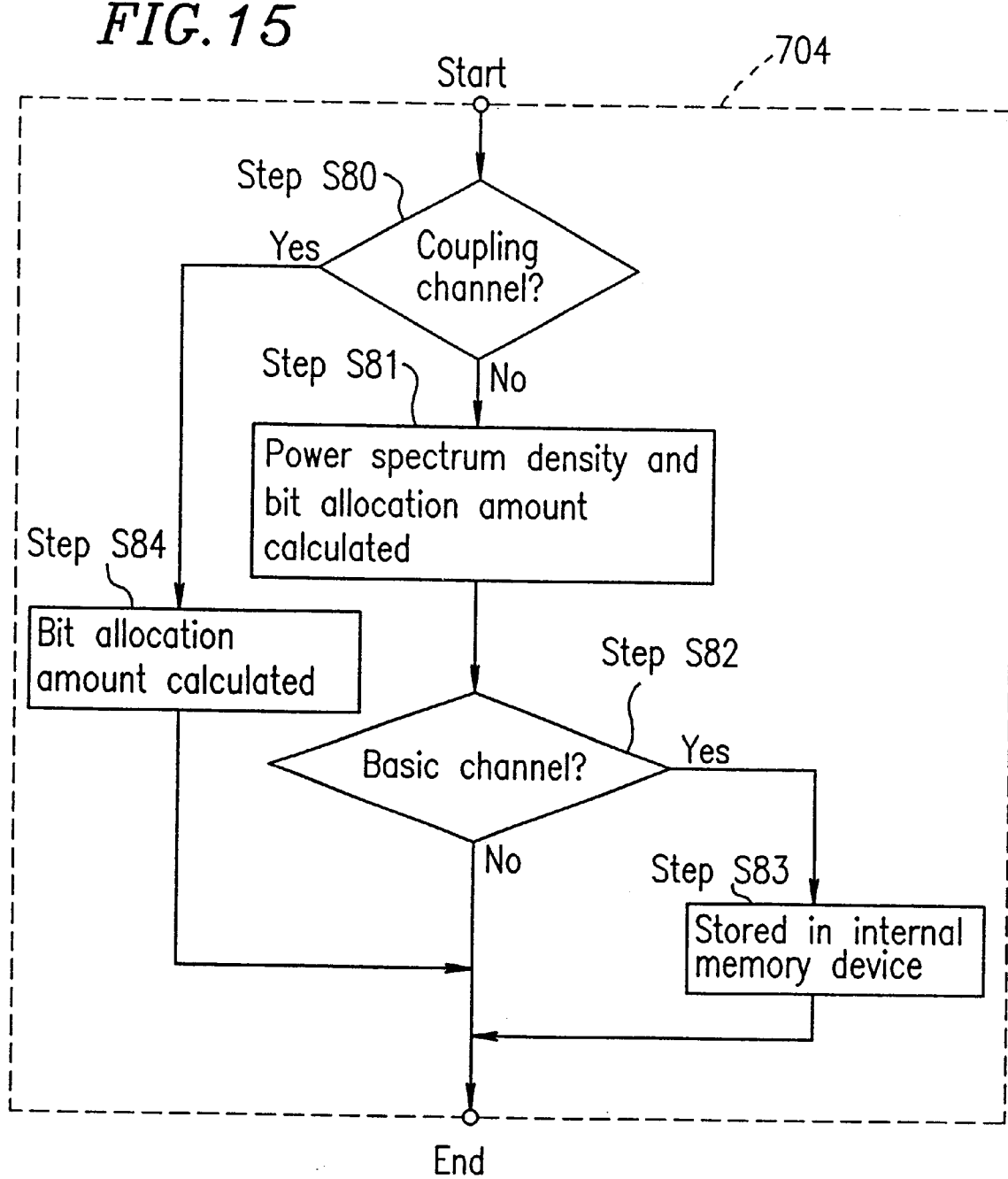
FIG. 15 is flowchart illustrating an operation of a mantissa data bit allocator in a signal processing device in a fifth example according to the present invention.
Figure 16:
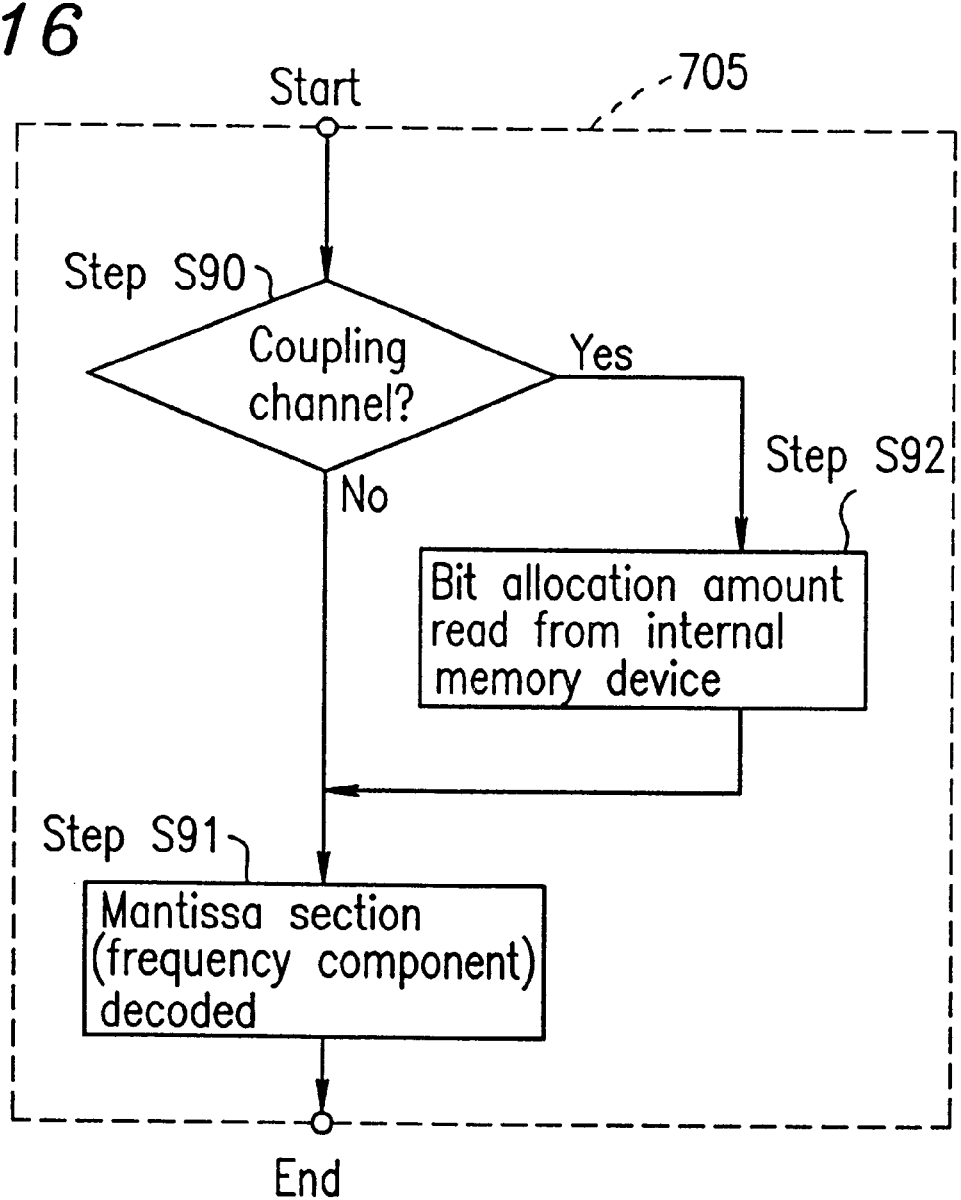
FIG. 16 is a flowchart illustrating an operation of a mantissa section decoder in the signal processing device in the fifth example.
Figure 17:
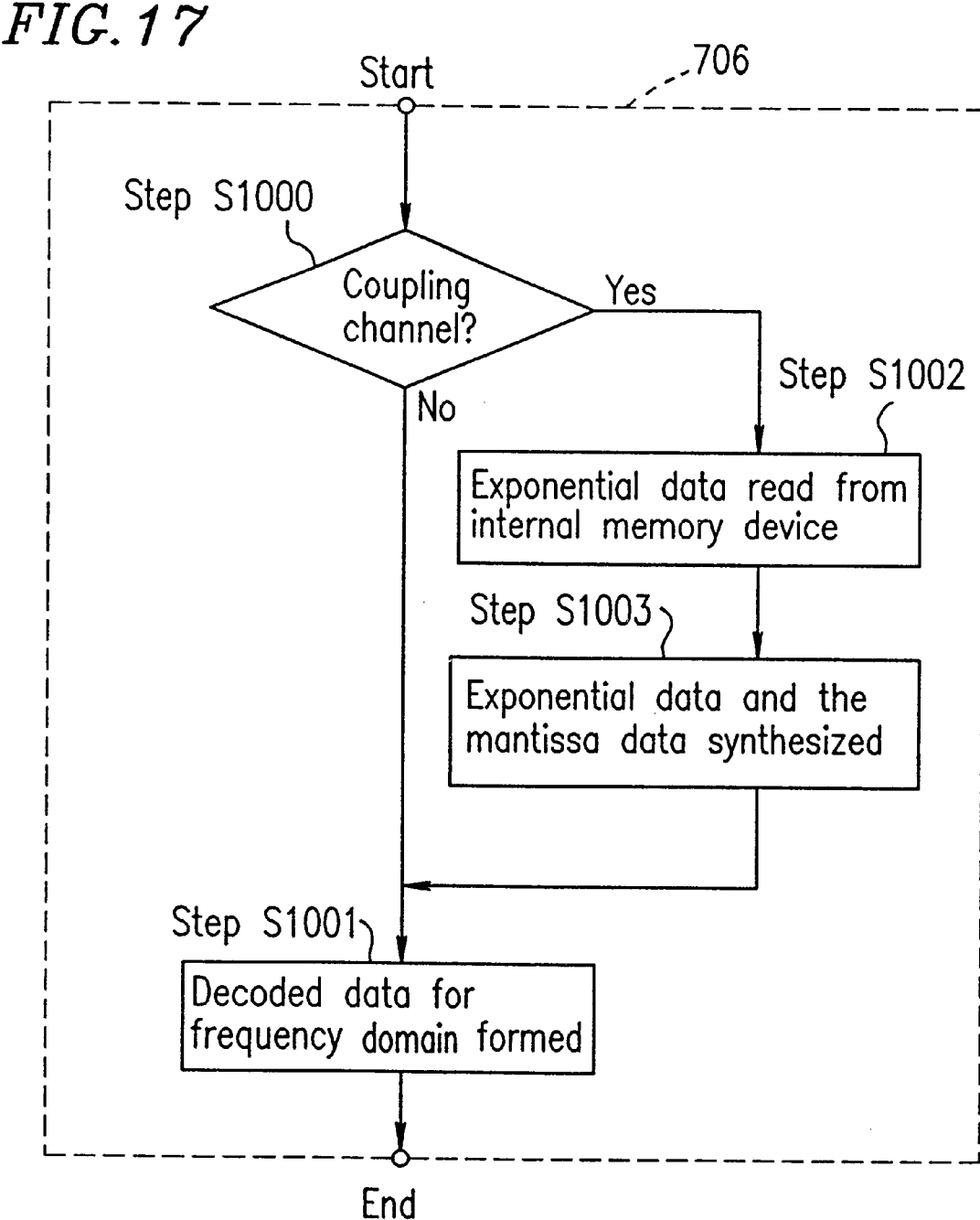
FIG. 17 is a flowchart illustrating an operation of a frequency domain data forming device in the signal processing device in the fifth example.

A signal processing device in a fifth example according to the present invention will be described with reference to FIGS. 15, 16 and 17. The signal processing device in the fifth example has the same structure as in the second example shown in FIG. 9, and performs processing as shown in FIGS. 13 and 15 through 17. The elements of the signal processing device in the fifth example bear the same reference numerals as those in the second example.

The exponential sections for each of the channels are processed as shown in FIG. 13 and the description thereof will be omitted.

The mantissa sections for each of the channels are decoded as shown in FIGS. 15 and 16, and the mantissa data and the exponential data are synthesized as illustrated in FIG. 17.

First, processing performed by the mantissa data bit allocator 704 will be described with reference to FIG. 15.

In step S80, it is determined whether or not the target channel is a coupling channel previously separated from the high frequency band. When the target channel is a coupling channel ("yes"), a power spectrum density is obtained from the exponential data in the low frequency band for the channel, and a bit allocation amount based on the auditory characteristic is calculated in step S84. Then, the data is processed by the mantissa section decoder 705.

When the target channel is not a coupling channel ("no") in step S80, the processing advances to step S81. In this case, the target channel is either a normal channel including a high frequency band and a low frequency band, or a basic channel including a high frequency band shared by a plurality of other channels and a low frequency band. In step S81, a power spectrum density is obtained from the decoded exponential data for the low frequency band and the high frequency band for the channel, and a bit allocation amount for the low frequency band and the high frequency band based on the auditory characteristic is obtained.

Next, in step S82, it is determined whether or not the target channel is a basic channel. When the target channel is not a basic channel ("no") in step S82, the data is processed by the mantissa section decoder 705. When the target channel is a basic channel ("yes") in step S82, the processing advances to step S83. In step S83, the bit allocation amount for the high frequency band for the basic channel obtained in step S81 is written into the internal memory device 702, and then the data is processed by the mantissa section decoder 705.

The bit allocation amount for the high frequency band for the basic channel written in step S63 is retained in the internal memory device 702 until synthesis of the mantissa data and the exponential data is completed for all the channels which share the high frequency band for the basic channel.

The processing performed by the mantissa section decoder 705 will be described with reference to FIG. 16.

In step S90, it is determined whether or not the target channel is a coupling channel previously separated from the high frequency band. When the target channel is a coupling channel ("yes"), the processing advances to step S92. In step S92, the bit allocation amount for the high frequency band for the basic channel stored in step S83 is read from the internal memory device 702. Then, in step S91, the mantissa data for the high frequency band for the basic channel is formed based on the bit allocation amount for the high frequency band. Furthermore, the mantissa data for the low frequency band for the coupling channel is formed based on the bit allocation amount for the low frequency band for the coupling channel formed in step S84. Then, the data is processed by the frequency domain data forming device 706 (FIG. 9).

When the target channel is not a coupling channel ("no") in step S90, the processing advances to step S91. In this case, the target channel is either a normal channel including a high frequency band and a low frequency band, or a basic channel including a high frequency band shared by a plurality of other channels and a low frequency band. In step S91, the mantissa data is formed for the target channel based on the bit allocation amount formed in step S81, and then the data is processed by the frequency domain data forming device 706 (FIG. 9).

Next, the formation of the decoded data by the frequency domain data forming device 706 will be described with reference to FIG. 17.

In step S1000, it is determined whether or not the target channel is a coupling channel previously separated from the high frequency band. When the target channel is not a coupling channel ("no"), i.e., when the target channel is a normal channel or a basic channel, the processing advances to step S1001. In step S1001, the exponential data for the target channel is read from the internal memory device 702. The exponential data is synthesized with the mantissa data for the target channel formed by the mantissa section decoder 705, thereby forming decoded data for the frequency domain.

When the target channel is a coupling channel ("yes") in step S1000, the exponential data for the high frequency band for the basic channel is read from the internal memory device 702 in step S1002. Then, in step S1003, the exponential data and the mantissa data for the low frequency band for the coupling channel are synthesized. Furthermore, the mantissa data for the high frequency band for the basic channel obtained in step S91 and the exponential data for the high frequency band for the basic channel from the internal memory device 702 are synthesized. Thus, in step S1001, decoded data in which the data for the high frequency band and the data for the low frequency band are coupled, i.e., the decoded data for the frequency domain is formed.

Then, the frequency domain-time domain converter 707 converts the decoded data formed by the frequency domain data forming device 706 into time domain data to form PCM data.

In the case where the data in the coupling channel previously separated from the high frequency band is decoded, the processing by the exponential section decoder 703 and the mantissa data bit allocator 704 can be eliminated. Since the data representing the bit allocation amount is about ½ of the mantissa data, the required capacity of the internal memory device 702 is reduced. As a result, the data in the coupling channel previously separated from the high frequency band can be performed at a higher rate.

It is not necessary to retain the bit stream in the internal memory device 702 until the encoded data for the high frequency band is completed. Thus, the required capacity of the internal memory device 702 is reduced.

The first through fifth examples can be appropriately combined. In such a case, for decoding data in the coupling channel previously separated from the high frequency band, it is possible to omit only the processing by the exponential section decoder 703 for the frequency domain, to omit only the processing by the mantissa data bit allocator 704, or to omit only the processing by the mantissa section decoder 705 for the frequency domain. Thus, the overall processing rate is improved.

As can be appreciated from the above, a signal processing device according to the present invention forms decoded data for each of a plurality of channels in the following manner. A bit stream including encoded data for a plurality of channels is input. The encoded data which is included in at least one of the channels and is shared by the channels is decoded to form common decoded data. The encoded data inherent to each of the channels is encoded on a channel-by-channel basis to form channel decoded data. The channel decoded data is synthesized with the common decoded data to form decoded data for each of the channels. The data in each of the channels which share the common encoded data is decoded at a higher rate, and it is not necessary to retain the bit stream until the completion of the operation. Therefore, decoding of data is realized even in a signal processing device which is not capable of retaining a bit stream.

(Example 6)

Figure 22:
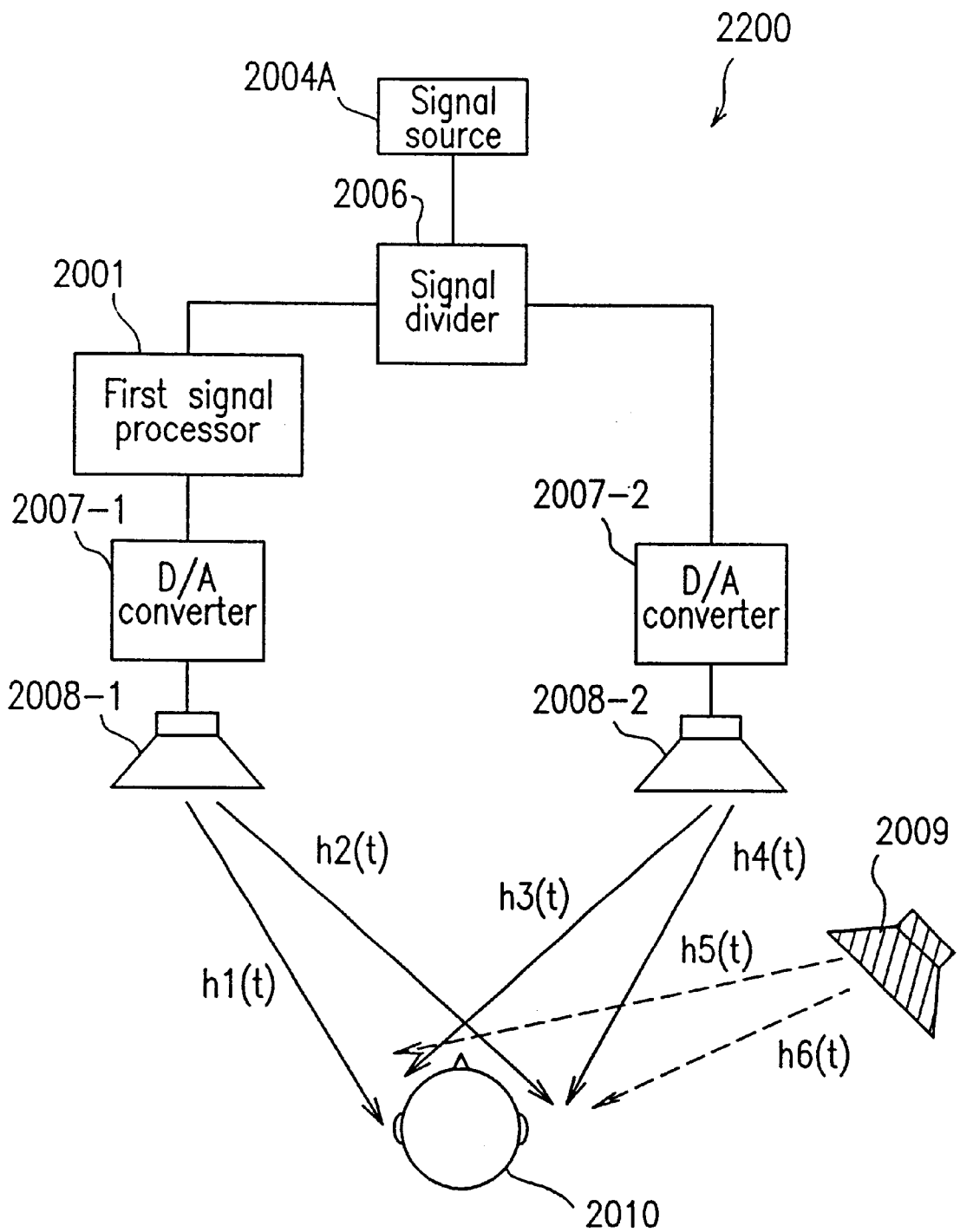
FIG. 22 is a block diagram illustrating a structure of a sound image localization device in a sixth example according to the present invention.
Figure 23:
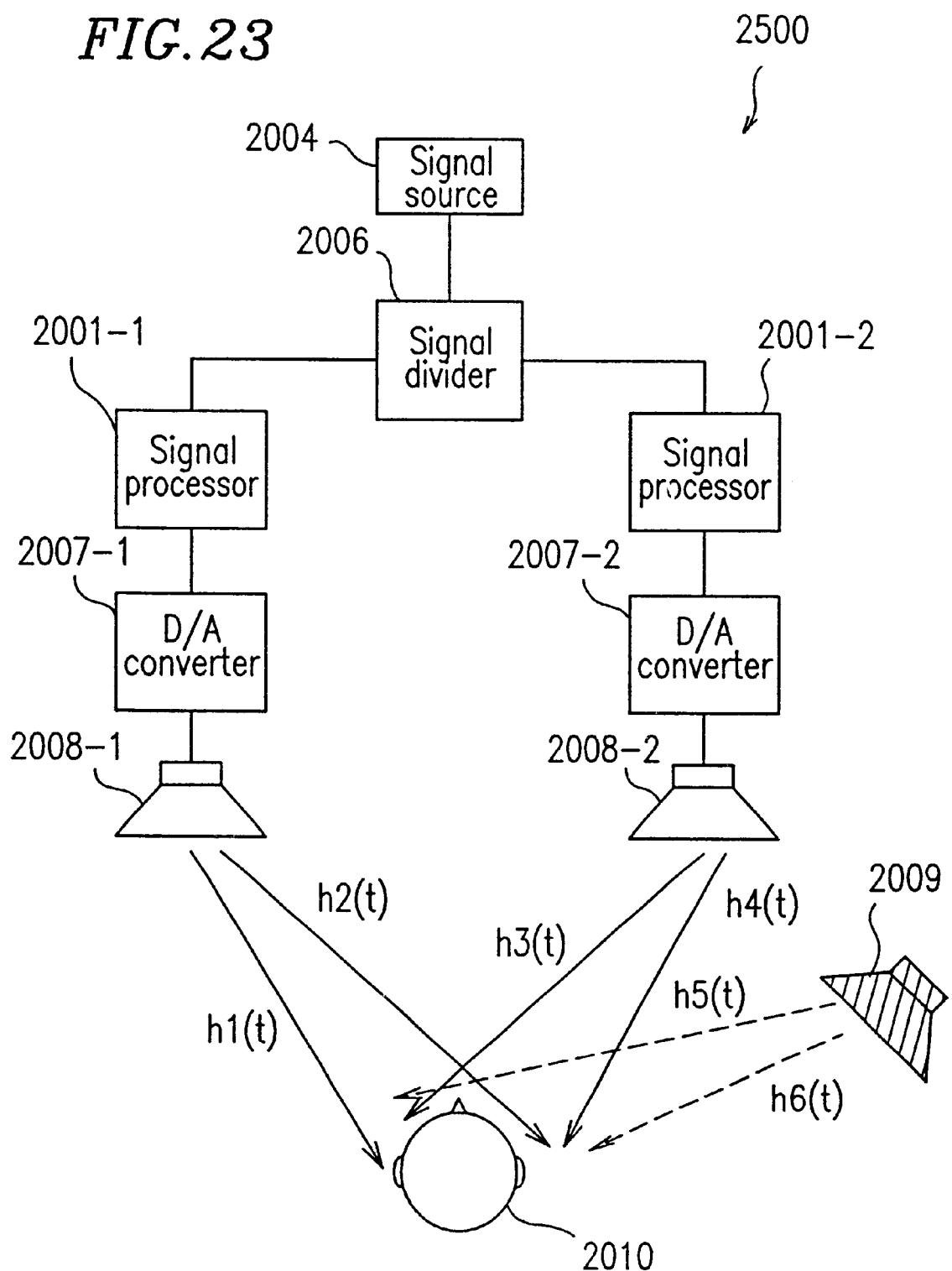
FIG. 23 is a block diagram illustrating an operation of a conventional sound image localization device.

A sound image localization device 2200 in a sixth example according to the present invention will be described. FIG. 22 is a block diagram illustrating an overall structure of the sound image localization device 2200. Identical elements previously discussed with respect to FIG. 23 bear identical reference numerals and the descriptions thereof will be omitted.

The sound image localization device 2200 includes a single signal processor (referred to as a "first signal processor) 2001 provided on one of two channels (left channel in this example). The first signal processor 2001 includes an FIR filter shown in FIG. 24.

When an audio signal S(t) digitally converted (PCM-converted) is input from a signal source 2004A, a signal divider 2006 divides the signal into two signals. One of the signals is input to a D/A converter 2007-2 and the other signal is input to the first signal processor 2001.

Where the frequency characteristics of the signal processors 2001-1 and 2001-2 of the conventional sound image localization device 2500 (FIG. 23) for performing the function of the virtual speaker 2009 are Hl(n) and HR(n), the frequency characteristic of the first signal processor 2001 is set to be Hl(n)-HR(n). In other words, the difference in the frequency characteristics of the sound reaching the left ear of the listener 2010 and the sound reaching the right ear of the listener 2010 is set in the first signal processor 2001 as the transfer function. In this example, the frequency characteristic of the first signal processor 2001 is obtained using a division performed in the frequency domain. The frequency characteristic of the first signal processor 2001 can also be obtained using various methods such as, for example, inverted convolution operation. By any of such methods, a similar effect can be obtained.

The frequency characteristic represented as G(n) of the first signal processor 2001 is obtained by expression (14).

$$G(n)=hL(n)/hR(n) \tag{14}$$

According to expression (14), the frequency characteristic G(n) of the first signal processor 2001 is obtained by dividing the frequency characteristic hL(n) of the signal processor 2001-1 by the frequency characteristic hR(n) of the signal processor 2001-2 of the conventional sound image localization device 2500.

Figure 25:
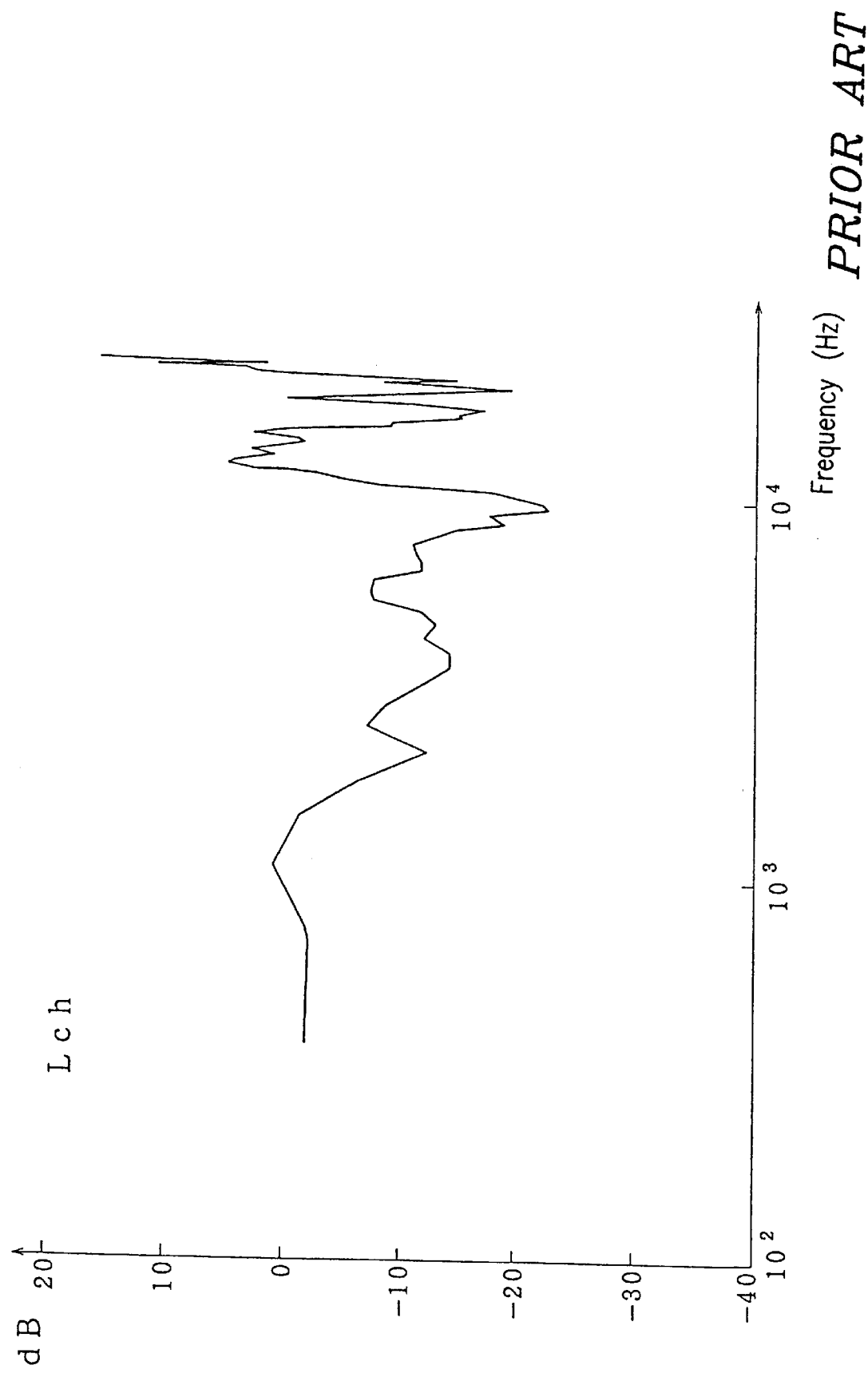
FIG. 25 is a graph illustrating the frequency characteristic of the conventional signal processing device shown in FIG. 23 in the L channel.
Figure 27:
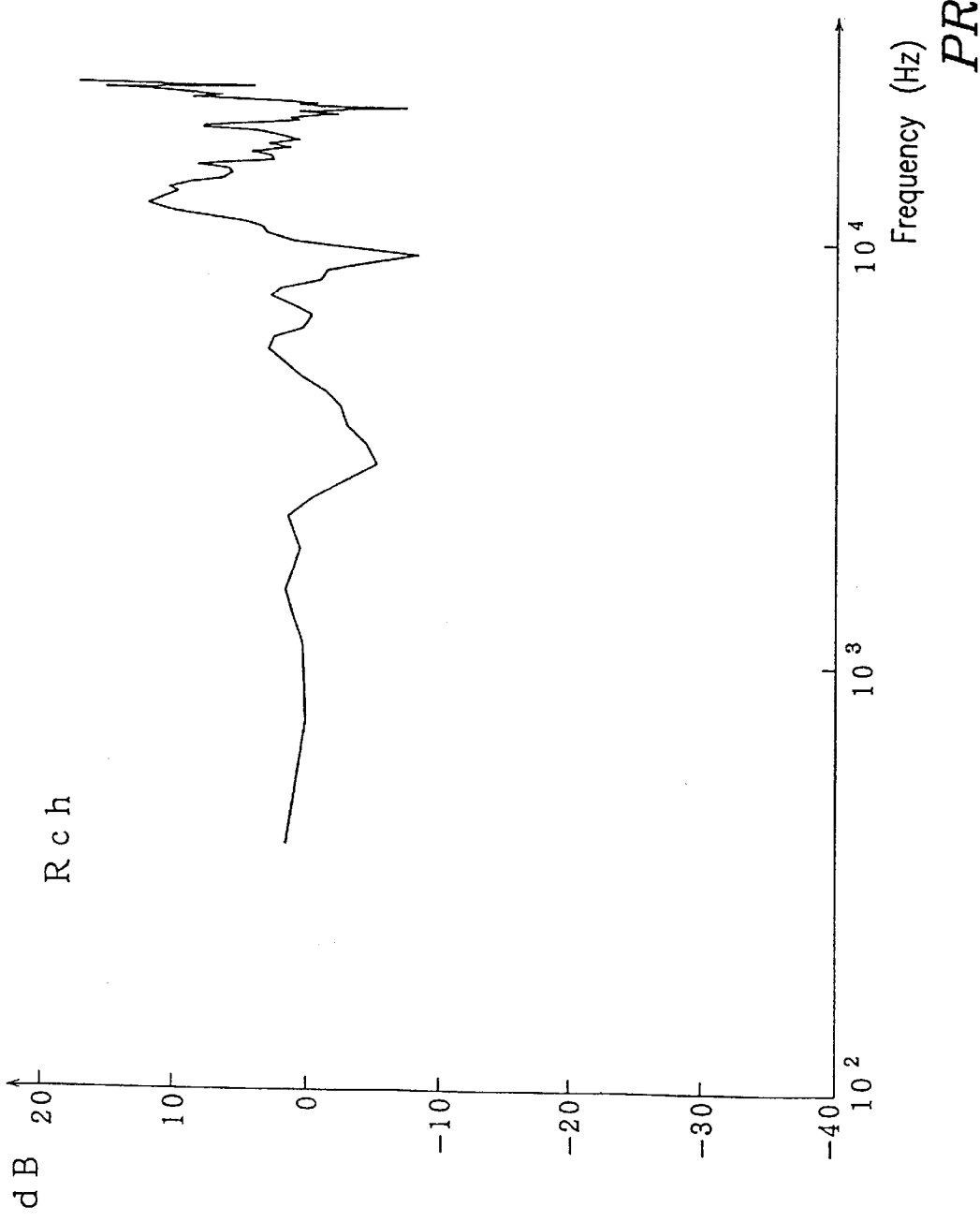
FIG. 27 is a graph illustrating the frequency characteristic of the conventional signal processing device shown in FIG. 23 in the R channel.
Figure 29:
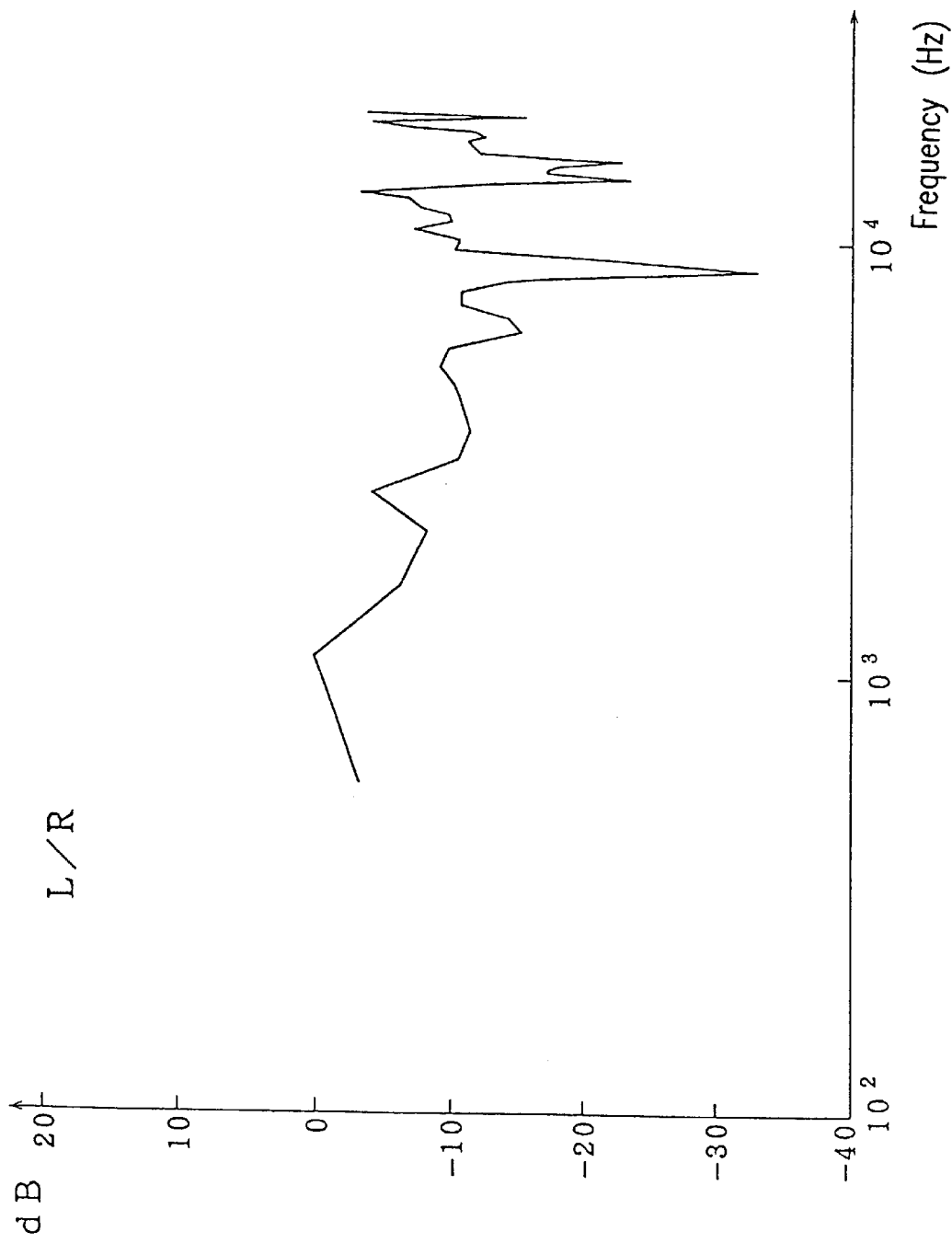
FIG. 29 is a graph illustrating the frequency characteristic of the signal processing device shown in FIG. 22.

FIG. 25 shows an example of a frequency characteristic of the signal processor 2001-1, and FIG. 27 shows an example of a frequency characteristic of the signal processor 2001-2. FIG. 29 shows an example of a frequency characteristic of the first signal processor 2001 of the sound image localization device 2200 in this example. In order to avoid an overflow of operation results, the frequency characteristic of the first signal processor 2001 is obtained by dividing one of the frequency characteristics shown in FIGS. 25 and 27 having a lower sound level by the other of the frequency characteristics having a higher sound level. That is, the denominator is the one having a higher sound level, and the numerator is the one having a lower sound level. In the case where an operation system which does not cause such an overflow is used, either one of the frequency characteristics can be the numerator or the denominator.

Figure 26:
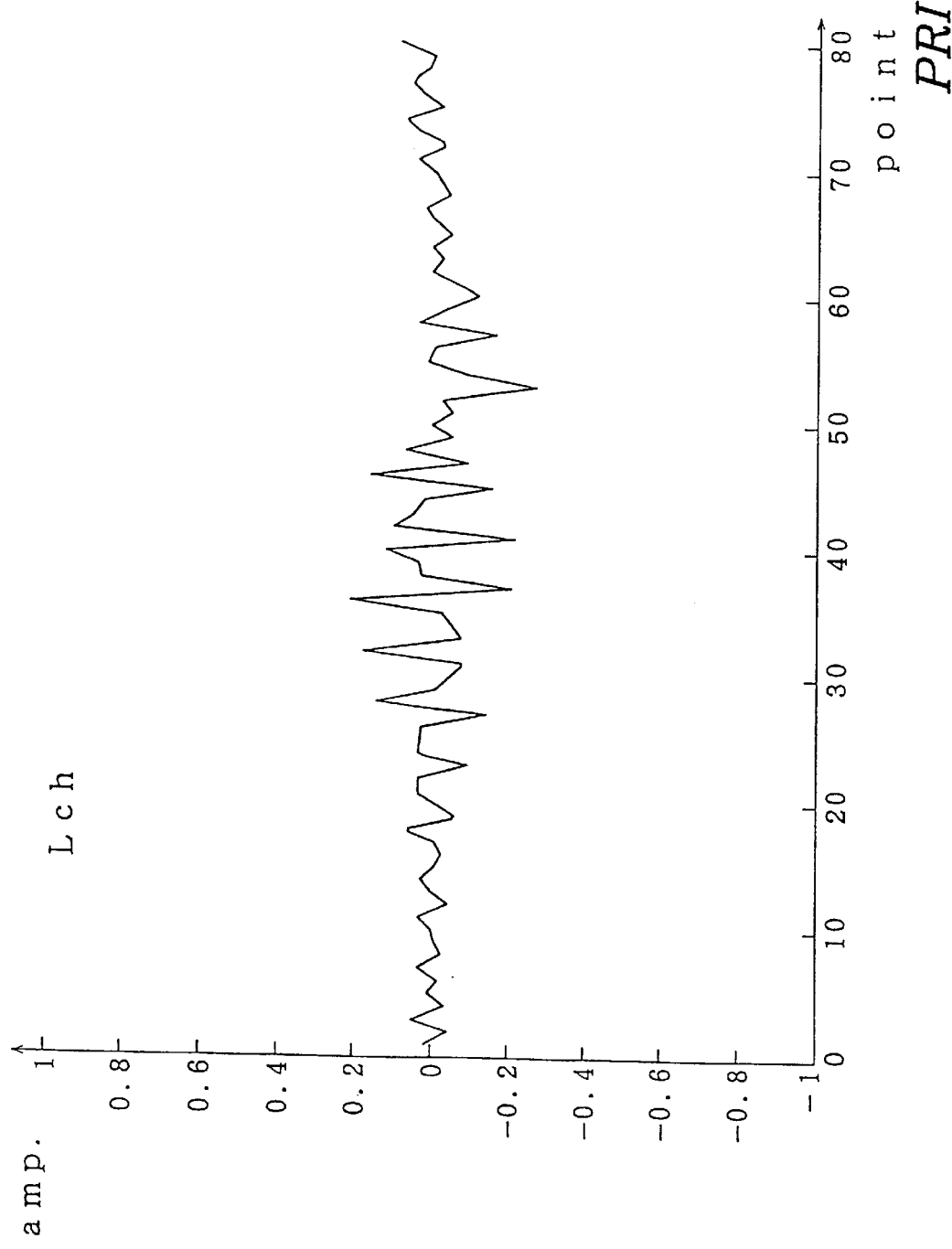
FIG. 26 is a graph illustrating the filter coefficient (time characteristic) of the conventional signal processing device shown in FIG. 23 in the L channel.
Figure 28:
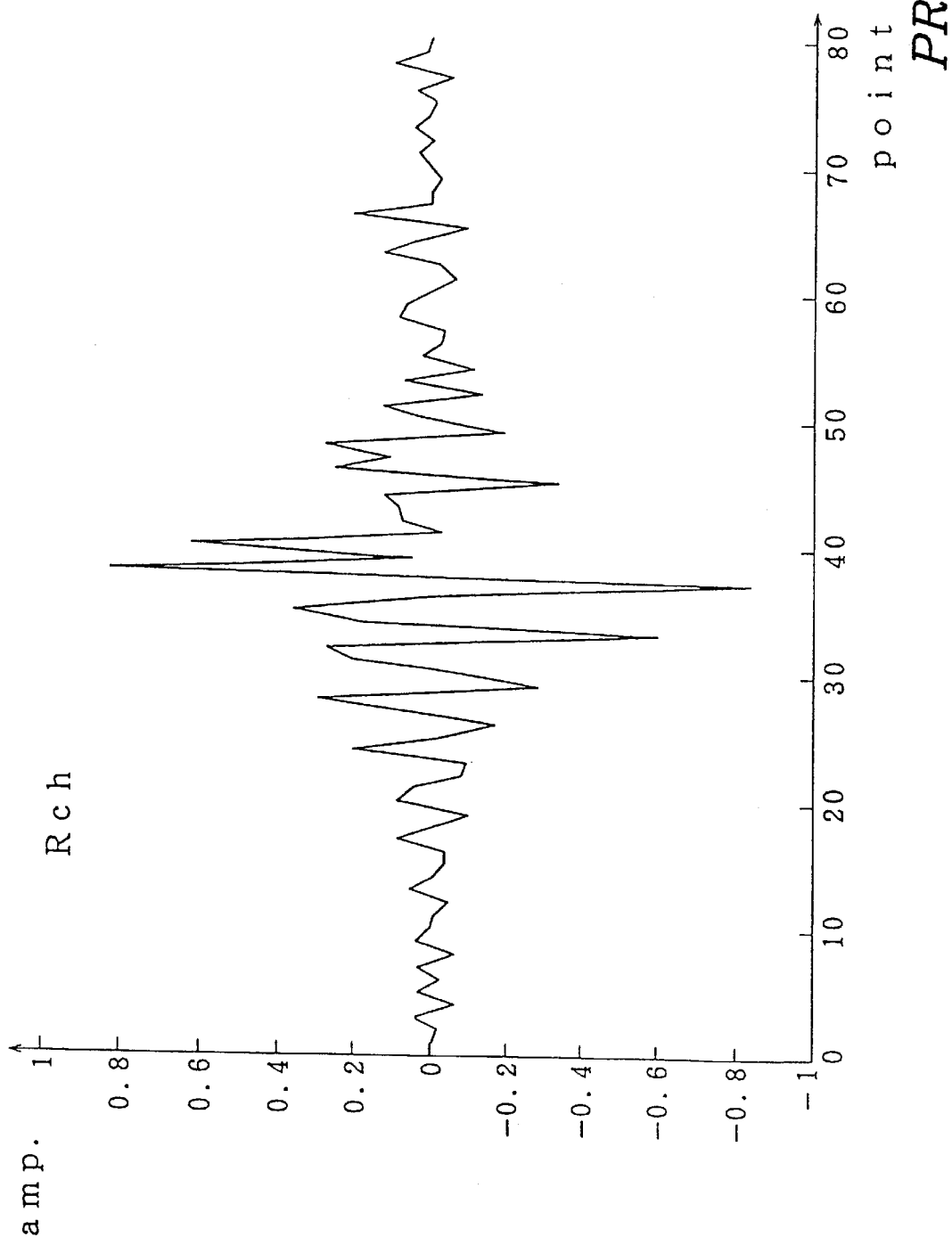
FIG. 28 is a graph illustrating the filter coefficient (time characteristic) of the conventional signal processing device shown in FIG. 23 in the R channel.
Figure 30:
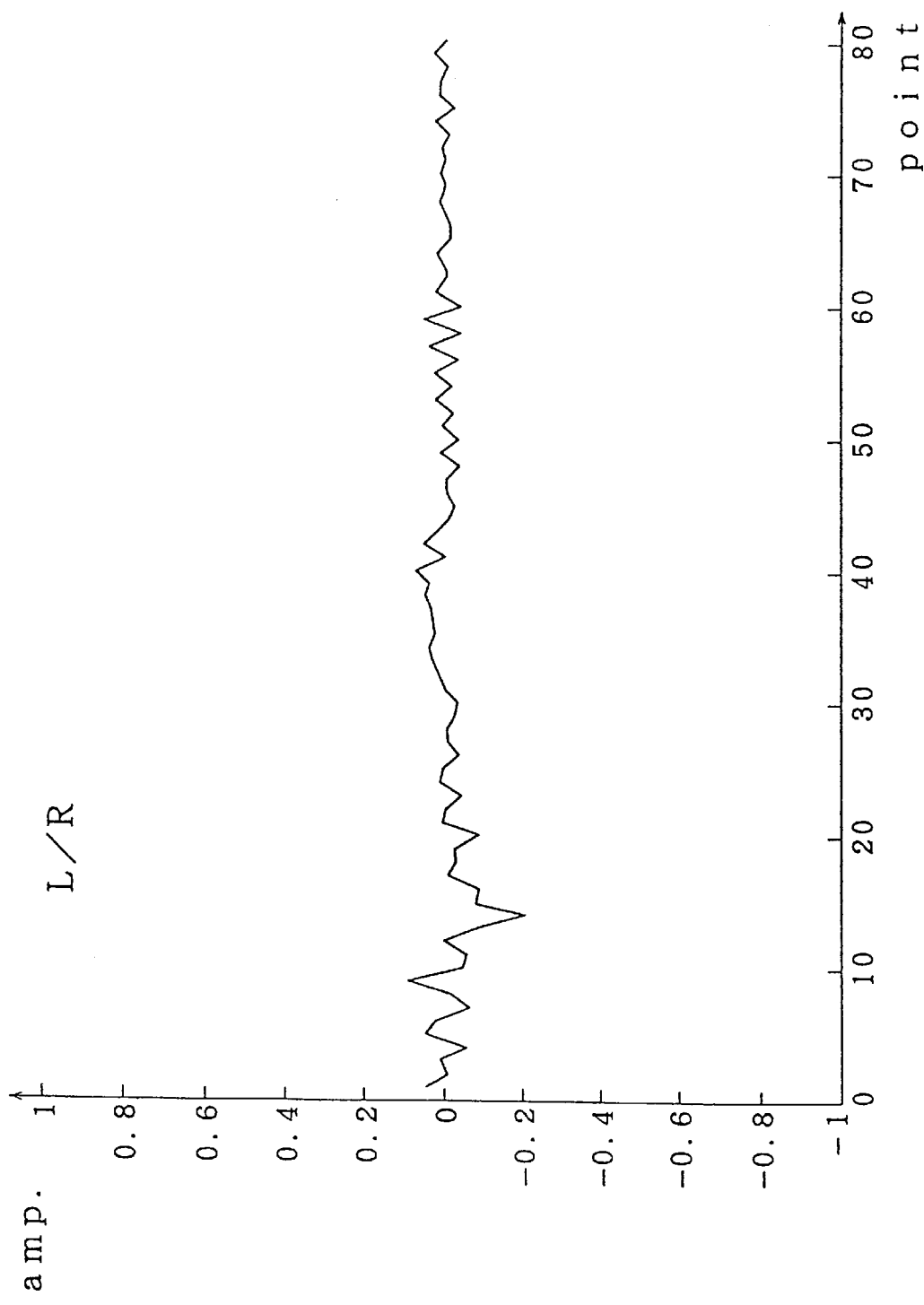
FIG. 30 is a graph illustrating the filter coefficient (time characteristic) of the signal processing device shown in FIG. 22.

FIG. 26 shows an example of a tap coefficient of the FIR filter included in the signal processor 2001-1 having the frequency characteristic shown in FIG. 25, and FIG. 28 shows an example of a tap coefficient of the FIR filter included in the signal processor 2001-2 having the frequency characteristic shown in FIG. 27. FIG. 30 shows an example of a tap coefficient of the FIR filter included in the first signal processor 2001 having the frequency characteristic shown in FIG. 29. As can be appreciated from these figures, the signal processors 2001-1 and 2001-2 in the conventional sound image localization device 2500 each requires about 128 taps (i.e., 256 taps in total), whereas the first signal processor 2001 in the sound image localization device 2200 in this example requires about 128 taps. The first signal processor 2001 having such a transmission characteristic is supplied with an output signal of the signal divider 2006.

In the conventional sound image localization device 2500, sound YL(n) reaching the left ear of the listener 2010 and sound YR(n) reaching the right ear of the listener 2010 are respectively represented by expressions (15) and (16).

$$YL(n)=S(n) \times hL(n) \times h1(n)+S(n) \times hR(n) \times h3(n) \tag{15}$$

$$YR(n)=S(n) \times hL(n) \times h2(n)+S(n) \times hR(n) \times h4(n) \tag{16}$$

In the sound image localization device 2200 in this example, sound Y'L(n) reaching the left ear of the listener 2010 and sound Y'R(n) reaching the right ear of the listener 2010 are respectively represented by expressions (17) and (18).

$$Y'L(n)=S(n) \times hL(n)/hR(n) \times h1(n)+S(n) \times h3(n) \tag{17}$$

$$Y'R(n)=S(n) \times hL(n)/hR(n) \times h2(n)+S(n) \times h4(n) \tag{18}$$

Comparison between expressions (15) and (16) and expressions (17) and (18) indicates that the input signal to the sound image localization device 2200 is;

$$1/hR(n) \tag{19}$$

of the signal input to the conventional sound image localization device 2500.

Accordingly, the quality of the output signal from the sound image localization device 2200 is equal to the signal obtained by filtering the output signal from the conventional device 2500 with the transmission characteristic represented by expression (19). As a result, the sound in a high sound region tends to be intensified. However, since the feeling of localization does not change, such a method for localizing the sound image is effective in the case where the sound quality is not important.

The sound image localization device 2200 provides substantially the same level of feeling of localization as that of the conventional sound image localization device 2500 with a smaller amount of operation.

An output from the first signal processor 2001 is sent to the D/A converter 2007-1, and the other of the two signals obtained by the signal divider 2006 is sent to the D/A converter 2007-2. The outputs from the D/A converters 2007-1 and 2007-2 are respectively sent to the speakers 2008-1 and 2008-2, and the speakers 2008-1 and 2008-2 output the sound to prescribed areas. Thus, a virtual sound image is constantly localized at the position of the virtual speaker 2009.

(Example 7)

Figure 31:
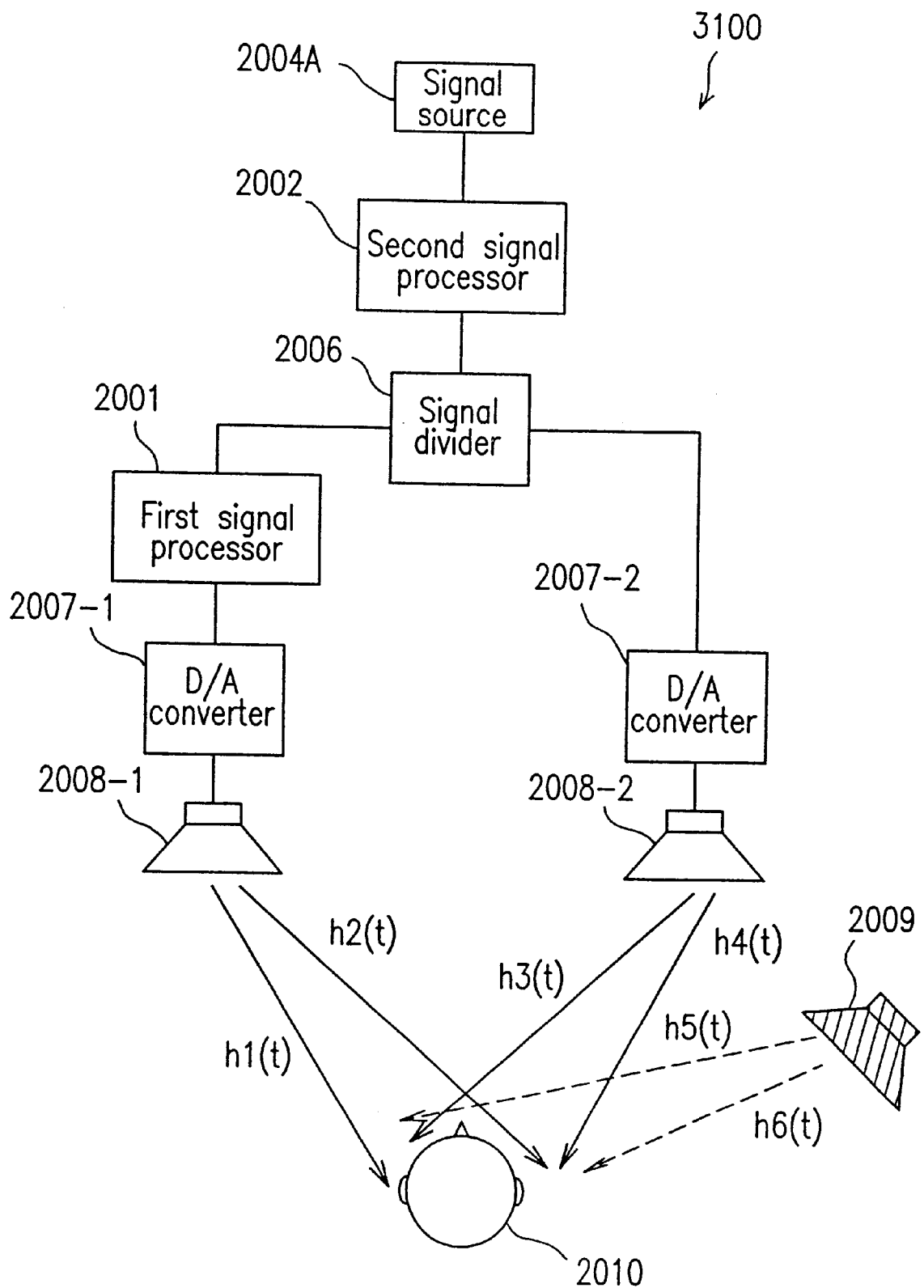
FIG. 31 is a block diagram illustrating a structure of a sound image localization device in a seventh example according to the present invention.

A sound image localization device 3100 in a seventh example according to the present invention will be described. FIG. 31 is a block diagram illustrating an overall structure of the sound image localization device 3100. Identical elements previously discussed with respect to FIG. 22 bear identical reference numerals and the descriptions thereof will be omitted.

In addition to the structure of the sound image localization device 2200 in the sixth example, the sound image localization device 3100 includes a second signal processor 2002 between the signal source 2004A and the signal divider 2006. The signal processor 2002 includes an FIR filter or an IIR filter shown in FIG. 24. The frequency characteristic of the signal processor 2002 will be described later.

A signal processed by the second signal processor 2002 is divided into two signals. One of the signals is input to a D/A converter 2007-2 and the other signal is input to the first signal processor 2001. The first signal processor 2001 includes an FIR filter shown in FIG. 24.

The frequency characteristic (transfer function) of the first signal processor 2001 is set to be the same as in the sound image localization device 2200 in the sixth example. In the seventh example also, the frequency characteristic of the first signal processor 2001 is obtained using a division performed in the frequency domain. The frequency characteristic of the first signal processor 2001 can also be obtained using various methods such as, for example, inverted convolution operation and the like. By any of such methods, a similar effect can be obtained.

The frequency characteristic of the second signal processor 2002 is set to be the same as the frequency characteristic of the denominator when the frequency characteristic of the first signal processor 2001 is obtained, i.e., the frequency characteristic of hR(n) as represented by expressions (17), (18) and (20).

$$Y'L(n)=S'(n) \times hL(n)/hR(n) \times h1(n)+S'(n) \times h3(n) \qquad (17)$$

$$Y'R(n)=S'(n) \times hL(n)/hR(n) \times h2(n)+S'(n) \times h4(n) \qquad (18)$$

$$S'(n)=S(n) \times hR(n) \qquad (20)$$

By substituting S'(n) into expressions (17) and (18), Y'L(n) and Y'R(n) are respectively represented by expressions (21) and (22).

$$Y'L(n)=S(n) \times hL(n) \times h1(n)+S(n) \times hR(n) \times h3(n) \qquad (21)$$

$$Y'R(n)=S(n) \times hL(n) \times h2(n)+S(n) \times hR(n) \times h4(n) \qquad (22)$$

Expressions (21) and (22) respectively match expressions (15) and (16). Thus, the sound image localization device 3100 in this example localizes the sound source at a constant position of an imaginary sound image without causing any significant sound change with the same level of the transmission characteristic as that of the conventional device 2500, i.e., in any of the low, middle and high sound regions.

Since the feeling of localization is realized by the first signal processor 2001, the second signal processor 2002 requires a smaller number of taps of the filter than in the conventional device 2500. The sound image localization device 3100 in this example realizes the same level of sound quality with the signal processor 2002 including a 32-tap filter.

Figure 32:
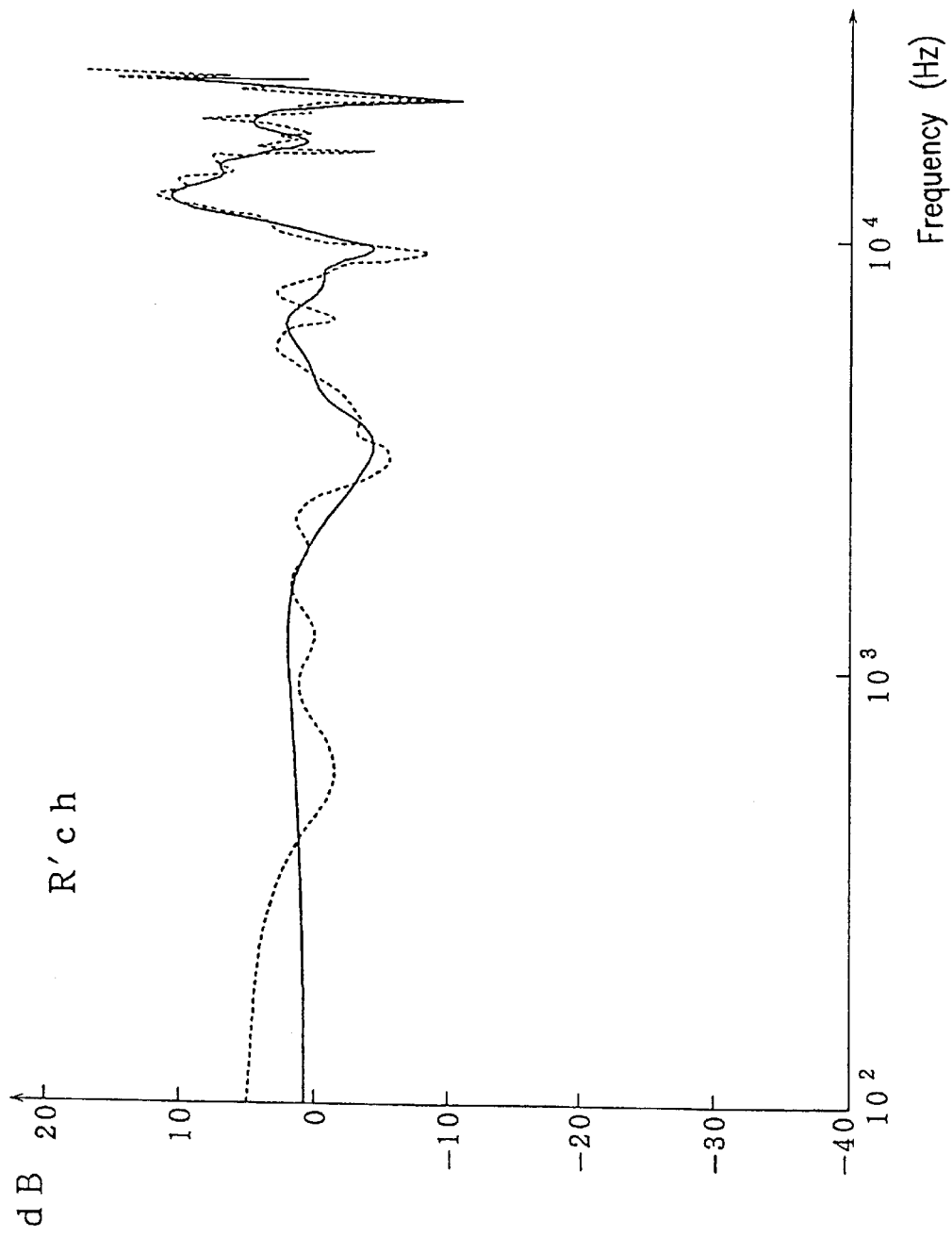
FIG. 32 is a graph illustrating the frequency characteristic of the signal processing device shown in FIG. 31.
Figure 33:
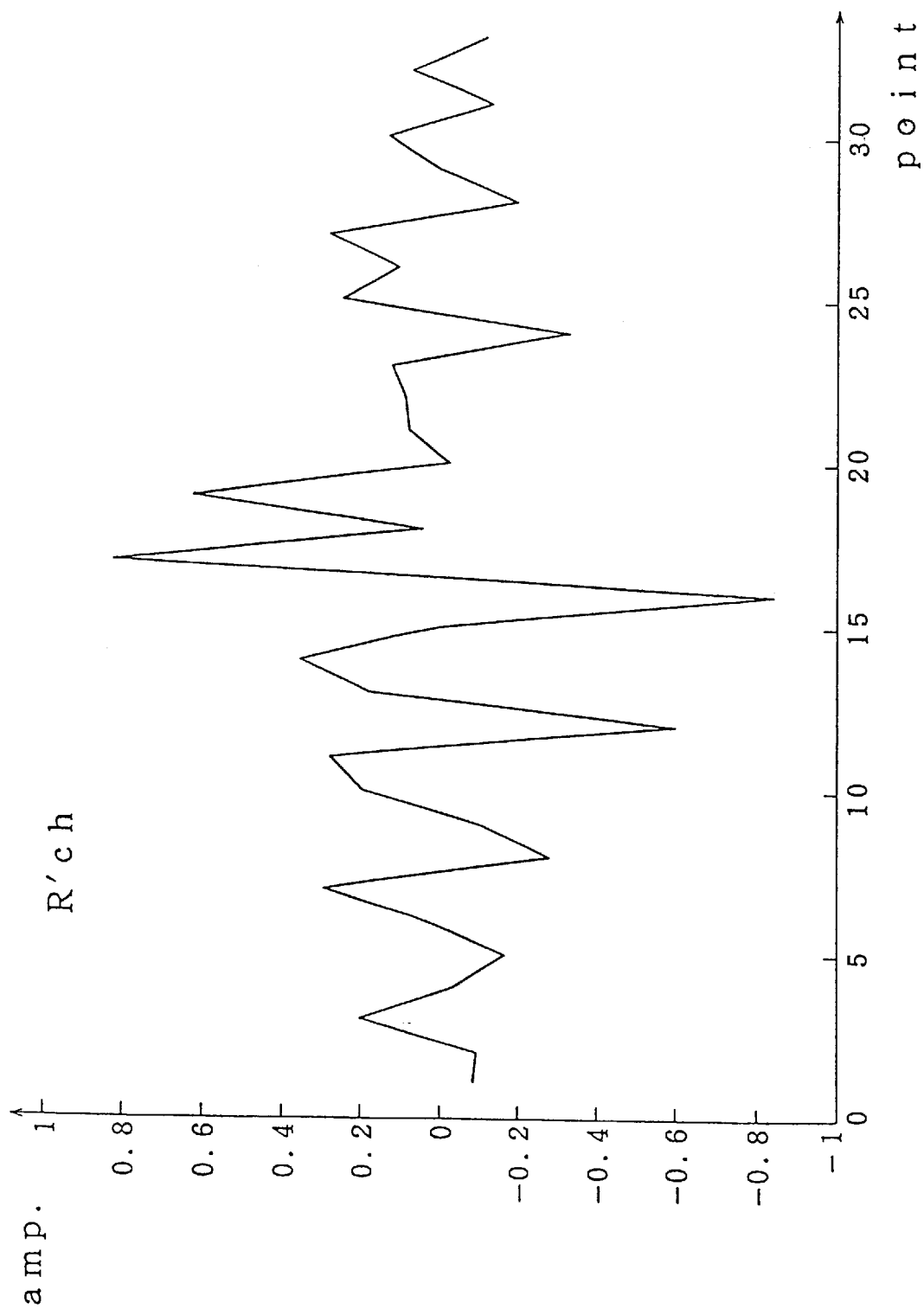
FIG. 33 is a graph illustrating the filter coefficient (time characteristic) of the signal processing device shown in FIG. 31.

FIG. 32 shows an example of frequency characteristic of an FIR filter included in the second signal processor 2002. FIG. 33 shows an example of a tap coefficient of the FIR filter having the frequency characteristic shown in FIG. 32. The amount of operation required in the sound image localization device 3100 can be compared with that of the conventional device 2500 as follows:

Conventional: convolution of 128 taps, twice
7th example: convolution of 128 taps + convolution of 32 taps Thus, the sound image localization device 3100 provides substantially the same level of sound quality and feeling of localization as those of the conventional device 2500, with about ⅝ of the amount of operation.

An output from the first signal processor 2001 is sent to the D/A converter 2007-1, and the other of the two signals obtained by the signal divider 2006 is sent to the D/A converter 2007-2. The outputs from the D/A converters 2007-1 and 2007-2 are respectively sent to the speakers 2008-1 and 2008-2, and then the speakers 2008-1 and 2008-2 output the sound to prescribed areas. Thus, a virtual sound image is constantly localized at the position of the virtual speaker 2009.

(Example 8)

Figure 34:
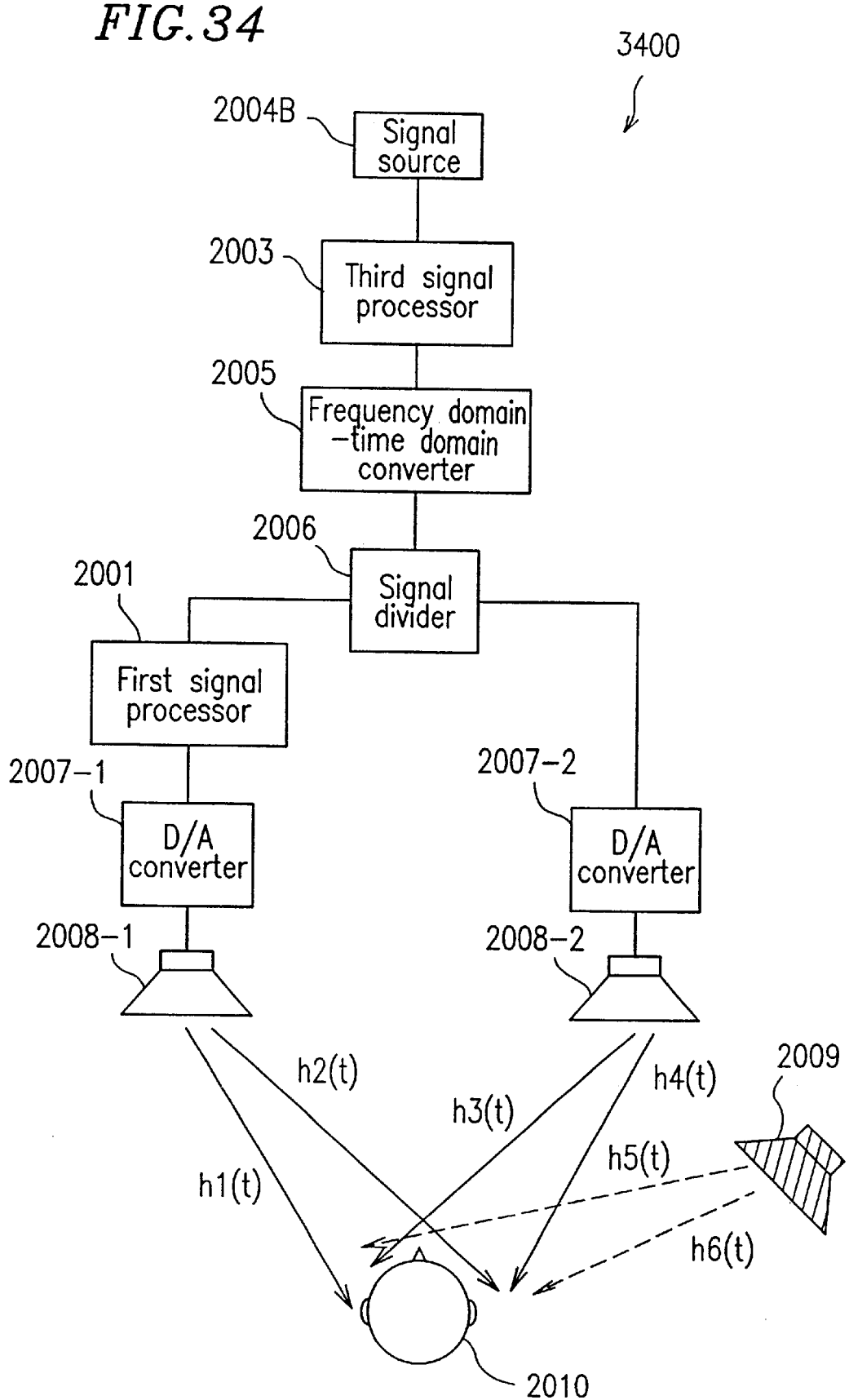
FIG. 34 is a block diagram illustrating a structure of a sound image localization device in an eighth example according to the present invention.

A sound image localization device 3400 in an eighth example according to the present invention will be described. FIG. 34 is a block diagram illustrating an overall structure of the sound image localization device 3400. Identical elements previously discussed with respect to FIG. 31 bear identical reference numerals and the descriptions thereof will be omitted.

The sound image localization device 3400 in the eighth example includes a signal source 2004B for outputting an audio signal for the frequency domain, in lieu of the signal source 2004A. For example, the signal source 2004B outputs a signal of an MDCT component in ATRAC (adaptive transform acoustic coding). A third signal processor 2003 and a frequency domain-time domain converter 2005 are provided between the signal source 2004B and the signal divider 2006, in lieu of the second signal processor 2002.

Figure 24:
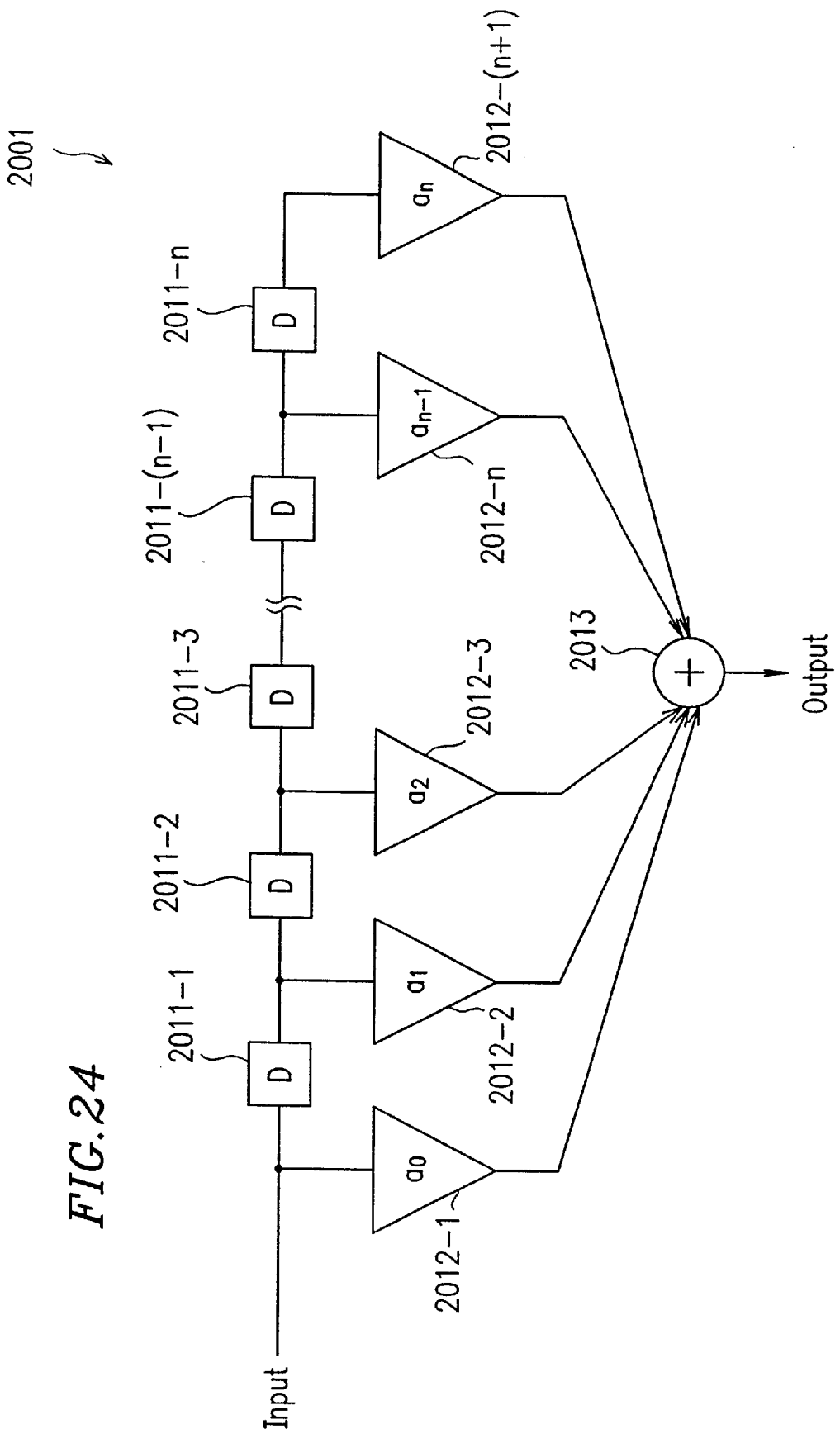
FIG. 24 is a block diagram illustrating a structure of an FIR filter used in a sound image localization device according to the present invention.
Figure 35:
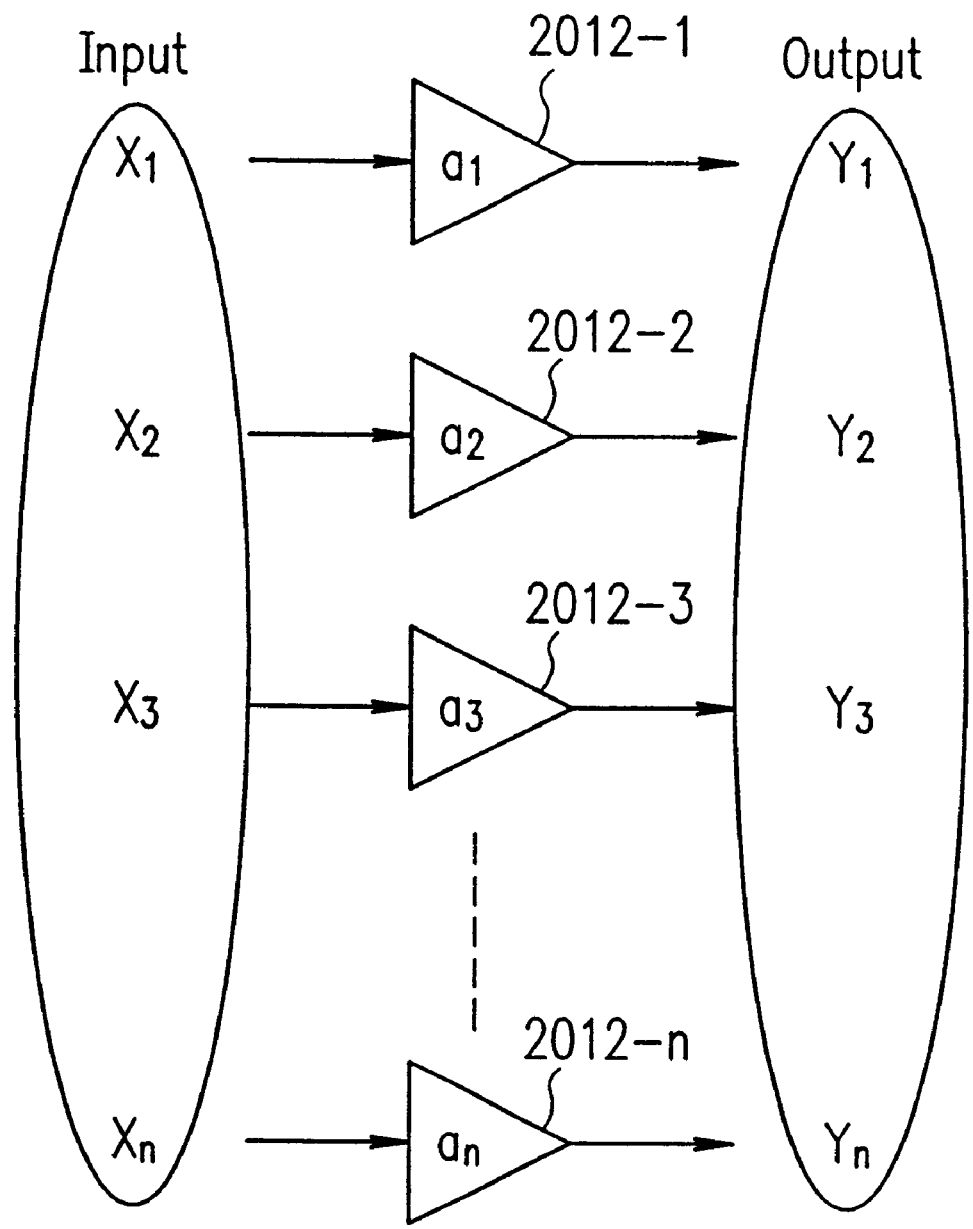
FIG. 35 a block diagram illustrating a signal processor in the sound image localization device shown in FIG. 34.

The first signal processor 2001 has an FIR filter having the structure shown in FIG. 24. FIG. 35 shows an exemplary structure of the third signal processor 2003. The third signal processor 2003 includes multipliers 2012-1, 2012-2, . . . 2012-n for respectively amplifying input signals X1, X2, . . . Xn by multiplication coefficients a1, a2, . . . an. The multipliers 2012-1 2012-2, . . . 2012-n output signals Y1, Y2, . . . Yn.

Returning to FIG. 34, a digital audio signal for the frequency domain output from to the signal source 2004B is input to the third signal processor 2003. The third signal processor 2003 processes the input signal on a frequency band-by frequency band basis as shown in FIG. 35 in order to localize the sound image. In other words, when the signals of respective frequency bands (X1, X2, . . . Xn) are input, the signals are multiplied by the multiplication coefficients a1, a2, . . . an. The multiplication coefficients a1, a2, . . . an of the multipliers 2012-1, 2012-2, . . . 2012-n are determined by the frequency domain-time domain conversion system used by the frequency domain-time domain converter 2005.

The signal processed by the third signal processor 2003 is divided into two signals by the signal divider 2006. one of the signals is input to a D/A converter 2007-2 and the other signal is input to the first signal processor 2001.

The frequency characteristic (transmission characteristic) of the first signal processor 2001 is set to be the same as that of the sixth example. In this example, the frequency characteristic of the first signal processor 2001 is obtained using a division performed in the frequency domain. The frequency characteristic of the first signal processor 2001 can also be obtained using various methods such as, for example, an inverted convolution operation and the like. By any of such methods, a similar effect can be obtained.

The frequency characteristic (transmission characteristic) of the third signal processor 2003 is preferably set to be the same as the frequency characteristic of the denominator of expression (14), i.e., hR(n) as represented by expressions (23), (24) and (25).

$$Y'L(n)=S'(n)\times hL(n)/hR(n)\times h1(n)+S'(n)\times h3(n) \quad (23)$$

$$Y'R(n)=S'(n)\times hL(n)/hR(n)\times h2(n)+S'(n)\times h4(n) \quad (24)$$

$$S'(n)=S(n)\times hR(n) \quad (25)$$

By substituting S'(n) into expressions (23) and (24), Y'L(n) and Y'R(n) are respectively represented by expressions (26) and (27).

$$Y'L(n)=S(n)\times hL(n)\times h1(n)+S(n)\times hR(n)\times h3(n) \quad (26)$$

$$Y'R(n)=S(n)\times hL(n)\times h2(n)+S(n)\times hR(n)\times h4(n) \quad (27)$$

Expressions (26) and (27) respectively match expressions (15) and (16). Thus, the sound image localization device 3400 in this example have the same level of transmission characteristic of the conventional device 2500.

Since the third signal processor 2003 includes a plurality of multipliers, the amount of operation is determined by the conversion length of the frequency domain-time domain conversion. Where the conversion length is m, the amount of operation is as follows:

Conventional: convolution of 128 taps, twice =
128 × m × 2 = 256 m
8th example: convolution of 128 taps + m-order multipliers =
128 × m + m = 129 m

The sound image localization device 3400 providing substantially the same level of sound quality and feeling of localization as those of the conventional device 2500 can be obtained, with about ½ of the amount of operation.

An output from the first signal processor 2001 is sent to the D/A converter 2007-1, and the other of the two signals obtained by the signal divider 2006 is sent to the D/A converter 2007-2. The outputs from the D/A converters 2007-1 and 2007-2 are respectively sent to the speakers 2008-1 and 2008-2, and then the speakers 2008-1 and 2008-2 output the sound to prescribed regions. Thus, a virtual sound image is constantly localized at the position of the virtual speaker 2009.

(Example 9)

Figure 36:
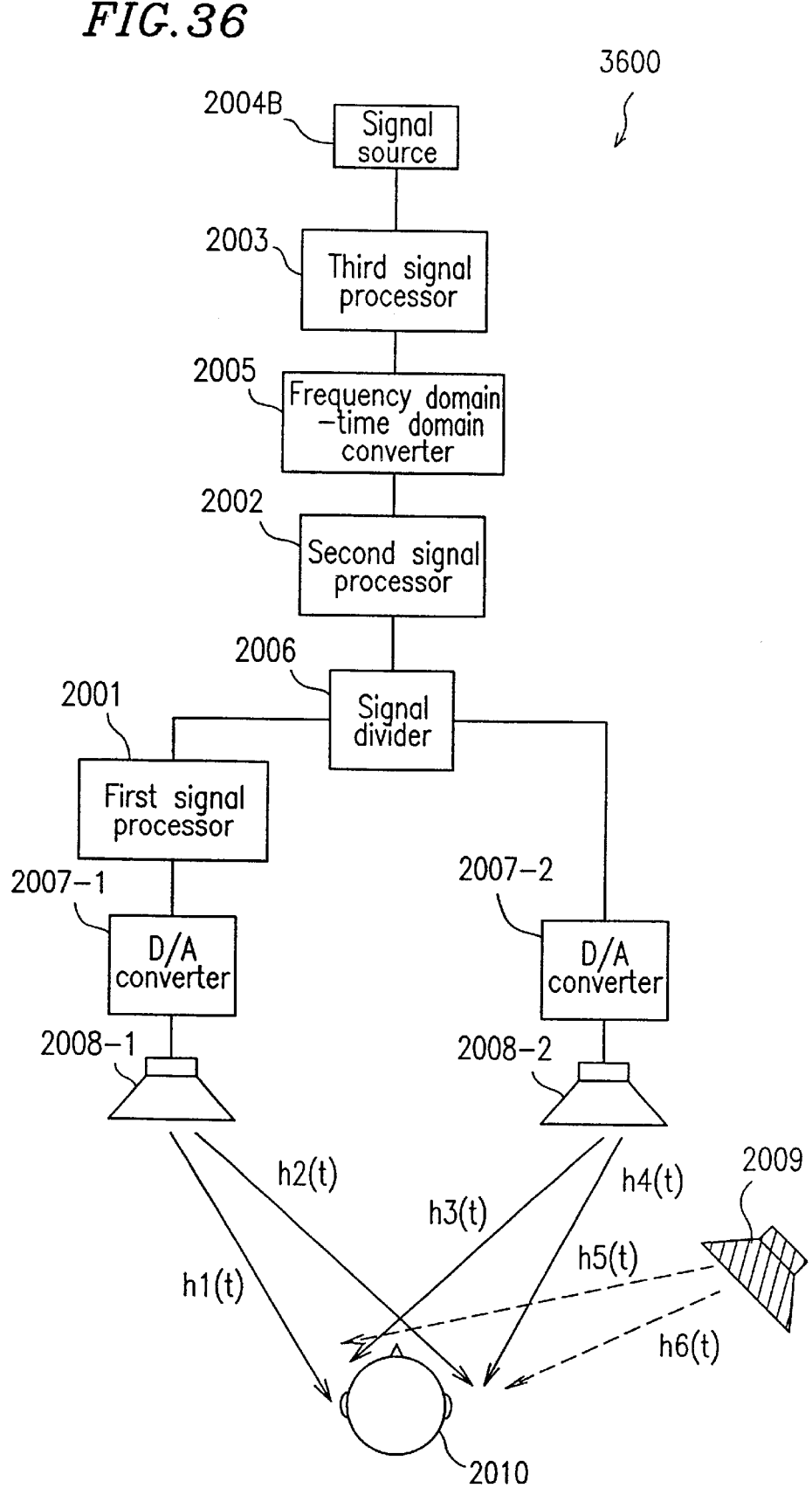
FIG. 36 is a block diagram illustrating a structure of a sound image localization device in a ninth example according to the present invention.

A sound image localization device 3600 in a ninth example according to the present invention will be described. FIG. 36 is a block diagram illustrating an overall structure of the sound image localization device 3600. Identical elements previously discussed with respect to FIGS. 22, 31 and 34 bear identical reference numerals and the descriptions thereof will be omitted.

The sound image localization device 3600 in the ninth example includes a third signal processor 2003, the frequency domain-time domain converter 2005 and a second signal processor 2002 between the sound source 2004B and the signal divider 2006.

The first Signal processor 2001 and the second signal processor 2002 each have an FIR filter having the structure shown in FIG. 24. The third signal processor 2003 has an FIR filter having the frequency characteristic shown in FIG. 25.

Referring to FIG. 36, a digital audio signal for the frequency domain output from the signal source 2004B is input to the third signal processor 2003. The third signal processor 2003 processes the input signal with a prescribed multiplication coefficient on a frequency band-by-frequency band basis in order to localize the sound image. The multiplication coefficients of the multipliers included in the third signal processor are determined by the frequency domain-time domain converter 2005.

An output from the third signal processor 2003 is sent to the frequency domain-time domain converter 2005 and converted into a time domain signal (PCM audio signal). Then, the time domain signal is sent to the second signal processor 2002. The second signal processor 2002 converts the frequency characteristic using an FIR filter having a smaller number of taps. Thus, the second signal processor 2002 corrects, on a time axis, at least one of phase component, sound volume and sound quality which are not corrected by the third signal processor 2003.

The signal obtained by the second signal processor 2002 is divided into two signals by the signal divider 2006. One of the signals is input to a D/A converter 2007-2 and the other signal is input to the first signal processor 2001.

As in the sixth example, the frequency characteristic of the first signal processor 2001 is obtained by expression (14). The product of the frequency characteristics (transmission characteristics) of the second signal processor 2002 and the third signal processor 2003 is preferably set to be the same as the frequency characteristic of the denominator of expression (14) for obtaining the frequency characteristic of the signal processor 2001-2 in FIG. 23, i.e., hR(n) as represented by expressions (23), (24) and (25).

$$Y'L(n)=S'(n)\times hL(n)/hR(n)\times h1(n)+S'(n)\times h3(n) \qquad (23)$$

$$Y'R(n)=S'(n)\times hL(n)/hR(n)\times h2(n)+S'(n)\times h4(n) \qquad (24)$$

$$S'(n)=S(n)\times hR(n) \qquad (25)$$

By substituting S'(n) into expressions (23) and (24), Y'L(n) and Y'R(n) are respectively represented by expressions (26) and (27).

$$Y'L(n)=S(n)\times hL(n)\times h1(n)+S(n)\times hR(n)\times h3(n) \qquad (26)$$

$$Y'R(n)=S(n)\times hL(n)\times h2(n)+S(n)\times hR(n)\times h4(n) \qquad (27)$$

Expressions (26) and (27) respectively match expressions (15) and (16). Thus, the sound image localization device 3600 in this example have the same level of transmission characteristic as that of the conventional device 2500.

Since the third signal processor 2003 includes a plurality of multipliers, the amount of operation is determined by the conversion length of the frequency domain-time domain conversion. Where the conversion length is m, the amount of operation is as follows:

| | |
|---|---|
| Conventional: | convolution of 128 taps, twice = 128 × m × 2 = 256 m |
| 8th example: | convolution of 128 taps + m-order multipliers = 128 × m + m = 129 m |

The sound image localization device 3600 provides substantially the same level of sound quality and feeling of localization as those of the conventional device 2500, with about ½ of the amount of operation.

An output from the first signal processor 2001 is sent to the D/A converter 2007-1, and the other of the two signals obtained by the signal divider 2005 is sent to the D/A converter 2007-2. The outputs from the D/A converters 2007-1 and 2007-2 are respectively sent to the speakers 2008-1 and 2008-2, and then the speakers 2008-1 and 2008-2 output the sound to prescribed regions. Thus, a virtual sound image is constantly localized at the position of the virtual speaker 2009.

The frequency characteristic of the first signal processor 2001 is obtained using a division performed in the frequency domain. The frequency characteristic of the first signal processor 2001 can also be obtained using various methods such as, for example, an inverted convolution operation.

As can be appreciated from the sixth, seventh, eighth, and ninth examples, a sound image localization device according to the present invention provides the same level of the feeling of localization as that of a conventional device with a smaller amount of operation.

According to the present invention, the amount of operation is reduced by performing signal processing in one channel which is conventionally performed in each of a plurality of channels.

In the case where the sound quality adjustment is additionally performed, a sound image localization device according to the present invention realizes the same level of sound quality as that of the conventional device with a smaller amount of operation.

In the case where the sound quality adjustment is performed for a frequency domain, a sound image localization device according to the present invention realizes the same level of sound quality as that of the conventional device with a smaller amount of operation.

In the case where the sound quality adjustment is performed for a frequency domain and a time domain, a sound image localization device according to the present invention realizes the same level of sound quality as that of the conventional device with a smaller amount of operation.

(Example 10)

Figure 37:
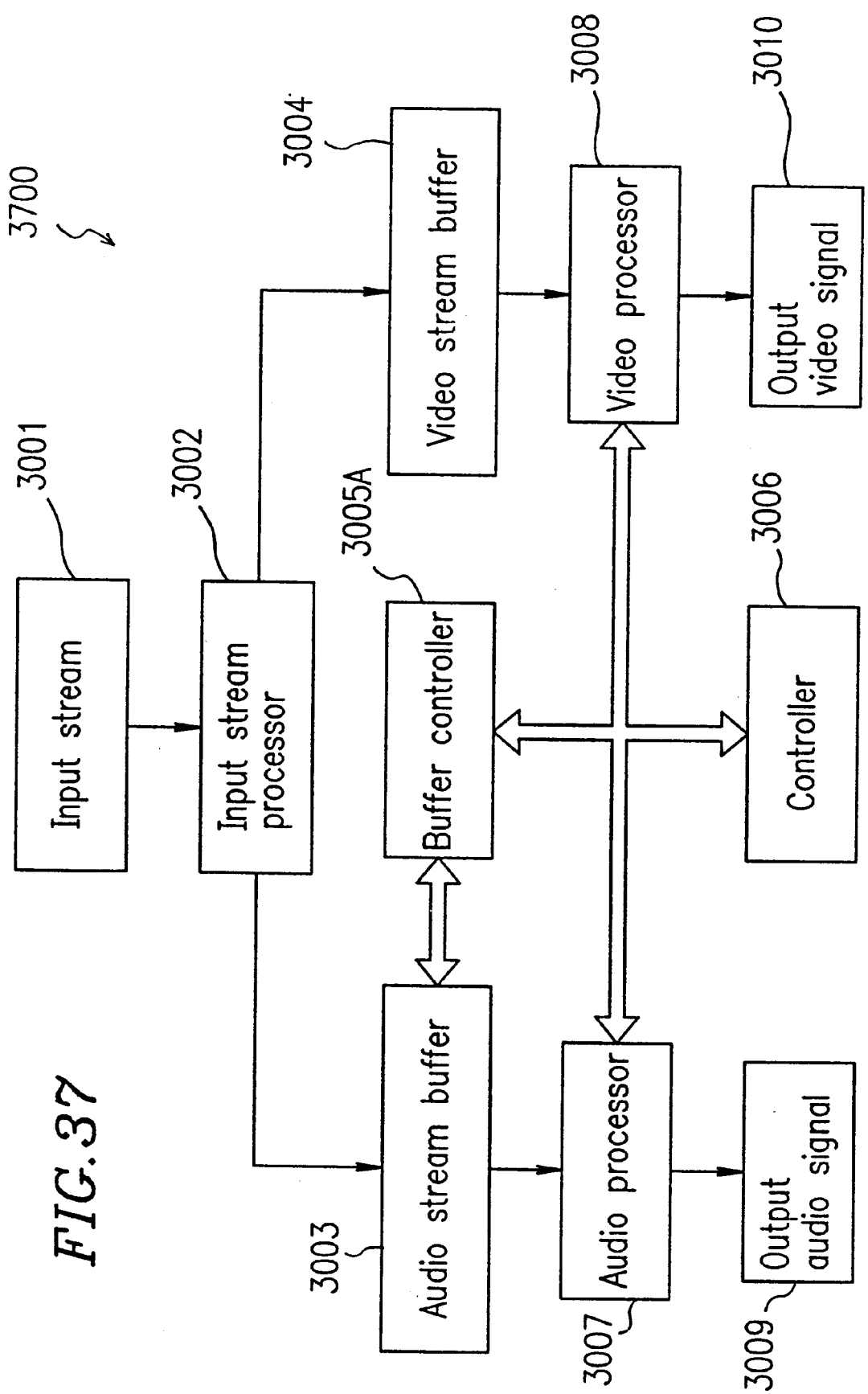
FIG. 37 is a block diagram illustrating a structure of an audio signal processing device in a tenth example according to the present invention.

An audio signal processing device 3700 in a tenth example according to the present invention will be described with reference to FIG. 37. FIG. 37 is a block diagram illustrating the audio signal processing device 3700 in the tenth example. The audio signal processing device 3700 includes an input stream processor 3002, an audio stream buffer 3003, a video stream buffer 3004, a buffer controller 3005A, a controller 3006, an audio processor 3007, and a video processor 3008.

An input stream 3001 to be input to the input stream processor 3002 is output data from a DVD or equivalent data. In other words, the input stream processor 3002 receives a video signal or an audio signal which is compressed and multiplexed. In this example, the input steam 3001 is a data stream output from a DVD, the video data is in conformity with MPEG2 and the audio data is in conformity with AC-3 for simplicity. Other types of data stream can also be used in a similar manner.

When the input stream 3001 is input to the input stream processor 3002, the input stream processor 3002 extracts video data and audio data to be reproduced from the input stream 3001 and stores the video data to the video stream buffer 3004 and audio data to the audio stream buffer 3003. At this point, the buffer controller 3005A supervises the free capacity of the audio stream buffer 3003.

In a normal reproduction stateS when the video data is input to the video processor 3008, the video processor 3008 decodes the video data into an output video signal 3010. When the audio data is input to the audio processor 3007, the audio processor 3007 decodes and converts the audio data into an output audio signal 3009.

In a high-rate reproduction state, the video processor 3008 follows an instruction from the controller 3006 to perform high-rate reproduction at a prescribed rate. For performing the high-rate reproduction, the audio processor 3007 equalizes the sound pitch to that of the normal reproduction state and discards a part of the audio data. In the case where the video data is in conformity with MPEG2, the high-rate reproduction at the prescribed rate is performed in either one of the following rules.

(1-1) Reproduce only I picture (reproduction rate: about 6–7 times normal)

(1-2) Reproduce I and P pictures (reproduction rate: 1.5 to 3 times normal)

(1-3) Reproduce I and P pictures and a part of B picture (reproduction rate: 1 to 1.5 times normal)

Other methods then (1-1), (1-2) and (1-3) can be used.

During the high-rate reproduction, the buffer controller 3005A supervises the free capacity of the audio stream buffer 3003. Normal reproduction is performed until the free capacity of the audio stream buffer 3003 becomes smaller than a prescribed value W. When the free capacity of the audio stream buffer 3003 becomes smaller than the prescribed value W, the buffer controller 3005A informs the audio processor 3007 of the remaining free capacity. The prescribed value W can be set to various values in accordance with the system. In this example, the prescribed value W is set to 0. The control is performed in a similar manner when the prescribed value W is set to a different value.

Figure 44:
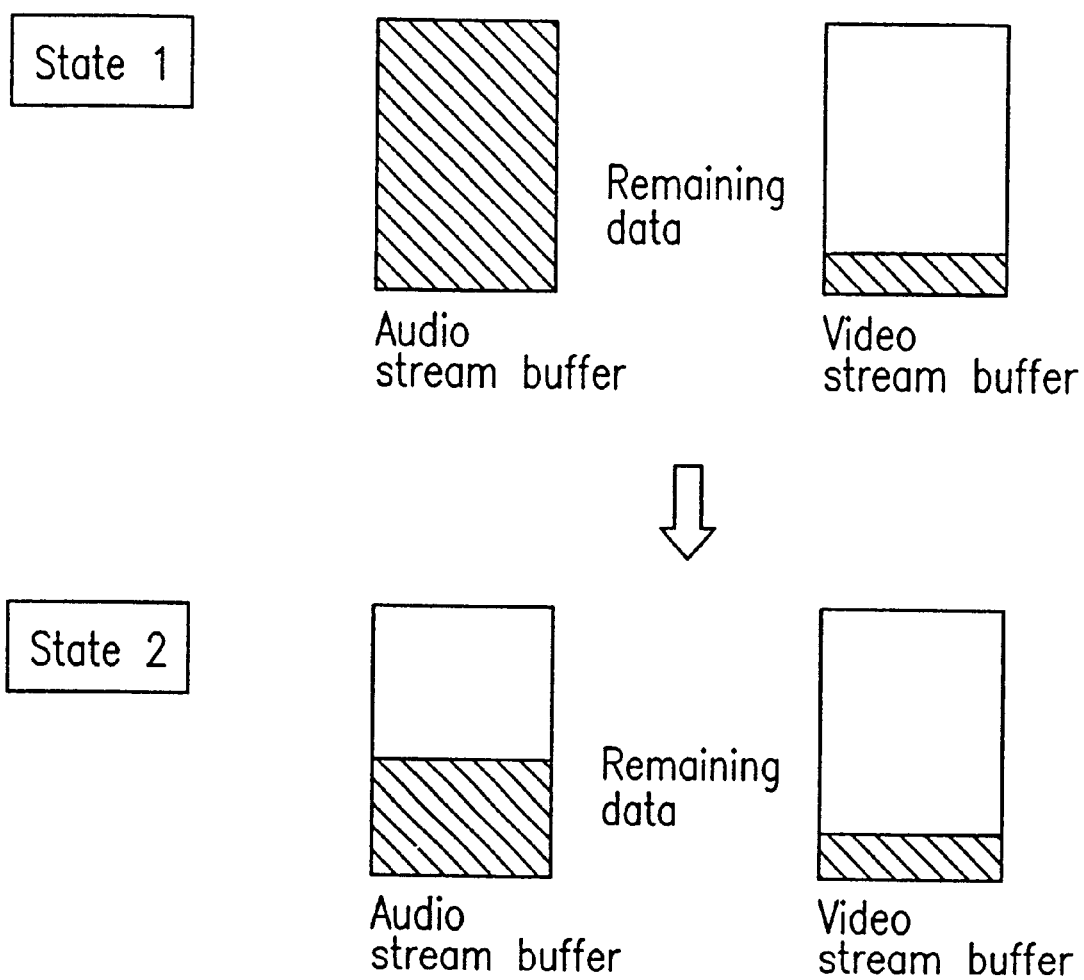
FIG. 44 shows a remaining data amount in an audio stream buffer and a video stream buffer in the audio signal processing device in the tenth and twelfth examples.

When the free capacity of the audio stream buffer 3003 becomes 0, the audio processor 3007 performs high-rate reproduction of the audio data by deleting a part of the output audio data. Such performance will be described with reference to FIG. 44. FIG. 44 shows the states of the audio stream buffer 3003 and the video stream buffer 3004 during reproduction. A shaded part represents a data area, and a blank part represents a usable area.

In the case where the video data is reproduced at a high rate and the free capacity of the audio stream buffer 3003 does not become 0, the audio stream buffer 3003 and the video stream buffer 3004 are in state 2 in FIG. 44. Since video data is still remaining in the video stream buffer 3004, only the video data is reproduced at a high rate by the video processor 3008. Since an audio stream is input in accordance with the reproduction rate of the video data, the amount of the audio data to be decoded for normal reproduction is smaller than the input data amount. Thus, the free capacity of the audio stream buffer 3003 becomes 0 (state 1).

When the free capacity of the audio stream buffer 3003 becomes 0, the buffer controller 3005A conveys such information to the audio processor 3007. In response, the audio processor 3007 discards a prescribed amount of the audio data by flushing, and resumes decoding the audio data at a normal rate from the part immediately after the discarded part of the audio data.

Hereinafter, the prescribed data amount to be discarded and discarding (i.e., deleting) methods will be described.

(i) Clearing the Audio Stream Buffer (Flushing)

The data in the audio stream buffer 3003 is partially or totally flushed intermittently by clearing the audio stream buffer 3003 to partially thin out the stream before decoding. Thus, the amount of audio data to be reproduced is reduced for high-rate reproduction. A prescribed audio data amount to be discarded is an arbitrary amount which is less than the size of the audio steam buffer 3003 in the system used.

Figure 40:
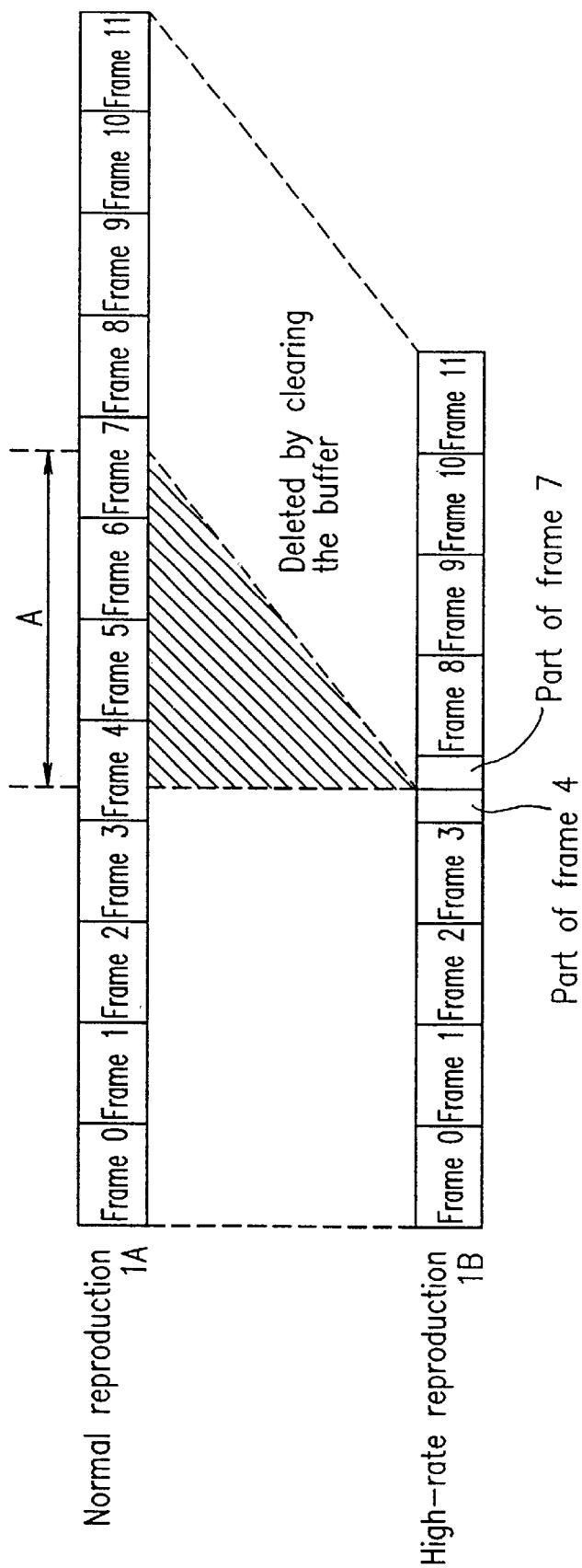
FIG. 40 shows a method for deleting a part of an audio stream in an audio signal processing device according to the present invention.

The audio data reproduced in this manner is shown in FIG. 40. FIG. 40 shows an output audio stream 1A in the normal reproduction and an output audio stream 1B in the high-rate reproduction obtained when the audio stream buffer 3003 is cleared. In the example shown in FIG. 40, the data from a middle of frame 4 to a middle of frame 7 is deleted by clearing the audio stream buffer 3003. As a result, the output audio stream 1B to be decoded during the high-rate reproduction is equal to the output audio stream 1A after section A is deleted. In this case, the number of frames to be decoded is reduced from 12 (normal reproduction) to 8. Thus, the reproduction rate is 12/8=1.5 times normal.

This method is simple and relatively easy to carry out. However, since the audio data cannot be processed on a frame-by-frame basis, an undesirable stream error can occur. Since the content in the audio stream buffer 3003 is totally deleted, audio data cannot be output until the data for the next frame is input.

(ii) Restricting Input Audio Stream

The transfer of the input stream 3001 from the input processor 3002 to the audio stream buffer 3003 is stopped for a prescribed time period. In other words, a part of the input stream 3001 is deleted by non-transfer. Thus, the amount of audio data to be reproduced is reduced for high-rate reproduction. A prescribed audio data amount to be discarded is determined by the reproduction rate of the video data which is supported by the system. Where the video reproduction rate is n (normal reproduction), the amount of audio data which is equal to or more than (n−1) audio frames needs to be discarded each time the transfer is stopped.

Figure 41:
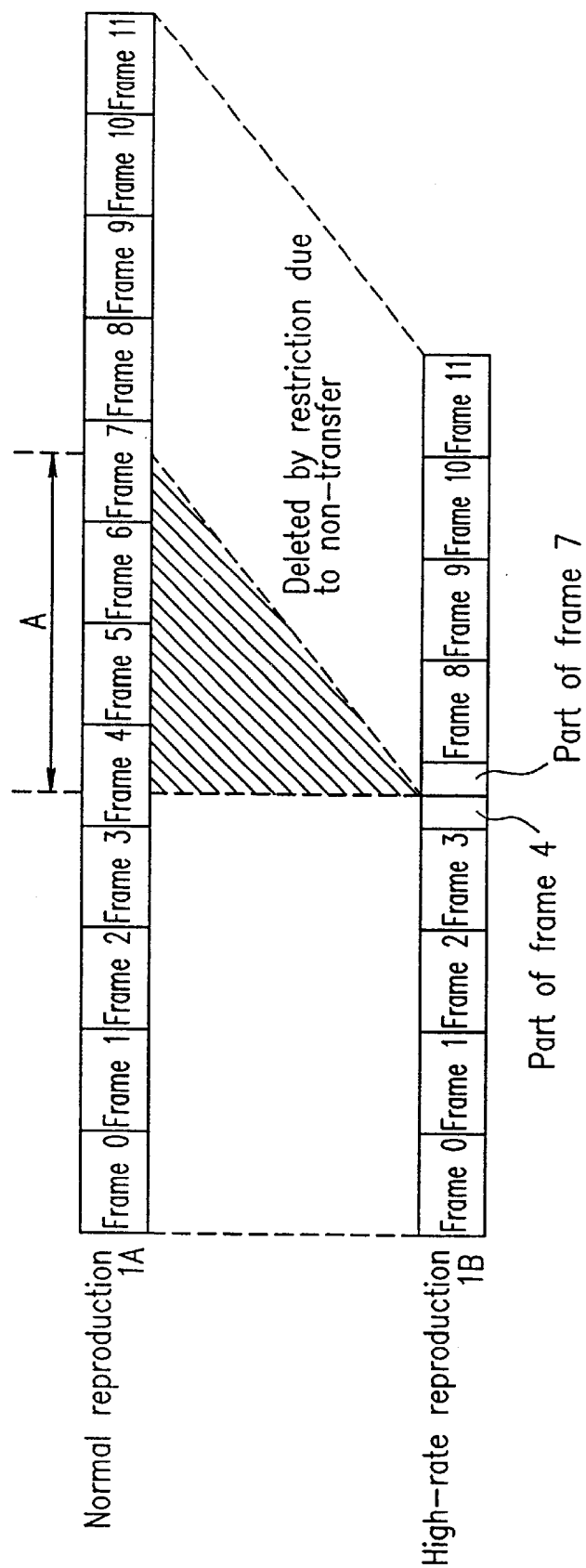
FIG. 41 shows another method for deleting a part of an audio stream in an audio signal processing device according to the present invention.

The audio data reproduced in this manner is shown in FIG. 41. FIG. 41 shows an output audio stream 1A in the normal reproduction and an output audio stream 1B obtained by restricting the transfer of the input stream 3001 for high-rate reproduction. In the example shown in FIG. 41, the data from a middle of frame 4 to a middle of frame 7 is deleted by restricting the input of the input stream 3001. As a result, the output audio stream 1B to be decoded during the high-rate reproduction is equal to the output audio stream 1A after section A is deleted. In this case, the number of frames to be decoded is reduced from 12 (normal reproduction) to 8. Thus, the reproduction rate is 12/8=1.5 times normal.

This method is simple and relatively easy to carry out. However, since the audio data cannot be processed on a frame-by-frame basis, an undesirable stream error can occur. Furthermore, audio data cannot be output until the data for the next frame is input.

(iii) Skipping Input Audio Stream

One to several frames of audio data is skipped on a frame-by-frame basis by the audio processor 3007. Thus, the amount of audio data to be reproduced is reduced for high-rate reproduction. A prescribed audio data amount to be discarded is determined by the reproduction rate of the video data which is supported by the system. Where the video reproduction rate is n (normal reproduction), the amount of audio data which is equal to or more than (n−1) audio frames needs to be discarded each time the data is skipped.

Figure 42:
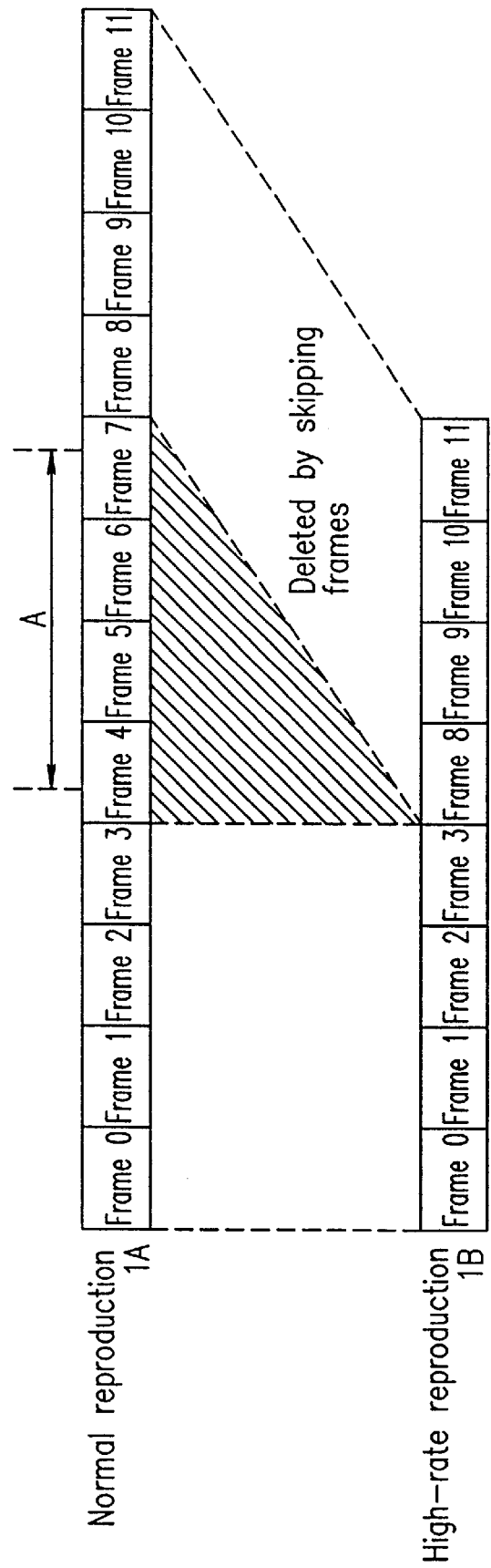
FIG. 42 shows still another method for deleting a part of an audio stream in an audio signal processing device according to the present invention.

The audio data reproduced in this manner is shown in FIG. 42. FIG. 42 shows an output audio stream 1A in the normal reproduction and an output audio stream 1B obtained by partially skipping the audio data for high-rate reproduction. In the example shown in FIG. 42, the data from frame 4 to frame 7 is deleted by skipping the audio data. As a result, the output audio stream 1B to be decoded during the high-rate reproduction is equal to a result of deleting section A from the output audio stream 1A. In this case, the number of frames to be decoded is reduced from 12 (normal reproduction) to 8. Thus, the reproduction rate is 12/8=1.5 times normal.

This method is simple and relatively easy to carry out. Furthermore, since the audio data is processed on a frame-by-frame basis, a stream error does not occur.

(iv) Stopping Output of the Audio Data

Output of one to several frames of audio data is stopped by the audio processor 3007. Thus, the amount of audio data to be reproduced is reduced for high-rate reproduction. A minimum value of a prescribed audio data amount to be discarded by stopping the output is determined by the reproduction rate of the video data which is supported by the system. Where the video reproduction rate is n (normal reproduction), the amount of audio data which is equal to or more then (n−1) audio frames needs to be discarded each time the output is stopped.

Figure 43:
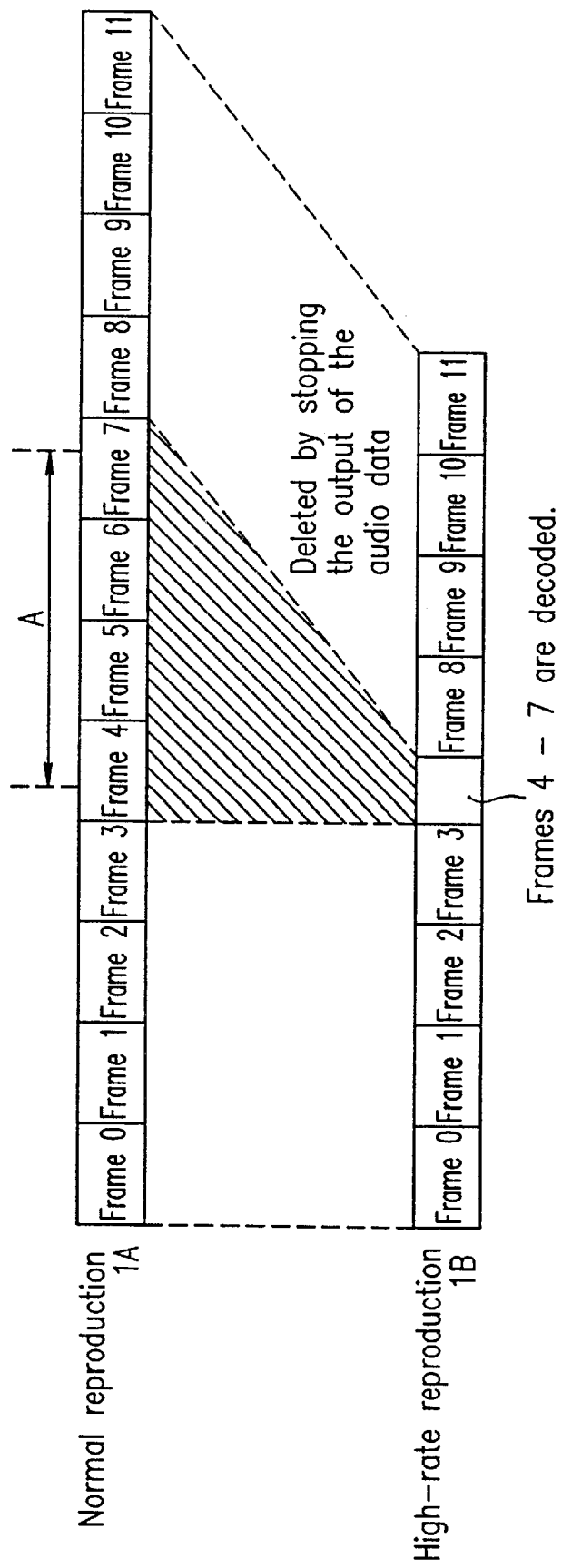
FIG. 43 shows yet another method for deleting a part of an audio stream in an audio signal processing device according to the present invention.

The audio data reproduced in this manner is shown in FIG. 43. FIG. 43 shows an output audio stream 1A in the normal reproduction and an output audio stream 1B obtained by stopping the output of the audio data for high-rate reproduction. In the example shown in FIG. 43, the data from frame 4 to frame 7 is deleted by stopping the output of the audio data. As a result, the output audio stream 1B to be decoded during the high-rate reproduction is equal to a result obtained by deleting section A from the output audio stream 1A after section A. In this case, the number of frames to be decoded is reduced from 12 (normal reproduction) to 8. Thus, the reproduction rate is 12/18=1.5 times normal.

This method is simple and relatively easy to carry out. Furthermore, since the audio data is processed on a frame-by-frame basis, a stream error does not occur.

As described above, the high-rate reproduction of audio data is performed in accordance with the reproduction rate of the video data without changing the reproduction rate of the video data by discarding a part of the audio video stream by either one of methods (i) through (iv) each time the free capacity of the audio stream buffer 3003 becomes 0. The above-mentioned methods (i) through (iv) reduces sound discontinuity. Accordingly, an audio signal processing device in the tenth example reproduces audio data at a high rate in accordance with the reproduction rate of the video data, with less sound discontinuity and in a simpler manner.

(Example 11)

Figure 38:
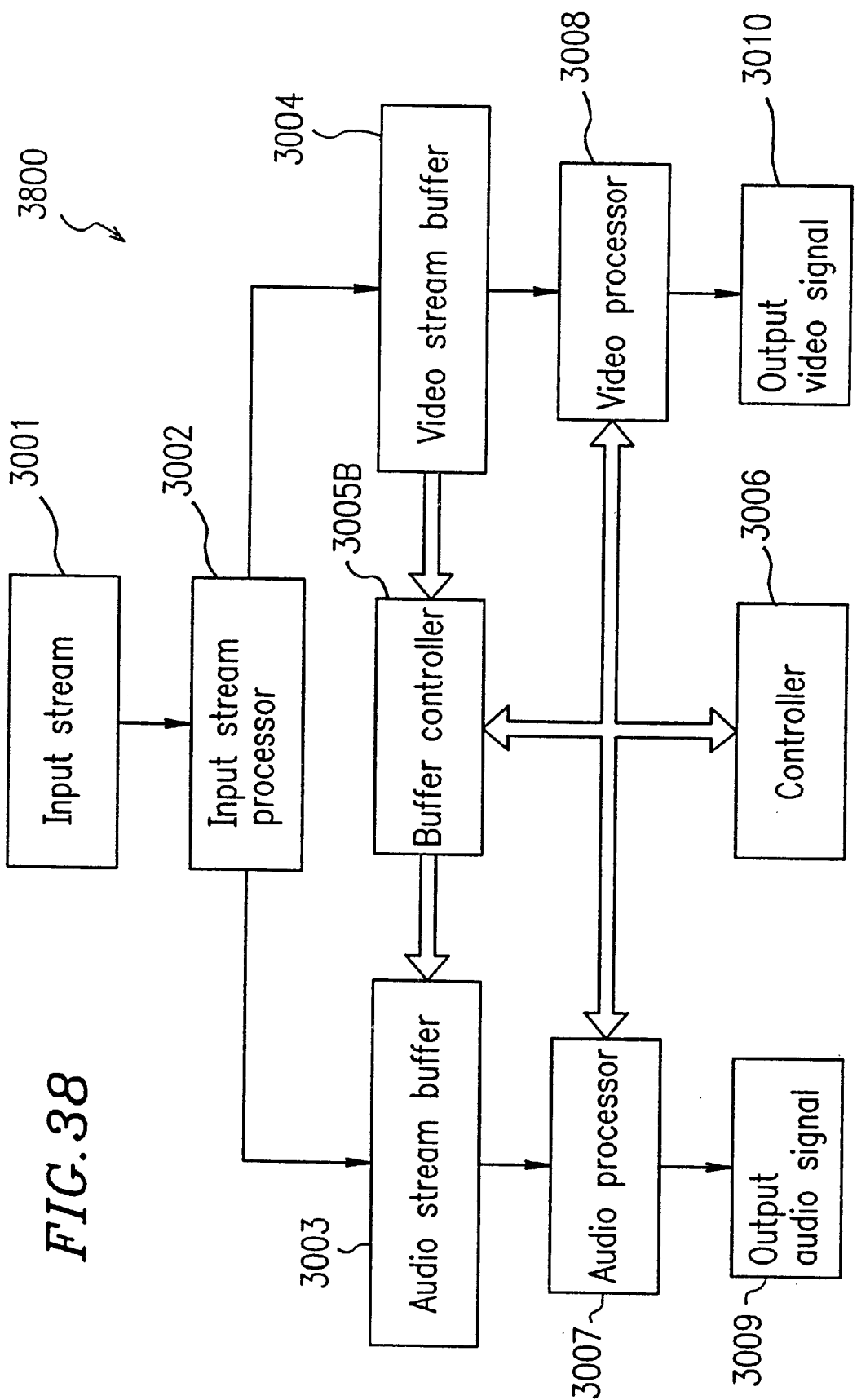
FIG. 38 is a block diagram illustrating a structure of an audio signal processing device in an eleventh example according to the present invention.

An audio signal processing device 3800 in an eleventh example according to the present invention will be described with reference to figures. FIG. 38 is a block diagram illustrating the audio signal processing device 3800 in the eleventh example. The audio signal processing device 3800 includes an input stream processor 3002, an audio stream buffer 3003, a video stream buffer 3004, a buffer controller 3005B, a controller 3006, an audio processor 3007, and a video processor 3008.

An input stream 3001 to be input to the input stream processor 3002 is output data from a DVD or equivalent data. In other words, the input stream processor 3002 receives a video signal or an audio signal which is compressed and multiplexed. In this example also, the input steam 3001 is a data stream output from a DVD, the video data is in conformity with MPEG2 and the audio data is in conformity with AC-3 for simplicity. Other types of data stream can also be used in a similar manner.

When the input stream 3001 is input to the input stream processor 3002, the input stream processor 3002 extracts video data and audio data to be reproduced from the input stream 3001 and stores the video data to the video stream buffer 3004 and audio data to the audio stream buffer 3003. At this point, the buffer controller 3005B supervises the remaining data amount in the video stream buffer 3004.

In a normal reproduction state, when the video data is input to the video processor 3008, the video processor 3008 decodes the video data into an output video signal 3010. When the audio data is input to the audio processor 3007, the audio processor 3007 decodes and converts the audio data into an output audio signal 3009.

In a high-rate reproduction state, the video processor 3008 follows an instruction from the controller 3006 to perform high-rate reproduction at a prescribed rate. The audio processor 3007 performs normal reproduction. In the case where the video data is in conformity with MPEG2, the high-rate reproduction at the prescribed ratio is performed in either one of the following rules.

(1-1) Reproduce only I picture (reproduction rate: about 6–7 times normal)

(1-2) Reproduce I and P pictures (reproduction rate: 1.5 to 3 times normal)

(1-3) Reproduce I and P pictures and a part of B picture (reproduction rate: 1 to 1.5 times normal)

Other methods than (1-1), (1-2) and (1-3) can be used.

During the high-rate reproduction, the buffer controller 3005B supervises the remaining data amount in the video stream buffer 3004. Normal reproduction is performed until the remaining data amount in the video stream buffer 3004 becomes smaller than a prescribed value V. When the remaining data amount in the video stream buffer 3004 becomes smaller than the prescribed value V, the buffer controller 3005B informs the audio processor 3007 of the remaining data amount in the video stream buffer 3004. The prescribed value V can be set to various values in accordance with the system. In this example, the prescribed value V is set to 0. The control is performed in a similar manner when the prescribed value V is set to a different value.

Figure 45:
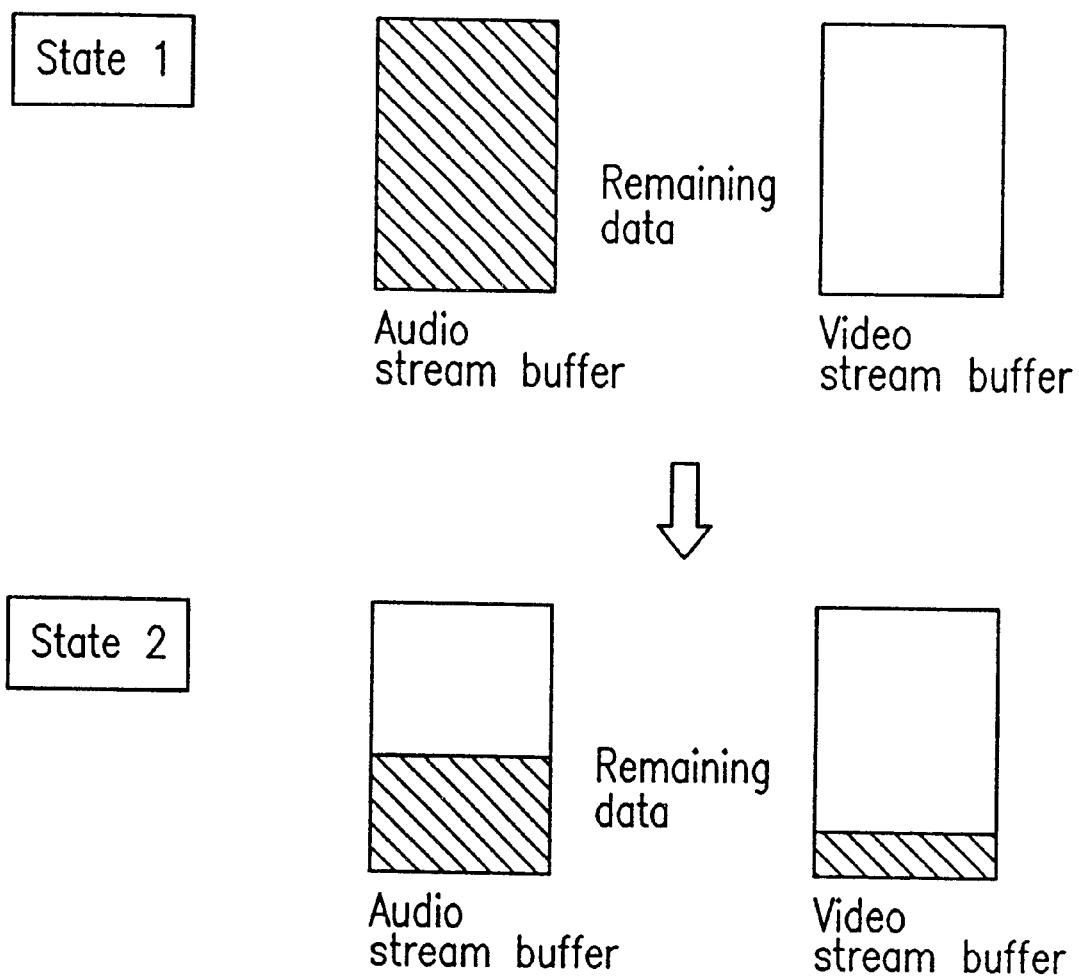
FIG. 45 shows a remaining data amount in an audio stream buffer and a video stream buffer in the audio signal processing device in the eleventh and twelfth examples.

When the remaining data amount in the video stream buffer 3004 becomes 0, the audio processor 3007 performs high-rate reproduction of the audio data by deleting a part of the output audio data. Such performance will be described with reference to FIG. 45. FIG. 45 shows the states of the audio stream buffer 3003 and the video stream buffer 3004 during reproduction. A shaded part represents a data area, and a blank part represents a usable area.

In the case where the video data is reproduced at a high rate and the remaining data amount in the video stream buffer 3004 does not become 0, the audio stream buffer 3003 and the video stream buffer 3004 are in state 2 in FIG. 45. The free capacity of the audio stream buffer 3003 is not 0 and the remaining data amount in the video stream buffer 3004 is not 0. Only the video data is reproduced at a high rate by the video processor 3008. Since an audio stream is input in accordance with the reproduction rate of the video data, the amount of the audio data to be decoded for normal reproduction is smaller than the input data amount. Since the audio data in the audio stream buffer 3003 is not processed, the next video stream cannot be extracted from the input stream 3001. Thus, the remaining data amount in the video stream buffer 3004 becomes 0 (state 1).

When the remaining data amount in the video stream buffer 3004 becomes 0, the buffer controller 3005B conveys such information to the audio processor 3007. In response, the audio processor 3007 discards a prescribed amount of the audio data, and resumes decoding the audio data at a normal rate from the part immediately after the discarded part of the audio data.

Hereinafter, the prescribed data amount to be discarded and discarding methods will be described.

(i) Clearing the Audio Stream Buffer (Flushing)

The data in the audio stream buffer 3003 is partially or totally flushed to partially thin out the stream before decoding. Thus, the amount of audio data to be reproduced is reduced for high-rate reproduction. A prescribed audio data amount to be discarded is an arbitrary amount which is less than the size of the audio steam buffer 3003 in the system used.

The audio data reproduced in this manner is shown in FIG. 40. FIG. 40 shows an output audio stream 1A in the normal reproduction and an output audio stream 1B in the high-rate reproduction obtained when the audio stream buffer 3003 is cleared. In the example shown in FIG. 40, the data from a middle of frame 4 to a middle of frame 7 is deleted by clearing the audio stream buffer 3003. As a result, the output audio stream 1B to be decoded during the high-rate reproduction is equal to a result obtained by deleting section A from the output audio stream 1A. In this case, the number of frames to be decoded is reduced from 12 (normal reproduction) to 8 by clearing the audio stream buffer 3003. Thus, the reproduction rate is 12/8=1.5 times normal.

This method is simple and relatively easy to carry out. However, since the audio data cannot be processed on a frame-by-frame basis, an undesirable stream error can occur. Since the content in the audio stream buffer 3003 is totally deleted, audio data cannot be output until the data for the next frame is input.

(ii) Restricting Input Audio Stream

The transfer of the input stream 3001 from the input stream processor 3002 to the audio stream buffer 3003 is stopped for a prescribed time period. In other words, a part of the input stream 3001 is deleted by non-transfer. Thus, the amount of audio data to be reproduced is reduced for high-rate reproduction. A prescribed audio data amount A to be discarded is determined by the reproduction rate of the video data which is supported by the system. Where the video reproduction rate is n (normal reproduction), the amount of audio data which is equal to or more than (n−1) audio frames needs to be discarded each time the transfer is stopped.

The audio data reproduced in this manner is shown in FIG. 41. FIG. 41 shows an output audio stream 1A in the normal reproduction and an output audio stream 1B obtained by restricting the input of the input stream 3001 for high-rate reproduction. In the example shown in FIG. 41, the data from a middle of frame 4 to a middle of frame 7 is deleted by restricting the input of the input stream 3001. As a result, the output audio stream 1B to be decoded during the high-rate reproduction is equal to a result obtained by deleting section A from the output audio stream 1A. In this case, the number of frames to be decoded is reduced from 12 (normal reproduction) to 8. Thus, the reproduction rate is 12/8=1.5 times normal.

This method is simple and relatively easy to carry out. However, since the audio data cannot be processed on a frame-by-frame basis, an undesirable stream error can undesirably occur. Furthermore, audio data cannot be output until the data for the next frame is input.

(iii) Skipping Input Audio Stream

One to several frames of audio data is skipped on a frame-by-frame basis by the audio processor 3007. Thus, the amount of audio data to be reproduced is reduced for high-rate reproduction. A prescribed audio data amount to be discarded is determined by the reproduction rate of the video data which is supported by the system. Where the video reproduction rate is n (normal reproduction), the amount of audio data which is equal to or more than (n−1) audio frames needs to be discarded each time the data is skipped.

The audio data reproduced in this manner is shown in FIG. 42. FIG. 42 shows an output audio stream 1A in the normal reproduction and an output audio stream 1B obtained by partially skipping the audio data for high-rate reproduction. In the example shown in FIG. 42, the data from frame 4 to frame 7 is deleted by skipping the audio data. As a result, the output audio stream 1B to be decoded during the high-rate reproduction is equal to the output audio stream 1A after section A is deleted. In this case, the number of frames to be decoded is reduced from 12 (normal reproduction) to 8. Thus, the reproduction rate is 12/8=1.5 times normal.

This method is simple and relatively easy to carry out. Furthermore, since the audio data is processed on a frame-by-frame basis, a stream error does not occur.

(iv) Stopping Output of the Audio Data

Output of one to several frames of audio data is stopped by the audio processor 3007. Thus, the amount of audio data to be reproduced is reduced for high-rate reproduction. A minimum value of a prescribed audio data amount to be discarded by stopping the output is determined by the reproduction rate of the video data which is supported by the system. Where the video reproduction rate is n (normal reproduction), the amount of audio data which is equal to or more than (n−1) audio frames needs to be discarded each time the output is stopped.

The audio data reproduced in this manner is shown in FIG. 43. FIG. 43 shows an output audio stream 1A in the normal reproduction and an output audio stream 1B obtained by stopping the output of the audio data for high-rate reproduction. In the example shown in FIG. 43, the data from frame 4 to frame 7 is deleted by stopping the output of the audio data. As a result, the output audio stream 1B to be decoded during the high-rate reproduction is equal to a result obtained by deleting section A from the output audio stream 1A. In this case, the number of frames to be decoded is reduced from 12 (normal reproduction) to 8. Thus, the reproduction rate is 12/8=1.5 times normal.

This method is simple and relatively easy to carry out. Furthermore, since the audio data is processed on a frame-by-frame basis, a stream error does not occur.

As described above, the high-rate reproduction of audio data is performed in accordance with the reproduction rate of the video data without changing the reproduction rate of the video data by discarding a part of the audio video stream by either one of methods (i) through (iv) each time the remaining data amount in the video stream buffer 3004 becomes 0. The above-mentioned methods (i) through (iv) reduces sound discontinuity. Accordingly, an audio signal processing device in the eleventh example reproduce audio data at a high rate in accordance with the reproduction rate of the video data with less sound discontinuity and in a simpler manner.

(Example 12)

Figure 39:
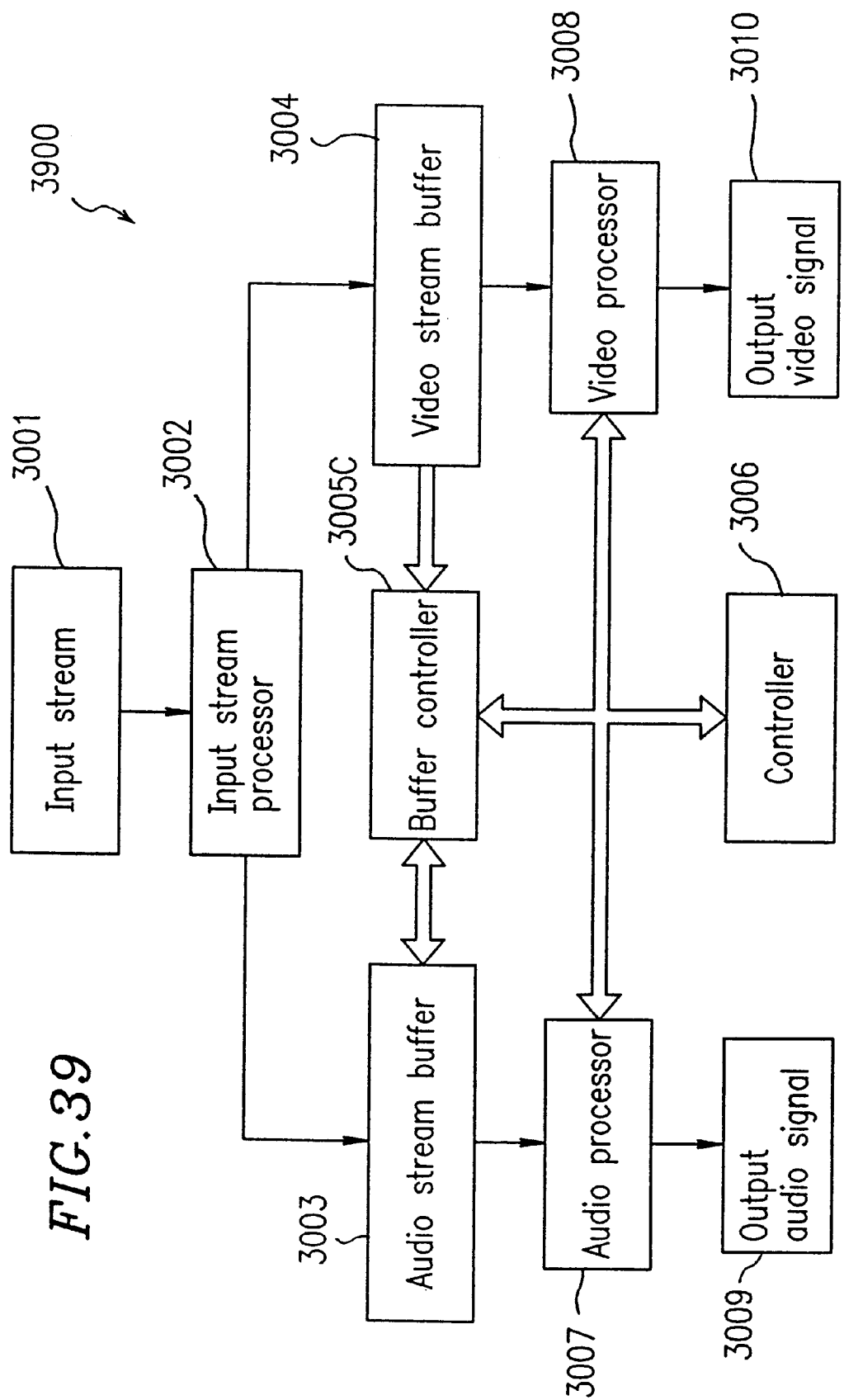
FIG. 39 is a block diagram illustrating a structure of an audio signal processing device in a twelfth example according to the present invention.

An audio signal processing device 3900 in a twelfth example according to the present invention will be described with reference to figures. FIG. 39 is a block diagram illustrating the audio signal processing device 3900 in the twelfth example. The audio signal processing device 3900 includes an input stream processor 3002, an audio stream buffer 3003, a video stream buffer 3004, a buffer controller 3005C, a controller 3006, an audio processor 3007, and a video processor 3008.

An input stream 3001 to be input to the input stream processor 3002 is output data from a DVD or equivalent data. In other words, the input stream processor 3002 receives a video signal or an audio signal which is compressed and multiplexed. In this example also, the input steam 3001 is a data stream output from a DVD, the video data is in conformity with MPEG2 and the audio data is in conformity with AC-3 for simplicity. Other types of data stream can be used in a similar manner.

When the input stream 3001 is input to the input stream processor 3002, the input stream processor 3002 extracts video data and audio data to be reproduced from the input stream 3001 and stores the video data to the video stream buffer 3004 and audio data to the audio stream buffer 3003. At this point, the buffer controller 3005C supervises the remaining data amount in the video stream buffer 3004 and the free capacity of the audio stream buffer 3003.

In a normal reproduction state, when the video data is input to the video processor 3008, the video processor 3008 decodes the video data into an output video signal 3010. When the audio data is input to the audio processor 3007, the audio processor 3007 decodes and converts the audio data into an output audio signal 3009.

In a high-rate reproduction state, the video processor 3008 follows an instruction from the controller 3006 to perform high-rate reproduction at a prescribed rate. The audio processor 3007 performs normal reproduction. In the case where the video data is in conformity with MPEG2, the high-rate reproduction at the prescribed ratio is performed in either one of the following rules.

(1-1) Reproduce only I picture (reproduction rate: about 6–7 times normal)

(1-2) Reproduce I and P pictures (reproduction rate: 1.5 to 3 times normal)

(1-3) Reproduce I and P pictures and a part of B picture (reproduction rate: 1 to 1.5 times normal)

Other methods than (1-1), (1-2) and (1-3) can be used.

During the high-rate reproduction, the buffer controller 3005C supervises the remaining data amount in the video stream buffer 3004 and the free capacity of the audio stream buffer 3003. Normal reproduction is performed until the remaining data amount in the video stream buffer 3004 becomes smaller than a prescribed value V or until the free capacity of the audio stream buffer 3003 becomes smaller than a prescribed value W. When the remaining data amount in the video stream buffer 3004 becomes smaller than the prescribed value V or when the free capacity of the audio stream buffer 3003 becomes smaller than the prescribed value W, the buffer controller 3005C informs the audio processor 3007 of the remaining free capacity of the audio stream buffer 3003 or the video stream buffer 3004. The prescribed values W and V can be set to various values in accordance with the system. In this example, the prescribed values W and V are set to 0. The control is performed in a similar manner when the prescribed values W and V are set to a different value.

When the remaining data amount in the video stream buffer 3004 or the audio stream buffer 3003 becomes 0, the audio processor 3007 performs high-rate reproduction of the audio data by deleting a part of the output audio data. Such performance will be described with reference to FIGS. 44 and 45. FIGS. 44 and 45 show the states of the audio stream buffer 3003 and the video stream buffer 3004 during reproduction. A shaded part represents a data area, and a blank part represents a usable area.

In the case where the video data is reproduced at a high rate and the remaining data amount in the video stream buffer 3004 does not become 0, the audio stream buffer 3003 and the video stream buffer 3004 are in state 2 in FIGS. 44 and 45. The free capacity of the audio stream buffer 3003 is not 0, and the remaining data amount in the video stream buffer 3004 is not 0. Only the video data is reproduced at a high rate by the video processor 3008. Since an audio stream is input in accordance with the reproduction rate of the video data, the amount of the audio data to be decoded for normal reproduction is smaller than the input data amount. Accordingly, the free capacity of the audio stream buffer 3003 becomes 0 as shown in state 1 of FIG. 44 or the remaining data amount in the video stream buffer 3004 becomes 0 as shown in state 1 of FIG. 45.

When the free capacity of the audio stream buffer 3003 or the remaining data amount in the video stream buffer 3004 becomes 0, the buffer controller 3005C conveys such information to the audio processor 3007. In response, the audio processor 3007 discards a prescribed amount of the audio data, and resumes decoding the audio data at a normal rate from the part immediately after the discarded part of the audio data.

Hereinafter, the prescribed data amount to be discarded and discarding methods will be described.

(i) Clearing the Audio Stream Buffer 3003

The data in the audio stream buffer 3003 is partially or totally flushed to partially thin out the stream before decoding. Thus, the amount of audio data to be reproduced is reduced for high-rate reproduction. A prescribed audio data amount A to be discarded is an arbitrary amount which is less than the size of the audio steam buffer 3003 in the system used.

The audio data reproduced in this manner is shown in FIG. 40. FIG. 40 shows an output audio stream 1A in the normal reproduction and an output audio stream 1B in the high-rate reproduction as a result of clearing the audio stream buffer 3003. In the example shown in FIG. 40, the data from a middle of frame 4 to a middle of frame 7 is deleted by clearing the audio stream buffer 3003. As a result, the output audio stream 1B to be decoded during the high-rate reproduction is equal to a result obtained by deleting section A from the output audio stream 1A. In this case, the number of frames to be decoded is reduced from 12 (normal reproduction) to 8 by clearing the audio stream buffer 3003. Thus, the reproduction rate is 12/8=1.5 times normal.

This method is simple and relatively easy to carry out. However, since the audio data cannot be processed on a frame-by-frame basis, an undesirable stream error can occur. Since the content in the audio stream buffer 3003 is totally deleted, audio data cannot be output until the data for the next frame is input.

(ii) Restricting Input Audio Stream

The transfer of the input stream 3001 from the input stream processor 3002 to the audio stream buffer 3003 is stopped for a prescribed time period. In other words, a part of the input stream 3001 is deleted by non-transfer. Thus, the amount of audio data to be reproduced is reduced for high-rate reproduction. A prescribed audio data amount A to be discarded is determined by the reproduction rate of the video data which is supported by the system. Where the video reproduction rate is n (normal reproduction), the amount of audio data which is equal to or more than (n−1) audio frames needs to be discarded each time the transfer is stopped.

The audio data reproduced in this manner is shown in FIG. 41. FIG. 41 shows an output audio stream 1A in the normal reproduction and an output audio stream 1B obtained by restricting the input of the input stream 3001 for high-rate reproduction. In the example shown in FIG. 41, the data from a middle of frame 4 to a middle of frame 7 is deleted by restricting the input of the input stream 3001. As a result, the output audio stream 1B to be decoded during the high-rate reproduction is equal to a result obtained by deleting section A from the output audio stream 1A. In this case, the number of frames to be decoded is reduced from 12 (normal reproduction) to 8. Thus, the reproduction rate is 12/8=1.5 times normal.

This method is simple and relatively easy to carry out. However, since the audio data cannot be processed on a frame-by-frame basis, an undesirable stream error can occur. Furthermore, audio data cannot be output until the data for the next frame is input.

(iii) Skipping Input Audio Stream

One to several frames of audio data is skipped on a frame-by-frame basis by the audio processor 3007. Thus, the amount of audio data to be reproduced is reduced for high-rate reproduction. A prescribed audio data amount to be discarded is determined by the reproduction rate of the video data which is supported by the system. Where the video reproduction rate is n (normal reproduction), the amount of audio data which is equal to or more than (n−1) audio frames needs to be discarded each time the data is skipped.

The audio data reproduced in this manner is shown in FIG. 42. FIG. 42 shows an output audio stream 1A in the normal reproduction and an output audio stream 1B obtained by partially skipping the audio data for high-rate reproduction. In the example shown in FIG. 42, the data from frame 4 to frame 7 is deleted by skipping the audio data. As a result, the output audio stream 1B to be decoded during the high-rate reproduction is equal to a result obtained by deleting section A from the output audio stream 1A. In this case, the number of frames to be decoded is reduced from 12 (normal reproduction) to 8. Thus, the reproduction rate is 12/8=1.5 times normal.

This method is simple and relatively easy to carry out. Furthermore, since the audio data is processed on a frame-by-frame basis, a stream error does not occur.

(iv) Stopping Output of the Audio Data

Output of one to several frames of audio data is stopped by the audio processor 3007. Thus, the amount of audio data to be reproduced is reduced for high-rate reproduction. A minimum value of a prescribed audio data amount to be discarded by stopping the output is determined by the reproduction rate of the video data which is supported by the system. Where the video reproduction rate is n (normal reproduction), the amount of audio data which is equal to or more than (n−1) audio frames needs to be discarded each time the output is stopped.

The audio data reproduced in this manner is shown in FIG. 43. FIG. 43 shows an output audio stream 1A in the normal reproduction and an output audio stream 1B obtained by stopping the output of the audio data for high-rate reproduction. In the example shown in FIG. 43, the data from frame 4 to frame 7 is deleted by stopping the output of the audio data. As a result, the output audio stream 1B to be decoded during the high-rate reproduction is equal to a result obtained by deleting section A from the output audio stream 1A. In this case, the number of frames to be decoded is reduced from 12 (normal reproduction) to 8. Thus, the reproduction rate is 12/8=1.5 times normal.

This method is simple and relatively easy to carry out. Furthermore, since the audio data is processed on a frame-by-frame basis, a stream error does not occur.

As described above, the high-rate reproduction of audio data is performed in accordance with the reproduction rate of the video data without changing the reproduction rate of the video data by discarding a part of the audio video stream by either one of methods (i) through (iv) each time the free capacity of the audio stream buffer 3003 becomes 0 or the remaining data amount of the video stream buffer 3004 becomes 0. The above-mentioned methods (i) through (iv) reduces sound discontinuity. Accordingly, an audio signal processing device in the twelfth example reproduces audio data at a high rate in accordance with the reproduction rate of the video data with less sound discontinuity and in a simpler manner.

Audio data and video data included in a data stream in conformity with the MPEG standards are generally decoded by LSIs which are separately formed into a chip. Even when the LSIs are formed on one, same chip, these LSIs are often formed in separate blocks having different cores. In such a case, the buffer controller cannot always supervise both the audio stream buffer 3003 and the video stream buffer 3004. Accordingly, the buffer controller supervises either one of the audio stream buffer 3003 (corresponding to the tenth example) and the video stream buffer 3004 (corresponding to the eleventh example). In the case where the audio data and the video data are decoded by the same LSI chip, the buffer controller 3005C can supervise both the audio stream buffer 3003 and the video stream buffer 3004 via a data bus.

In the tenth, eleventh and twelfth examples, in the case where the audio data is deleted on a frame-by-frame basis, for example, in the case where the audio data for frames 0 through i, frame i+1, . . . frame k−1, frame k and frame k+1 is input and then the audio data for frames i+1, . . . frame k−1 is deleted, the audio data for frames i and k is treated by cross-fading.

As can be appreciated from the tenth, eleventh and twelfth example, an audio signal processing device according to the present invention supervises the free capacity of an audio stream buffer and discards a prescribed amount of the audio stream when the usable amount becomes smaller than a prescribed amount. Thus, the audio signal processing device reproduces audio data at a high rate in accordance with the reproduction rate of the video data with less sound discontinuity and in a simpler manner.

Alternatively, an audio signal processing device according to the present invention can supervise the remaining data amount in a video stream buffer and discards a prescribed amount of the audio stream when the remaining data amount becomes smaller than a prescribed amount. Thus, the audio signal processing device reproduces audio data at a high rate in accordance with the reproduction rate of the video data with less sound discontinuity and in a simpler manner.

Still alternatively, an audio signal processing device according to the present invention can supervise both the free capacity of the audio stream buffer and the remaining data amount in the video stream buffer. In such a case, the audio signal processing device discards a prescribed amount of the audio stream when the free capacity of the audio stream buffer or the remaining data amount in the video stream buffer becomes smaller then a prescribed amount. Thus, the audio signal processing device reproduces audio data at a high rate in accordance with the reproduction rate of the video data with less sound discontinuity and in a simpler manner.

The prescribed amount of the audio stream is discarded by intermittently flushing the content of the audio stream buffer to thin out the audio data.

Alternatively, the prescribed amount of the audio stream is discarded by stopping, for a prescribed time period, an audio signal which is input from the input stream processor from being transferred to the audio stream buffer.

Still alternatively, the prescribed amount of the audio stream is discarded by skipping a prescribed amount of data input from the audio stream buffer by the audio processor.

Still alternatively, the prescribed amount of the audio stream is discarded by stopping, for a prescribed time period, the output of an audio signal by the audio processor.

By either of the above-described methods, the audio data to be reproduced is reduced for high-rate reproduction. In this manner, high-rate reproduction of audio data is performed in accordance with the reproduction rate of the video data with less sound discontinuity.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A sound image localization device, comprising:
   a signal source for outputting an audio signal;
   a signal divider for dividing the audio signal output from the signal source into two digital audio signals respectively for two channels;
   a first signal processor for receiving one of the two digital signals and processing the digital signal so as to localize a virtual sound image using a filter having a first frequency characteristic;

a first D/A converter for converting the digital signal output from the first signal processor into an analog signal;

a second D/A converter for directly receiving the other digital signal from the signal divider without being processed by the first signal processor and converting the signal into an analog signal;

a first control speaker for outputting the audio signal obtained by the first D/A converter to a first prescribed space area; and a second control speaker for outputting the audio signal obtained by the second D/A converter to a second prescribed space area.

2. A sound image localization device according to claim 1, wherein the first frequency characteristic of the first signal processor is determined so that sounds reaching from the first and second control speakers to left and right ears of a listener have a difference which is identical with a difference between sounds reaching from the virtual sound image to the left and right ears of the listener.

3. A sound image localization device, comprising:

a signal source for outputting an audio signal;

a second signal processor for processing the audio signal output from the signal source using a filter having a second frequency characteristic;

a signal divider for dividing the audio signal output from the second signal processor into two digital audio signals respectively for two channels;

a first signal processor for receiving one of the two digital signals and processing the digital signal so as to localize a virtual sound image using a filter having a first frequency characteristic;

a first D/A converter for converting the digital signal output from the first signal processor into an analog signal;

a second D/A converter for receiving the other digital signal obtained from the signal divider without being processed by the first signal processor and converting the signal into an analog signal;

a first control speaker for outputting the audio signal obtained by the first D/A converter to a first prescribed space area; and a second control speaker for outputting the audio signal obtained by the second D/A converter to a second prescribed space area.

4. A sound image localization device according to claim 3, wherein:

the first frequency characteristic of the first signal processor is determined so that sounds reaching from the first and second control speakers to left and right ears of a listener have a difference which is identical with a difference between sounds reaching from the virtual sound image to the left and right ears of the listener, and the second frequency characteristic of the second signal processor corrects at least one of a sound quality, a sound volume change and a phase characteristic of the first frequency characteristic of the first signal processor.

5. A sound image localization device, comprising:

a signal source for outputting an audio signal for a frequency domain;

a third signal processor for processing the audio signal for the frequency domain output from the signal source using a filter having a third frequency characteristic;

a frequency domain-time domain converter for converting the audio signal for the frequency domain output from the third signal processor into an audio signal in a time domain;

a signal divider for dividing the audio signal output from the frequency domain-time domain converter into two digital audio signals respectively for two channels;

a first signal processor for receiving one of the two digital signals and processing the digital signal so as to localize a virtual sound image using a filter having a first frequency characteristic;

a first D/A converter for converting the digital signal output from the first signal processor into an analog signal;

a second D/A converter for receiving the other digital signal obtained from the signal divider without being processed by the first signal processor and converting the signal into an analog signal;

a first control speaker for outputting the audio signal obtained by the first D/A converter to a first prescribed space area; and a second control speaker for outputting the audio signal obtained by the second D/A converter to a second prescribed space area.

6. A sound image localization device according to claim 5, wherein:

the first frequency characteristic of the first signal processor is determined so that sounds reaching from the first and second control speakers to left and right ears of a listener have a difference which is identical with a difference between sounds reaching from the virtual sound image to the left and right ears of the listener, and the third frequency characteristic of the second signal processor corrects at least one of a sound quality, a sound volume change and a phase characteristic of the first frequency characteristic of the first signal processor on the frequency domain.

7. A sound image localization device, comprising:

a signal source for outputting an audio signal for a frequency domain;

a third signal processor for processing the audio signal for the frequency domain output from the signal source using a filter having a third frequency characteristic;

a frequency domain-time domain converter for converting the audio signal for the frequency domain output from the third signal processor into an audio signal in a time domain;

a second signal processor for processing the audio signal output from the frequency domain-time domain converter using a filter having a second frequency characteristic;

a signal divider for dividing the audio signal output from the second signal processor into two digital audio signals respectively for two channels;

a first signal processor for receiving one of the two digital signals and processing the digital signal so as to localize a virtual sound image using a filter having a first frequency characteristic;

a first D/A converter for converting the digital signal output from the first signal processor into an analog signal;

a second D/A converter for receiving the other digital signal obtained from the signal divider without being processed by the first signal processor and converting the signal into an analog signal;

a first control speaker for outputting the audio signal obtained by the first D/A converter to a first prescribed space area; and a second control speaker for outputting the audio signal obtained by the second D/A converter to a second prescribed space area.

8. A sound image localization device according to claim 7, wherein:

the first frequency characteristic of the first signal processor is determined so that sounds reaching from the first and second control speakers to left and right ears of a listener have a difference which is identical with a difference between sounds reaching from the virtual sound image to the left and right ears of the listener, and a coupled frequency characteristic of the third frequency characteristic of the third signal processor and the second frequency characteristic of the second signal processor corrects at least one of a sound quality, a sound volume change and a phase characteristic of the first frequency characteristic of the first signal processor on the frequency domain.

9. A sound image control method for localizing a sound image at a position of a virtual sound image corresponding to an audio signal from a signal source, using a first control speaker and a second control speaker respectively provided in a space to the left of the listener and a space to the right of the listener, the method comprising the steps of:

providing a signal processor for processing a signal to be input to the first control speaker, wherein a signal to be input to the second control speaker is not processed by any signal processor; and obtaining a frequency characteristic G(n) for providing a state in which sounds reaching from the first and second control speakers to the left and right ears of the listener have a difference which is identical with a difference between sounds reaching from the virtual sound image to the left and right ears of the listener, and causing the signal processor to have the frequency characteristic G(n) so as to localize the audio signal at the position of the virtual sound image.

10. A sound image control method according to claim 9, wherein the frequency characteristic G(n) is obtained by the following steps:

where the impulse response between the first control speaker and the left ear of the listener is h1(t), the impulse response between the first control speaker and the right ear of the listener is h2(t), the impulse response between the second control speaker and the left ear of the listener is h3(t), the impulse response between the second control speaker and the right ear of the listener is h4(t), a virtual sound image localized in an arbitrary direction is an virtual speaker, the impulse response between the virtual speaker and the left ear of the listener is h5(t), and the impulse response between the virtual speaker and the right ear of the listener is h6(t), (1) obtaining a sound reaching the left ear of the listener by L(t)=S(t)*h5(t) and obtaining a sound reaching the right ear of the listener by R(t)=S(t)*h6(t), where an audio signal S(t) is output from the virtual speaker from a signal source;

(2) converting signals L(t), R(t), h5(t), h6(t), and S(t) on a time axis into discrete signals L(n), R(n), h5(n), h6(n), and S(n);

(3) obtaining L(n)=S(n)×h5(n) and R(n)=S(n)×h6(n);

(4) calculating the sound output from the first control speaker and reaching the left ear of the listener by $$L'(t)=S(t)*hL(t)*h1(t)+S(t)*hR(t)*h3(t);$$

(5) calculating the sound output from the first control speaker and reaching the right ear of the listener by $$R'(t)=S(t)*hL(t)*h2(t)+S(t)*hR(t)*h4(t)$$

where hL(t) and hR(t) are transmission characteristics of signal processing filters for the left and right ear signals, respectively;

(6) converting L'(t) into $$L'(n)=S(n)\times hL(n)\times h1(n)+S(n)\times hR(n)\times h3(n);$$

(7) converting R'(t) into $$R'(n)=S(n)\times hL(n)\times h2(n)+S(n)\times hR(n)\times h4(n);$$

and (8) obtaining hL(n) and hR(n) so that L(n)=L'(n) and R(n)=R'(n) are satisfied, wherein h5(n)=hL(n)×h1(n)+hR(n)×h3(n) and h6(n)=hL(n)×h2(n)+hR(n)×h4(n);

(9) calculating G(n) by G(n)=hL(n)/hR(n).

* * * * *